(12) United States Patent
Johnsen et al.

(10) Patent No.: US 11,341,082 B2
(45) Date of Patent: May 24, 2022

(54) SYSTEM AND METHOD FOR SUPPORTING TARGET GROUPS FOR CONGESTION CONTROL IN A PRIVATE FABRIC IN A HIGH PERFORMANCE COMPUTING ENVIRONMENT

(71) Applicant: ORACLE INTERNATIONAL CORPORATION, Redwood Shores, CA (US)

(72) Inventors: Bjørn Dag Johnsen, Oslo (NO); Ajoy Siddabathuni, Santa Clara, CA (US); Avneesh Pant, Redwood City, CA (US); Amarnath Jolad, Redwood City, CA (US)

(73) Assignee: ORACLE INTERNATIONAL CORPORATION, Redwood Shores, CA (US)

(*) Notice: Subject to any disclaimer, the term of this patent is extended or adjusted under 35 U.S.C. 154(b) by 0 days.

(21) Appl. No.: 16/872,039

(22) Filed: May 11, 2020

(65) Prior Publication Data

US 2021/0152479 A1 May 20, 2021

Related U.S. Application Data

(60) Provisional application No. 62/937,594, filed on Nov. 19, 2019.

(51) Int. Cl.
*H04L 12/851* (2013.01)
*G06F 15/173* (2006.01)
(Continued)

(52) U.S. Cl.
CPC .... *G06F 15/17331* (2013.01); *G06F 9/45558* (2013.01); *H04L 41/12* (2013.01);
(Continued)

(58) Field of Classification Search
CPC ..... H04L 41/12; H04L 41/5003; H04L 45/48; H04L 47/17; H04L 47/2433; H04L 47/26;
(Continued)

(56) References Cited

U.S. PATENT DOCUMENTS 8,593,964 B1 * 11/2013 Sinha ...................... H04L 47/11
370/235
8,982,688 B2 * 3/2015 Froese .................... H04L 49/10
370/212
(Continued)

OTHER PUBLICATIONS

Escamilla, et al., "ICARO: Congestion Isolation in Networks-On-Chip", 2014 Eighth IEEE/ACM International Symposium on Networks-on-Chip (NoCS), pp. 159-166, 8 pages.
(Continued)

*Primary Examiner* — Robert J Lopata
(74) *Attorney, Agent, or Firm* — Tucker Ellis LLP

(57) ABSTRACT

Systems and methods for supporting target groups for congestion control in a private fabric in a high performance computing environment. An exemplary method can provide, at one or more microprocessors, a first subnet, the first subnet comprising a plurality of switches, a plurality of host channel adapters, and a plurality of end nodes, including a plurality of virtual machines. The method can define a target group on one of an inter-switch link or at a port of a switch of the plurality of switches, wherein the target group defines a bandwidth limit on the at least one of an inter-switch link between two switches of the plurality of switches or at a port of a switch of the plurality of switches. The method can provide a target group repository stored in a memory of the host channel adapter where the defined target group in the target group repository is recorded.

20 Claims, 39 Drawing Sheets

(51) Int. Cl.
*H04L 49/356* (2022.01)
*H04L 41/5003* (2022.01)
*G06F 9/455* (2018.01)
*H04L 47/80* (2022.01)
*H04L 47/17* (2022.01)
*H04L 47/26* (2022.01)
*H04L 47/33* (2022.01)
*H04W 28/08* (2009.01)
*H04L 41/12* (2022.01)
*H04L 45/48* (2022.01)
*H04L 47/30* (2022.01)
*H04L 47/2425* (2022.01)
*H04L 49/00* (2022.01)

(52) U.S. Cl.
CPC .......... *H04L 41/5003* (2013.01); *H04L 45/48* (2013.01); *H04L 47/17* (2013.01); *H04L 47/2433* (2013.01); *H04L 47/26* (2013.01); *H04L 47/30* (2013.01); *H04L 47/33* (2013.01); *H04L 47/805* (2013.01); *H04L 49/358* (2013.01); *H04W 28/0983* (2020.05); *G06F 2009/45583* (2013.01); *G06F 2009/45595* (2013.01); *H04L 49/70* (2013.01)

(58) Field of Classification Search
CPC ....... H04L 47/30; H04L 47/33; H04L 47/748; H04L 47/805; H04L 47/828; H04L 49/358; H04L 49/70; H04W 28/0983
USPC ......................................................... 370/229
See application file for complete search history.

(56) References Cited

U.S. PATENT DOCUMENTS

| | | | |
|---|---|---|---|
| 10,148,567 | B2 | 12/2018 | Holen |
| 11,005,724 | B1* | 5/2021 | Shpigelman .......... H04L 41/145 |
| 2003/0067940 | A1 | 4/2003 | Edholm |
| 2003/0174647 | A1 | 9/2003 | Gutierrez et al. |
| 2004/0054828 | A1* | 3/2004 | Finch ................... G06F 13/387 710/104 |
| 2007/0076598 | A1 | 4/2007 | Atkinson |
| 2011/0110241 | A1* | 5/2011 | Atkinson ................ H04L 41/22 370/242 |
| 2011/0267942 | A1 | 11/2011 | Aybay et al. |
| 2012/0044803 | A1 | 2/2012 | Zhang |
| 2012/0163175 | A1* | 6/2012 | Gupta ..................... H04L 47/10 370/235 |
| 2013/0107716 | A1* | 5/2013 | Volpe ..................... H04L 49/30 370/235 |
| 2013/0135999 | A1 | 5/2013 | Bloch et al. |
| 2016/0267041 | A1* | 9/2016 | Jose ................... G06F 13/4221 |
| 2017/0214580 | A1 | 7/2017 | Moxnes |
| 2017/0257312 | A1 | 9/2017 | Johnsen |
| 2018/0157445 | A1 | 6/2018 | Gissin et al. |
| 2019/0068401 | A1 | 2/2019 | Johnsen et al. |
| 2019/0149473 | A1 | 5/2019 | Zahid et al. |
| 2019/0319848 | A1* | 10/2019 | Johnsen ................ H04L 41/12 |
| 2019/0372857 | A1 | 12/2019 | Gandhi |

OTHER PUBLICATIONS

"Understanding RoCEv2 Congestion Management", published Dec. 3, 2018, retrieved from https://community.mellanox.com/s/article/understanding-rocev2-congestion-management, 5 pages.

International Search Report and Written Opinion of the International Searching Authority dated Sep. 15, 2020 for PCT Application No. PCT/US2020/045273, 12 pages.

International Search Report and Written Opinion of the International Searching Authority dated Oct. 12, 2020 for PCT Application No. PCT/US2020/045271, 12 pages.

International Search Report and Written Opinion of the International Searching Authority dated Oct. 16, 2020 for PCT Application No. PCT/US2020/045272, 14 pages.

International Search Report and Written Opinion of the International Searching Authority dated Oct. 19, 2020 for PCT Application No. PCT/US2020/045270, 12 pages.

United States Patent and Trademark Office, Office Communication dated Jun. 24, 2021 for U.S. Appl. No. 16/872,038, 23 pages.

United States Patent and Trademark Office, Office Communication dated Sep. 29, 2021 for U.S. Appl. No. 16/872,043, 10 pages.

United States Patent and Trademark Office, Notice of Allowance and Fee(S) Due dated Oct. 15, 2021 for U.S. Appl. No. 16/872,038, 9 pages.

* cited by examiner

Provide, at one or more computers, including one or more microprocessors, a first subnet, the first subnet comprising one or more switches, the one or more switches comprising at least a leaf switch, wherein each of the one or more switches comprise a plurality of switch ports, a plurality of host channel adapters, wherein each of the host channel adapters comprise at least one virtual function, at least one virtual switch, and at least one physical function, and wherein the plurality of host channel adapters are interconnected via the one or more switches, a plurality of hypervisors, wherein each of the plurality of hypervisors are associated with at least one host channel adapter of the plurality of host channel adapters, a plurality of virtual machines, wherein each of the plurality of virtual machines are associated with at least one virtual function, and a subnet manager, the subnet manager running on one of the one or more switches and the plurality of host channel adapters. — 1310

Configure a switch port of the plurality of switch ports on a switch of the one or more switches as a router port. — 1320

Logically connect the switch port configured as the router port is to a virtual router, the virtual router comprising at least two virtual router ports. — 1330

FIGURE 13

SYSTEM AND METHOD FOR SUPPORTING TARGET GROUPS FOR CONGESTION CONTROL IN A PRIVATE FABRIC IN A HIGH PERFORMANCE COMPUTING ENVIRONMENT

CLAIM OF PRIORITY AND CROSS REFERENCE TO RELATED APPLICATIONS

This application claims the benefit of priority to U.S. Provisional Patent Application entitled "SYSTEM AND METHOD FOR PROVIDING QUALITY-OF-SERVICE AND SERVICE-LEVEL AGREEMENTS IN A PRIVATE FABRIC IN A HIGH PERFORMANCE COMPUTING ENVIRONMENT", Application No. 62/937,594, filed on Nov. 19, 2019, which application is incorporated by reference in its entirety.

This application is related to the following applications, each of which is incorporated by reference in its entirety: U.S. Patent Application entitled "SYSTEM AND METHOD FOR SUPPORTING RDMA BANDWIDTH RESTRICTIONS IN A PRIVATE FABRIC IN A HIGH PERFORMANCE COMPUTING ENVIRONMENT", application Ser. No. 16/872,035, filed concurrently herewith, U.S. Patent Application entitled "SYSTEM AND METHOD FOR PROVIDING BANDWIDTH CONGESTION CONTROL IN A PRIVATE FABRIC IN A HIGH PERFORMANCE COMPUTING ENVIRONMENT" application Ser. No. 16/872,038, filed concurrently herewith, and U.S. Patent Application entitled "SYSTEM AND METHOD FOR SUPPORTING USE OF FORWARD AND BACKWARD CONGESTION NOTIFICATIONS IN A PRIVATE FABRIC IN A HIGH PERFORMANCE COMPUTING ENVIRONMENT" application Ser. No. 16/872,043, filed concurrently herewith, each of which applications is incorporated by reference in its entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

Enforcing quality of service (QOS) and service-level agreements (SLA) in private high performance interconnect fabrics, such as InfiniBand (IB) and RoCE (RDMA (remote direct memory access) over Converged Ethernet).

BACKGROUND

As larger cloud computing architectures are introduced, the performance and administrative bottlenecks associated with the traditional network and storage have become a significant problem. There has been an increased interest in using high performance lossless interconnects such as InfiniBand (IB) technology as the foundation for a cloud computing fabric. This is the general area that embodiments of the invention are intended to address.

SUMMARY

Described herein are systems and methods for supporting target groups for congestion control in a private fabric in a high performance computing environment. An exemplary method can provide, at one or more microprocessors, a first subnet, the first subnet comprising a plurality of switches, a plurality of host channel adapters, and a plurality of end nodes, including a plurality of virtual machines. The method can define a target group on one of an inter-switch link or at a port of a switch of the plurality of switches, wherein the target group defines a bandwidth limit on the at least one of an inter-switch link between two switches of the plurality of switches or at a port of a switch of the plurality of switches. The method can provide a target group repository stored in a memory of the host channel adapter where the defined target group in the target group repository is recorded.

BRIEF DESCRIPTION OF THE FIGURES

FIG. 13 shows a flowchart of a method for supporting dual-port virtual router in a high performance computing environment, in accordance with an embodiment.

DETAILED DESCRIPTION

Figure 1:
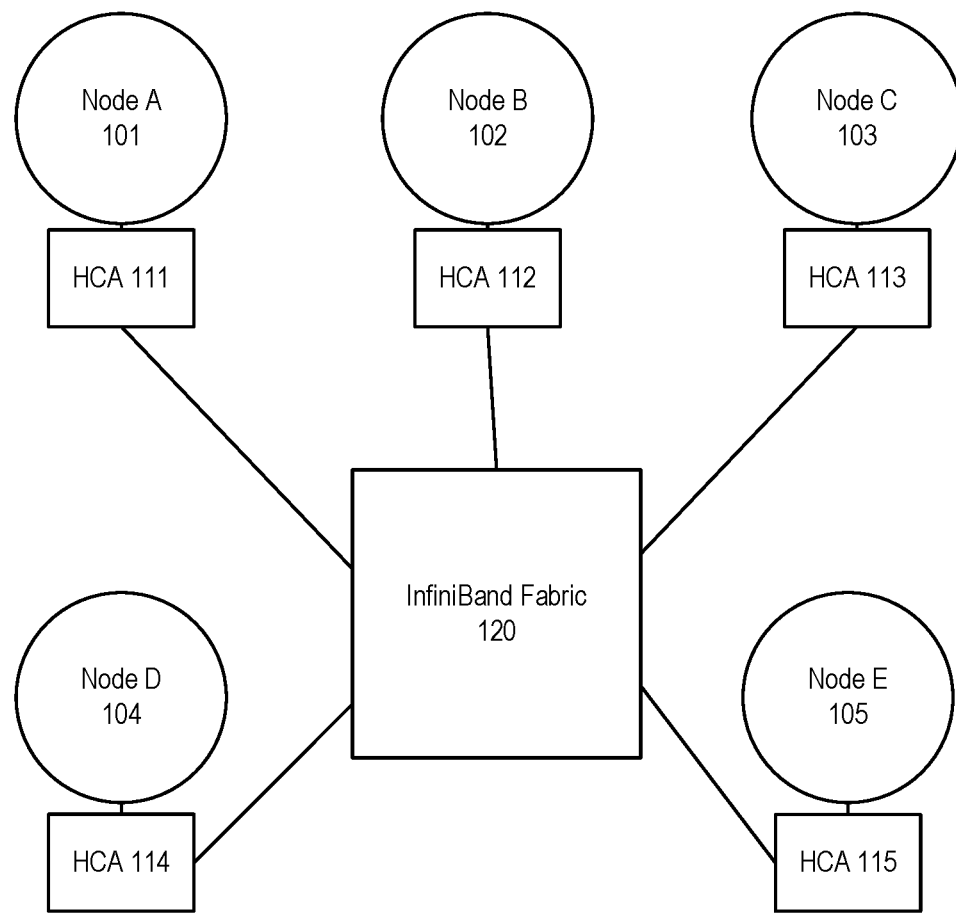
FIG. 1 shows an illustration of an InfiniBand environment, in accordance with an embodiment.

The invention is illustrated, by way of example and not by way of limitation, in the figures of the accompanying drawings in which like references indicate similar elements. It should be noted that references to "an" or "one" or "some" embodiment(s) in this disclosure are not necessarily to the same embodiment, and such references mean at least one. While specific implementations are discussed, it is understood that the specific implementations are provided for illustrative purposes only. A person skilled in the relevant art will recognize that other components and configurations may be used without departing from the scope and spirit of the invention.

Common reference numerals can be used to indicate like elements throughout the drawings and detailed description; therefore, reference numerals used in a figure may or may not be referenced in the detailed description specific to such figure if the element is described elsewhere.

Described herein are systems and methods for providing quality of service (QOS) and service level agreements (SLA) in a private fabric in a high performance computing environment.

In accordance with an embodiment, the following description of the invention uses an InfiniBand™ (IB) network as an example for a high performance network. Throughout the following description, reference can be made to the InfiniBand™ specification (also referred to variously as the InfiniBand specification, IB specification, or the legacy IB specification). Such reference is understood to refer to the InfiniBand® Trade Association Architecture Specification, Volume 1, Version 1.3, released March, 2015, available at http://www.inifinibandta.org, which is herein incorporated by reference in its entirety. It will be apparent to those skilled in the art that other types of high performance networks can be used without limitation. The following description also uses the fat-tree topology as an example for a fabric topology. It will be apparent to those skilled in the art that other types of fabric topologies can be used without limitation.

In accordance with an embodiment, the following description uses a RoCE (RDMA (Remote Direct Memory Access) over Converged Ethernet). RDMA over Converged Ethernet (RoCE) is a standard protocol which enables RDMA's efficient data transfer over Ethernet networks allowing transport offload with hardware RDMA engine implementation, and superior performance. RoCE is a standard protocol defined in the InfiniBand Trade Association (IBTA) standard. RoCE makes use of UDP (user datagram protocol) encapsulation allowing it to transcend Layer 3 networks. RDMA is a key capability natively used by the InfiniBand interconnect technology. Both InfiniBand and Ethernet RoCE share a common user API but have different physical and link layers.

In accordance with an embodiment, although portions of the specification contain reference to, in describing various implementations, an InfiniBand Fabric, one of ordinary skill in the art would readily understand that the various embodiments described herein can also be implemented in a RoCE Fabric.

To meet the demands of the cloud in the current era (e.g., Exascale era), it is desirable for virtual machines to be able to utilize low overhead network communication paradigms such as Remote Direct Memory Access (RDMA). RDMA bypasses the OS stack and communicates directly with the hardware, thus, pass-through technology like Single-Root I/O Virtualization (SR-IOV) network adapters can be used. In accordance with an embodiment, a virtual switch (vSwitch) SR-IOV architecture can be provided for applicability in high performance lossless interconnection networks. As network reconfiguration time is critical to make live-migration a practical option, in addition to network architecture, a scalable and topology-agnostic dynamic reconfiguration mechanism can be provided.

In accordance with an embodiment, and furthermore, routing strategies for virtualized environments using vSwitches can be provided, and an efficient routing algorithm for network topologies (e.g., Fat-Tree topologies) can be provided. The dynamic reconfiguration mechanism can be further tuned to minimize imposed overhead in Fat-Trees.

In accordance with an embodiment of the invention, virtualization can be beneficial to efficient resource utilization and elastic resource allocation in cloud computing. Live migration makes it possible to optimize resource usage by moving virtual machines (VMs) between physical servers in an application transparent manner. Thus, virtualization can enable consolidation, on-demand provisioning of resources, and elasticity through live migration.

InfiniBand™

InfiniBand™ (IB) is an open standard lossless network technology developed by the InfiniBand™ Trade Association. The technology is based on a serial point-to-point full-duplex interconnect that offers high throughput and low latency communication, geared particularly towards high-performance computing (HPC) applications and datacenters.

The InfiniBand™ Architecture (IBA) supports a two-layer topological division. At the lower layer, IB networks are referred to as subnets, where a subnet can include a set of hosts interconnected using switches and point-to-point links. At the higher level, an IB fabric constitutes one or more subnets, which can be interconnected using routers.

Within a subnet, hosts can be connected using switches and point-to-point links. Additionally, there can be a master management entity, the subnet manager (SM), which resides on a designated device in the subnet. The subnet manager is responsible for configuring, activating and maintaining the IB subnet. Additionally, the subnet manager (SM) can be responsible for performing routing table calculations in an IB fabric. Here, for example, the routing of the IB network aims at proper load balancing between all source and destination pairs in the local subnet.

Through the subnet management interface, the subnet manager exchanges control packets, which are referred to as subnet management packets (SMPs), with subnet management agents (SMAs). The subnet management agents reside on every IB subnet device. By using SMPs, the subnet manager is able to discover the fabric, configure end nodes and switches, and receive notifications from SMAs.

In accordance with an embodiment, intra-subnet routing in an IB network can be based on linear forwarding tables (LFTs) stored in the switches. The LFTs are calculated by the SM according to the routing mechanism in use. In a subnet, Host Channel Adapter (HCA) ports on the end nodes and switches are addressed using local identifiers (LIDs). Each entry in a linear forwarding table (LFT) consists of a destination LID (DLID) and an output port. Only one entry per LID in the table is supported. When a packet arrives at a switch, its output port is determined by looking up the DLID in the forwarding table of the switch. The routing is deterministic as packets take the same path in the network between a given source-destination pair (LID pair).

Generally, all other subnet managers, excepting the master subnet manager, act in standby mode for fault-tolerance. In a situation where a master subnet manager fails, however, a new master subnet manager is negotiated by the standby subnet managers. The master subnet manager also performs periodic sweeps of the subnet to detect any topology changes and reconfigure the network accordingly.

Furthermore, hosts and switches within a subnet can be addressed using local identifiers (LIDs), and a single subnet can be limited to 49151 unicast LIDs. Besides the LIDs, which are the local addresses that are valid within a subnet, each IB device can have a 64-bit global unique identifier (GUID). A GUID can be used to form a global identifier (GID), which is an IB layer three (L3) address.

The SM can calculate routing tables (i.e., the connections/routes between each pair of nodes within the subnet) at network initialization time. Furthermore, the routing tables can be updated whenever the topology changes, in order to ensure connectivity and optimal performance. During normal operations, the SM can perform periodic light sweeps of the network to check for topology changes. If a change is discovered during a light sweep or if a message (trap) signaling a network change is received by the SM, the SM can reconfigure the network according to the discovered changes.

For example, the SM can reconfigure the network when the network topology changes, such as when a link goes down, when a device is added, or when a link is removed. The reconfiguration steps can include the steps performed during the network initialization. Furthermore, the reconfigurations can have a local scope that is limited to the subnets, in which the network changes occurred. Also, the segmenting of a large fabric with routers may limit the reconfiguration scope.

An example InfiniBand fabric is shown in FIG. 1, which shows an illustration of an InfiniBand environment 100, in accordance with an embodiment. In the example shown in FIG. 1, nodes A-E, 101-105, use the InfiniBand fabric, 120, to communicate, via the respective host channel adapters 111-115. In accordance with an embodiment, the various nodes, e.g., nodes A-E, 101-105, can be represented by various physical devices. In accordance with an embodiment, the various nodes, e.g., nodes A-E, 101-105, can be represented by various virtual devices, such as virtual machines.

Partitionind in InfiniBand

In accordance with an embodiment, IB networks can support partitioning as a security mechanism to provide for isolation of logical groups of systems sharing a network fabric. Each HCA port on a node in the fabric can be a member of one or more partitions. Partition memberships are managed by a centralized partition manager, which can be part of the SM. The SM can configure partition membership information on each port as a table of 16-bit partition keys (P_Keys). The SM can also configure switch and router ports with the partition enforcement tables containing P_Key information associated with the end-nodes that send or receive data traffic through these ports. Additionally, in a general case, partition membership of a switch port can represent a union of all membership indirectly associated with LIDs routed via the port in an egress (towards the link) direction.

In accordance with an embodiment, partitions are logical groups of ports such that the members of a group can only communicate to other members of the same logical group.

At host channel adapters (HCAs) and switches, packets can be filtered using the partition membership information to enforce isolation. Packets with invalid partitioning information can be dropped as soon as the packets reaches an incoming port. In partitioned IB systems, partitions can be used to create tenant clusters. With partition enforcement in place, a node cannot communicate with other nodes that belong to a different tenant cluster. In this way, the security of the system can be guaranteed even in the presence of compromised or malicious tenant nodes.

In accordance with an embodiment, for the communication between nodes, Queue Pairs (QPs) and End-to-End contexts (EECs) can be assigned to a particular partition, except for the management Queue Pairs (QP0 and QP1). The P_Key information can then be added to every IB transport packet sent. When a packet arrives at an HCA port or a switch, its P_Key value can be validated against a table configured by the SM. If an invalid P_Key value is found, the packet is discarded immediately. In this way, communication is allowed only between ports sharing a partition.

Figure 2:
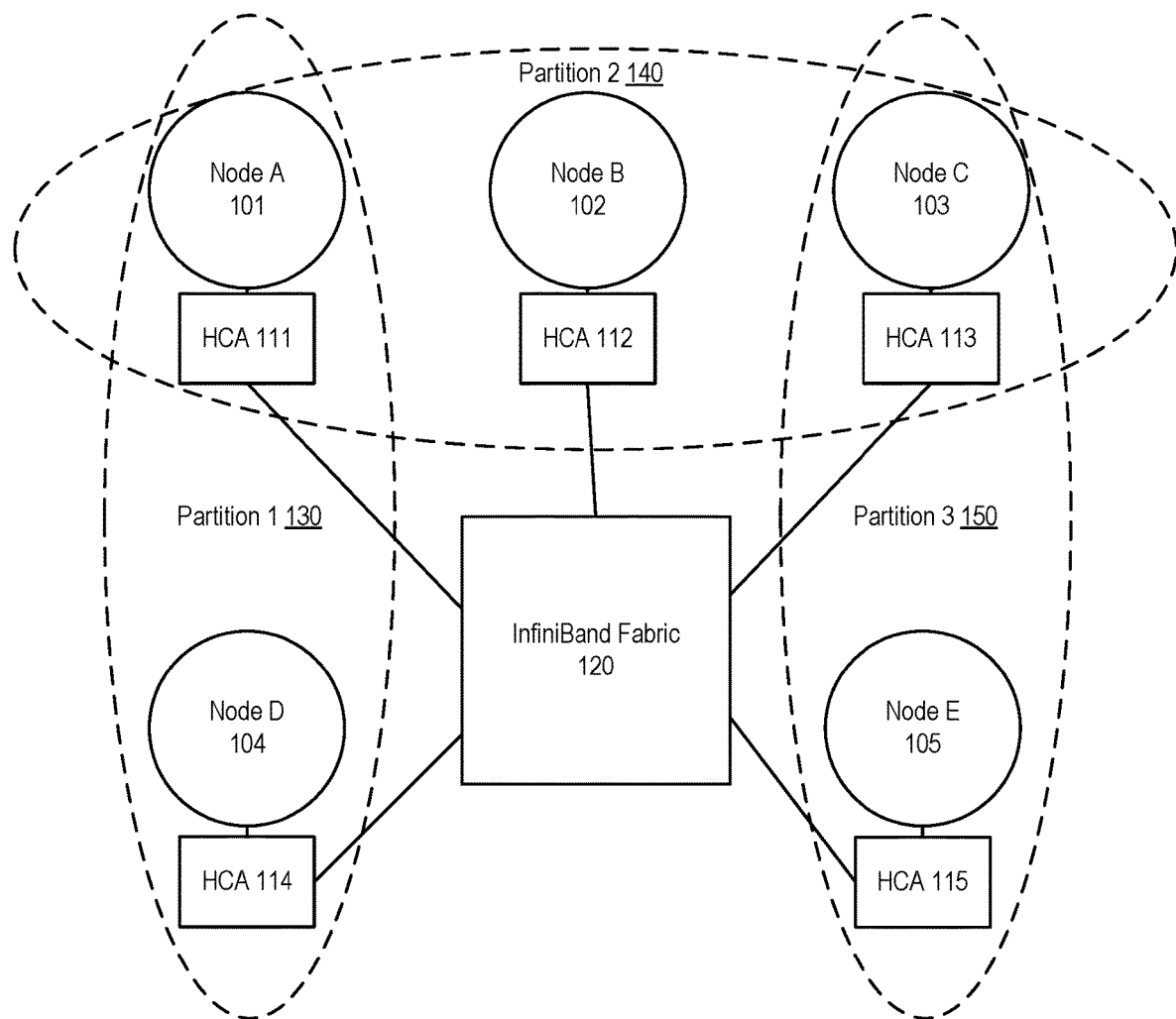
FIG. 2 shows an illustration of a partitioned cluster environment, in accordance with an embodiment

An example of IB partitions is shown in FIG. 2, which shows an illustration of a partitioned cluster environment, in accordance with an embodiment. In the example shown in FIG. 2, nodes A-E, 101-105, use the InfiniBand fabric, 120, to communicate, via the respective host channel adapters 111-115. The nodes A-E are arranged into partitions, namely partition 1, 130, partition 2, 140, and partition 3, 150. Partition 1 comprises node A 101 and node D 104. Partition 2 comprises node A 101, node B 102, and node C 103. Partition 3 comprises node C 103 and node E 105. Because of the arrangement of the partitions, node D 104 and node E 105 are not allowed to communicate as these nodes do not share a partition. Meanwhile, for example, node A 101 and node C 103 are allowed to communicate as these nodes are both members of partition 2, 140.

Virtual Machines in InfiniBand

During the last decade, the prospect of virtualized High Performance Computing (HPC) environments has improved considerably as CPU overhead has been practically removed through hardware virtualization support; memory overhead has been significantly reduced by virtualizing the Memory Management Unit; storage overhead has been reduced by the use of fast SAN storages or distributed networked file systems; and network I/O overhead has been reduced by the use of device passthrough techniques like Single Root Input/Output Virtualization (SR-IOV). It is now possible for clouds to accommodate virtual HPC (vHPC) clusters using high performance interconnect solutions and deliver the necessary performance.

However, when coupled with lossless networks, such as InfiniBand (IB), certain cloud functionality, such as live migration of virtual machines (VMs), still remains an issue due to the complicated addressing and routing schemes used in these solutions. IB is an interconnection network technology offering high bandwidth and low latency, thus, is very well suited for HPC and other communication intensive workloads.

The traditional approach for connecting IB devices to VMs is by utilizing SR-IOV with direct assignment. However, achieving live migration of VMs assigned with IB Host Channel Adapters (HCAs) using SR-IOV has proved to be challenging. Each IB connected node has three different addresses: LID, GUID, and GID. When a live migration happens, one or more of these addresses change. Other nodes communicating with the VM-in-migration can lose connectivity. When this happens, the lost connection can be attempted to be renewed by locating the virtual machine's new address to reconnect to by sending Subnet Administration (SA) path record queries to the IB Subnet Manager (SM).

IB uses three different types of addresses. A first type of address is the 16 bits Local Identifier (LID). At least one unique LID is assigned to each HCA port and each switch by the SM. The LIDs are used to route traffic within a subnet. Since the LID is 16 bits long, 65536 unique address combinations can be made, of which only 49151 (0x0001-0xBFFF) can be used as unicast addresses. Consequently, the number of available unicast addresses defines the maximum size of an IB subnet. A second type of address is the 64 bits Global Unique Identifier (GUID) assigned by the manufacturer to each device (e.g. HCAs and switches) and each HCA port. The SM may assign additional subnet unique GUIDs to an HCA port, which is useful when SR-IOV is used. A third type of address is the 128 bits Global Identifier (GID). The GID is a valid IPv6 unicast address, and at least one is assigned to each HCA port. The GID is formed by combining a globally unique 64 bits prefix assigned by the fabric administrator, and the GUID address of each HCA port.

Fat-Tree (FTree) Topolodies and Routind

In accordance with an embodiment, some of the IB based HPC systems employ a fat-tree topology to take advantage of the useful properties fat-trees offer. These properties include full bisection-bandwidth and inherent fault-tolerance due to the availability of multiple paths between each source destination pair. The initial idea behind fat-trees was to employ fatter links between nodes, with more available bandwidth, as the tree moves towards the roots of the topology. The fatter links can help to avoid congestion in the upper-level switches and the bisection-bandwidth is maintained.

Figure 3:
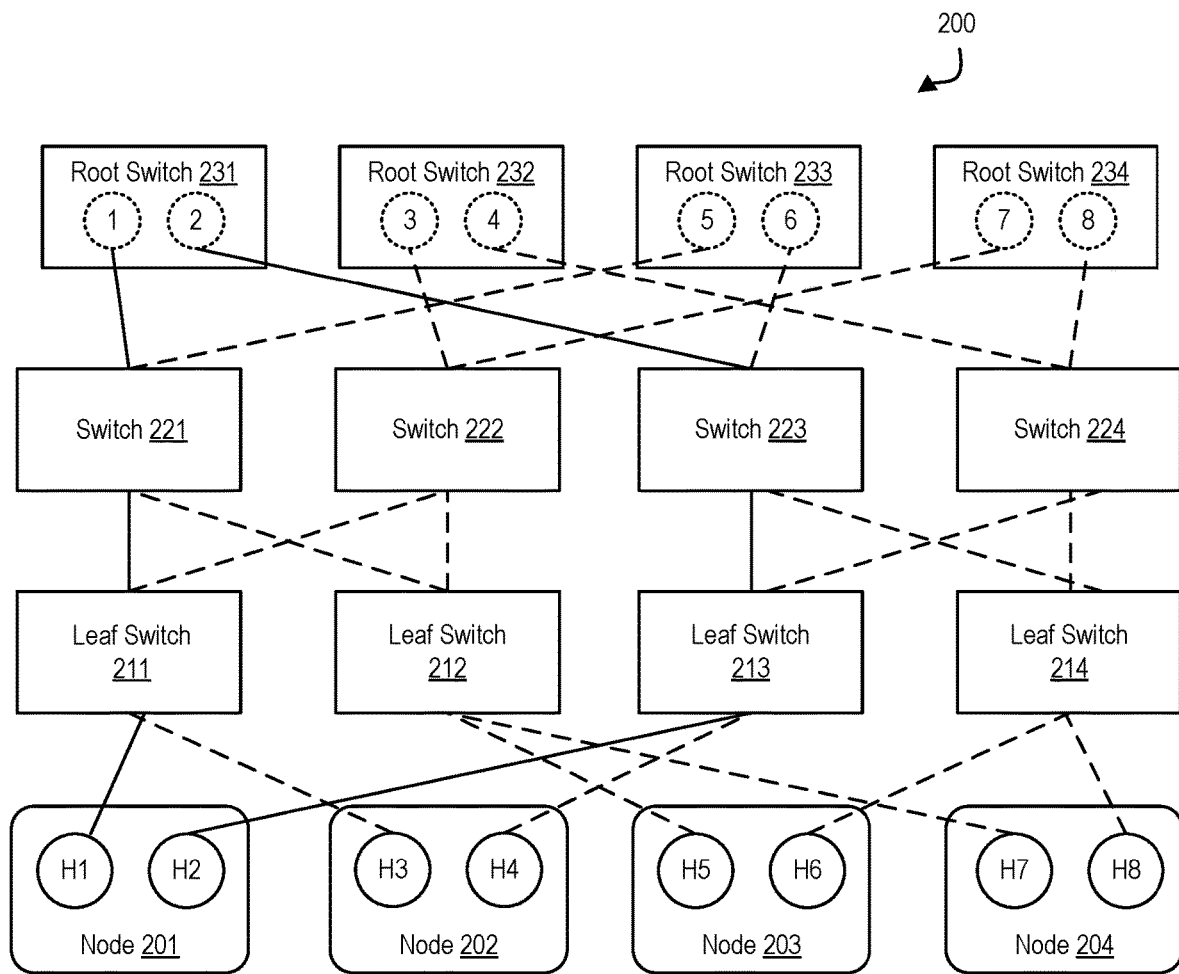
FIG. 3 shows an illustration of a tree topology in a network environment, in accordance with an embodiment.

FIG. 3 shows an illustration of a tree topology in a network environment, in accordance with an embodiment. As shown in FIG. 3, one or more end nodes 201-204 can be connected in a network fabric 200. The network fabric 200 can be based on a fat-tree topology, which includes a plurality of leaf switches 211-214, and multiple spine switches or root switches 231-234. Additionally, the network fabric 200 can include one or more intermediate switches, such as switches 221-224.

Also as shown in FIG. 3, each of the end nodes 201-204 can be a multi-homed node, i.e., a single node that is connected to two or more parts of the network fabric 200 through multiple ports. For example, the node 201 can include the ports H1 and H2, the node 202 can include the ports H3 and H4, the node 203 can include the ports H5 and H6, and the node 204 can include the ports H7 and H8.

Additionally, each switch can have multiple switch ports. For example, the root switch 231 can have the switch ports 1-2, the root switch 232 can have the switch ports 3-4, the root switch 233 can have the switch ports 5-6, and the root switch 234 can have the switch ports 7-8.

In accordance with an embodiment, the fat-tree routing mechanism is one of the most popular routing algorithm for IB based fat-tree topologies. The fat-tree routing mechanism is also implemented in the OFED (Open Fabric Enterprise Distribution—a standard software stack for building and deploying IB based applications) subnet manager, OpenSM.

The fat-tree routing mechanism aims to generate LFTs that evenly spread shortest-path routes across the links in the network fabric. The mechanism traverses the fabric in the indexing order and assigns target LIDs of the end nodes, and thus the corresponding routes, to each switch port. For the end nodes connected to the same leaf switch, the indexing order can depend on the switch port to which the end node is connected (i.e., port numbering sequence). For each port, the mechanism can maintain a port usage counter, and can use this port usage counter to select a least-used port each time a new route is added.

In accordance with an embodiment, in a partitioned subnet, nodes that are not members of a common partition are not allowed to communicate. Practically, this means that some of the routes assigned by the fat-tree routing algorithm are not used for the user traffic. The problem arises when the fat tree routing mechanism generates LFTs for those routes the same way it does for the other functional paths. This behavior can result in degraded balancing on the links, as nodes are routed in the order of indexing. As routing can be performed oblivious to the partitions, fat-tree routed subnets, in general, provide poor isolation among partitions.

In accordance with an embodiment, a Fat-Tree is a hierarchical network topology that can scale with the available network resources. Moreover, Fat-Trees are easy to build using commodity switches placed on different levels of the hierarchy. Different variations of Fat-Trees are commonly available, including k-ary-n-trees, Extended Generalized Fat-Trees (XGFTs), Parallel Ports Generalized Fat-Trees (PGFTs) and Real Life Fat-Trees (RLFTs).

A k-ary-n-tree is an n level Fat-Tree with $k^n$ end nodes and $n \cdot k^{n-1}$ switches, each with 2k ports. Each switch has an equal number of up and down connections in the tree. XGFT Fat-Tree extends k-ary-n-trees by allowing both different number of up and down connections for the switches, and different number of connections at each level in the tree. The PGFT definition further broadens the XGFT topologies and permits multiple connections between switches. A large variety of topologies can be defined using XGFTs and PGFTs. However, for practical purposes, RLFT, which is a restricted version of PGFT, is introduced to define Fat-Trees commonly found in today's HPC clusters. An RLFT uses the same port-count switches at all levels in the Fat-Tree.

Input/Output (I/O) virtualization

In accordance with an embodiment, I/O Virtualization (IOV) can provide availability of I/O by allowing virtual machines (VMs) to access the underlying physical resources. The combination of storage traffic and inter-server communication impose an increased load that may overwhelm the I/O resources of a single server, leading to backlogs and idle processors as they are waiting for data. With the increase in number of I/O requests, IOV can provide availability; and can improve performance, scalability and flexibility of the (virtualized) I/O resources to match the level of performance seen in modern CPU virtualization.

In accordance with an embodiment, IOV is desired as it can allow sharing of I/O resources and provide protected access to the resources from the VMs. IOV decouples a logical device, which is exposed to a VM, from its physical implementation. Currently, there can be different types of IOV technologies, such as emulation, paravirtualization, direct assignment (DA), and single root-I/O virtualization (SR-IOV).

In accordance with an embodiment, one type of IOV technology is software emulation. Software emulation can allow for a decoupled front-end/back-end software architecture. The front-end can be a device driver placed in the VM, communicating with the back-end implemented by a hypervisor to provide I/O access. The physical device sharing ratio is high and live migrations of VMs are possible with just a few milliseconds of network downtime. However, software emulation introduces additional, undesired computational overhead.

In accordance with an embodiment, another type of IOV technology is direct device assignment. Direct device assignment involves a coupling of I/O devices to VMs, with no device sharing between VMs. Direct assignment or device passthrough, provides near to native performance with minimum overhead. The physical device bypasses the hypervisor and is directly attached to the VM. However, a downside of such direct device assignment is limited scalability, as there is no sharing among virtual machines—one physical network card is coupled with one VM.

In accordance with an embodiment, Single Root IOV (SR-IOV) can allow a physical device to appear through hardware virtualization as multiple independent lightweight instances of the same device. These instances can be assigned to VMs as passthrough devices, and accessed as Virtual Functions (VFs). The hypervisor accesses the device through a unique (per device), fully featured Physical Function (PF). SR-IOV eases the scalability issue of pure direct assignment. However, a problem presented by SR-IOV is that it can impair VM migration. Among these IOV technologies, SR-IOV can extend the PCI Express (PCIe) specification with the means to allow direct access to a single physical device from multiple VMs while maintaining near to native performance. Thus, SR-IOV can provide good performance and scalability.

SR-IOV allows a PCIe device to expose multiple virtual devices that can be shared between multiple guests by allocating one virtual device to each guest. Each SR-IOV device has at least one physical function (PF) and one or more associated virtual functions (VF). A PF is a normal PCIe function controlled by the virtual machine monitor (VMM), or hypervisor, whereas a VF is a light-weight PCIe function. Each VF has its own base address (BAR) and is assigned with a unique requester ID that enables I/O memory management unit (IOMMU) to differentiate between the traffic streams to/from different VFs. The IOMMU also apply memory and interrupt translations between the PF and the VFs.

Unfortunately, however, direct device assignment techniques pose a barrier for cloud providers in situations where transparent live migration of virtual machines is desired for data center optimization. The essence of live migration is that the memory contents of a VM are copied to a remote hypervisor. Then the VM is paused at the source hypervisor, and the VM's operation is resumed at the destination. When using software emulation methods, the network interfaces are virtual so their internal states are stored into the memory and get copied as well. Thus the downtime could be brought down to a few milliseconds.

However, migration becomes more difficult when direct device assignment techniques, such as SR-IOV, are used. In such situations, a complete internal state of the network interface cannot be copied as it is tied to the hardware. The SR-IOV VFs assigned to a VM are instead detached, the live migration will run, and a new VF will be attached at the destination. In the case of InfiniBand and SR-IOV, this process can introduce downtime in the order of seconds. Moreover, in an SR-IOV shared port model the addresses of the VM will change after the migration, causing additional overhead in the SM and a negative impact on the performance of the underlying network fabric.

InfiniBand SR-IOV Architecture—Shared Port

There can be different types of SR-IOV models, e.g. a shared port model, a virtual switch model, and a virtual port model.

Figure 4:
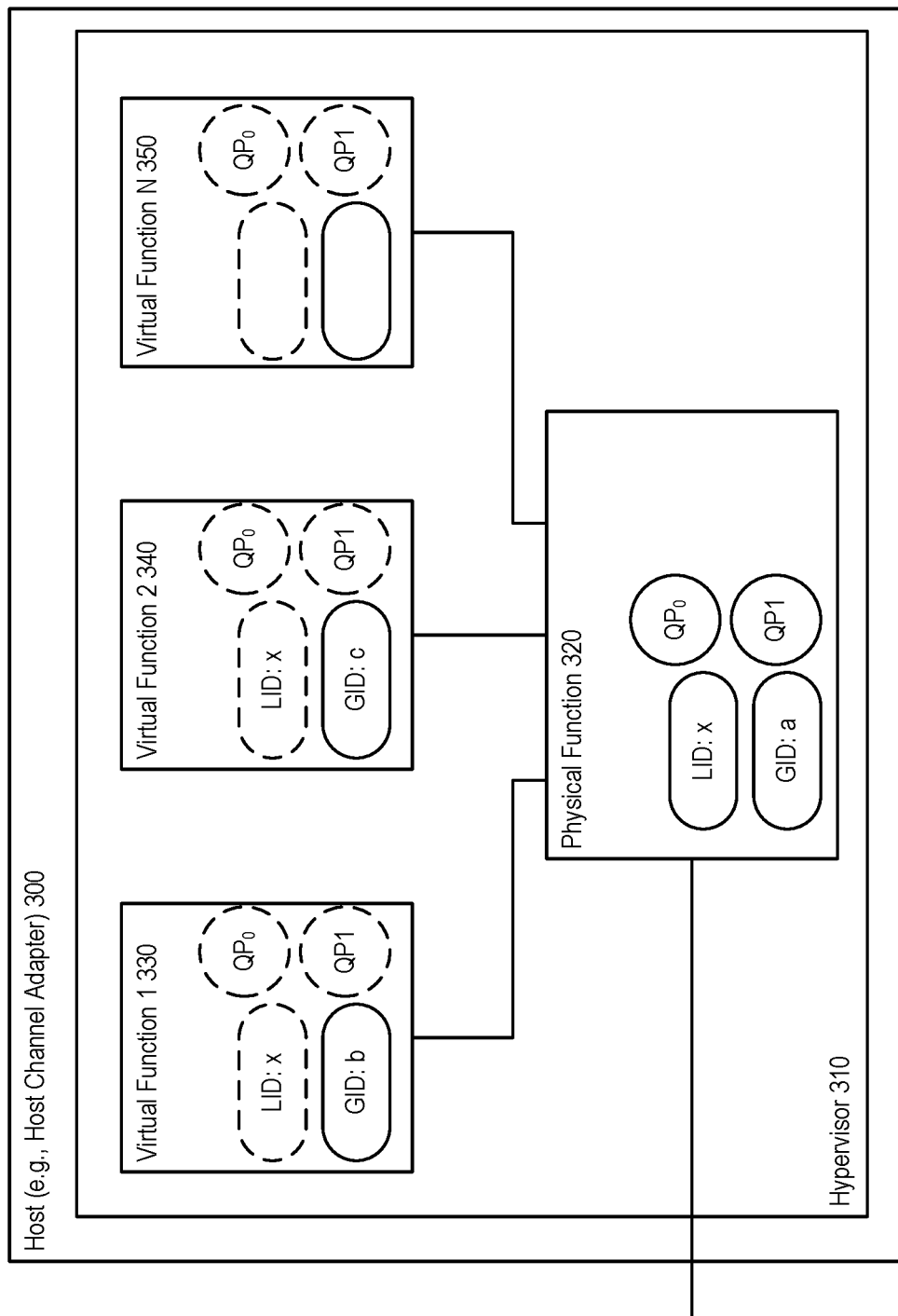
FIG. 4 shows an exemplary shared port architecture, in accordance with an embodiment.

FIG. 4 shows an exemplary shared port architecture, in accordance with an embodiment. As depicted in the figure, a host 300 (e.g., a host channel adapter) can interact with a hypervisor 310, which can assign the various virtual functions 330, 340, 350, to a number of virtual machines. As well, the physical function can be handled by the hypervisor 310.

In accordance with an embodiment, when using a shared port architecture, such as that depicted in FIG. 4, the host, e.g., HCA, appears as a single port in the network with a single shared LID and shared Queue Pair (QP) space between the physical function 320 and the virtual functions 330, 350, 350. However, each function (i.e., physical function and virtual functions) can have their own GID.

As shown in FIG. 4, in accordance with an embodiment, different GIDs can be assigned to the virtual functions and the physical function, and the special queue pairs, QP0 and QP1 (i.e., special purpose queue pairs that are used for InfiniBand management packets), are owned by the physical function. These QPs are exposed to the VFs as well, but the VFs are not allowed to use QP0 (all SMPs coming from VFs towards QP0 are discarded), and QP1 can act as a proxy of the actual QP1 owned by the PF.

In accordance with an embodiment, the shared port architecture can allow for highly scalable data centers that are not limited by the number of VMs (which attach to the network by being assigned to the virtual functions), as the LID space is only consumed by physical machines and switches in the network.

However, a shortcoming of the shared port architecture is the inability to provide transparent live migration, hindering the potential for flexible VM placement. As each LID is associated with a specific hypervisor, and shared among all VMs residing on the hypervisor, a migrating VM (i.e., a virtual machine migrating to a destination hypervisor) has to have its LID changed to the LID of the destination hypervisor. Furthermore, as a consequence of the restricted QP0 access, a subnet manager cannot run inside a VM.

InfiniBand SR-IOV Architecture Models—Virtual Switch (vSwitch)

Figure 5:
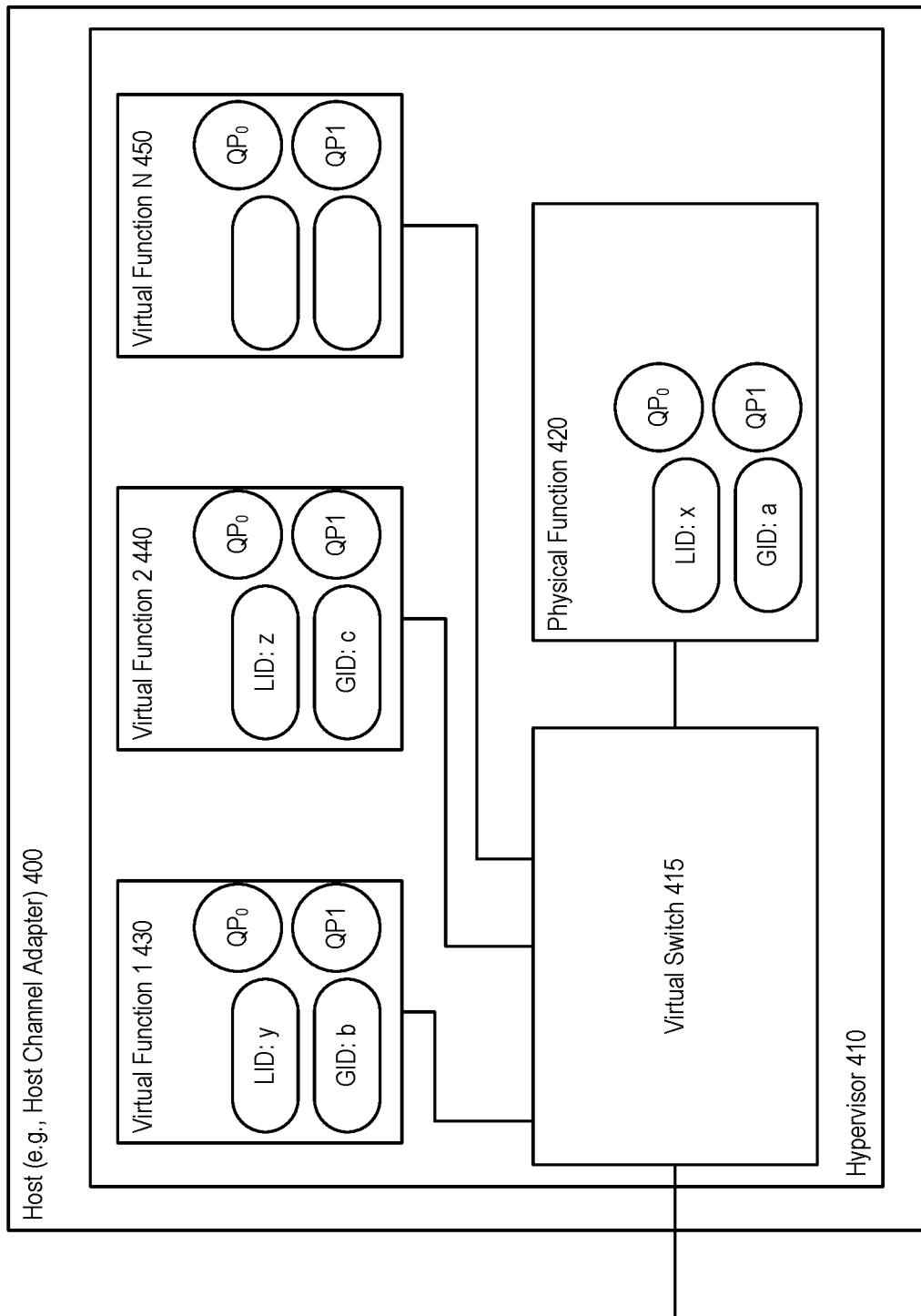
FIG. 5 shows an exemplary vSwitch architecture, in accordance with an embodiment.

FIG. 5 shows an exemplary vSwitch architecture, in accordance with an embodiment. As depicted in the figure, a host 400 (e.g., a host channel adapter) can interact with a hypervisor 410, which can assign the various virtual functions 430, 440, 450, to a number of virtual machines. As well, the physical function can be handled by the hypervisor 410. A virtual switch 415 can also be handled by the hypervisor 401.

In accordance with an embodiment, in a vSwitch architecture each virtual function 430, 440, 450 is a complete virtual Host Channel Adapter (vHCA), meaning that the VM assigned to a VF is assigned a complete set of IB addresses (e.g., GID, GUID, LID) and a dedicated QP space in the hardware. For the rest of the network and the SM, the HCA 400 looks like a switch, via the virtual switch 415, with additional nodes connected to it. The hypervisor 410 can use the PF 420, and the VMs (attached to the virtual functions) use the VFs.

In accordance with an embodiment, a vSwitch architecture provide transparent virtualization. However, because each virtual function is assigned a unique LID, the number of available LIDs gets consumed rapidly. As well, with many LID addresses in use (i.e., one each for each physical function and each virtual function), more communication paths have to be computed by the SM and more Subnet Management Packets (SMPs) have to be sent to the switches in order to update their LFTs. For example, the computation of the communication paths might take several minutes in large networks. Because LID space is limited to 49151 unicast LIDs, and as each VM (via a VF), physical node, and switch occupies one LID each, the number of physical nodes and switches in the network limits the number of active VMs, and vice versa.

InfiniBand SR-IOV Architecture Models—Virtual Port (vPort)

Figure 6:
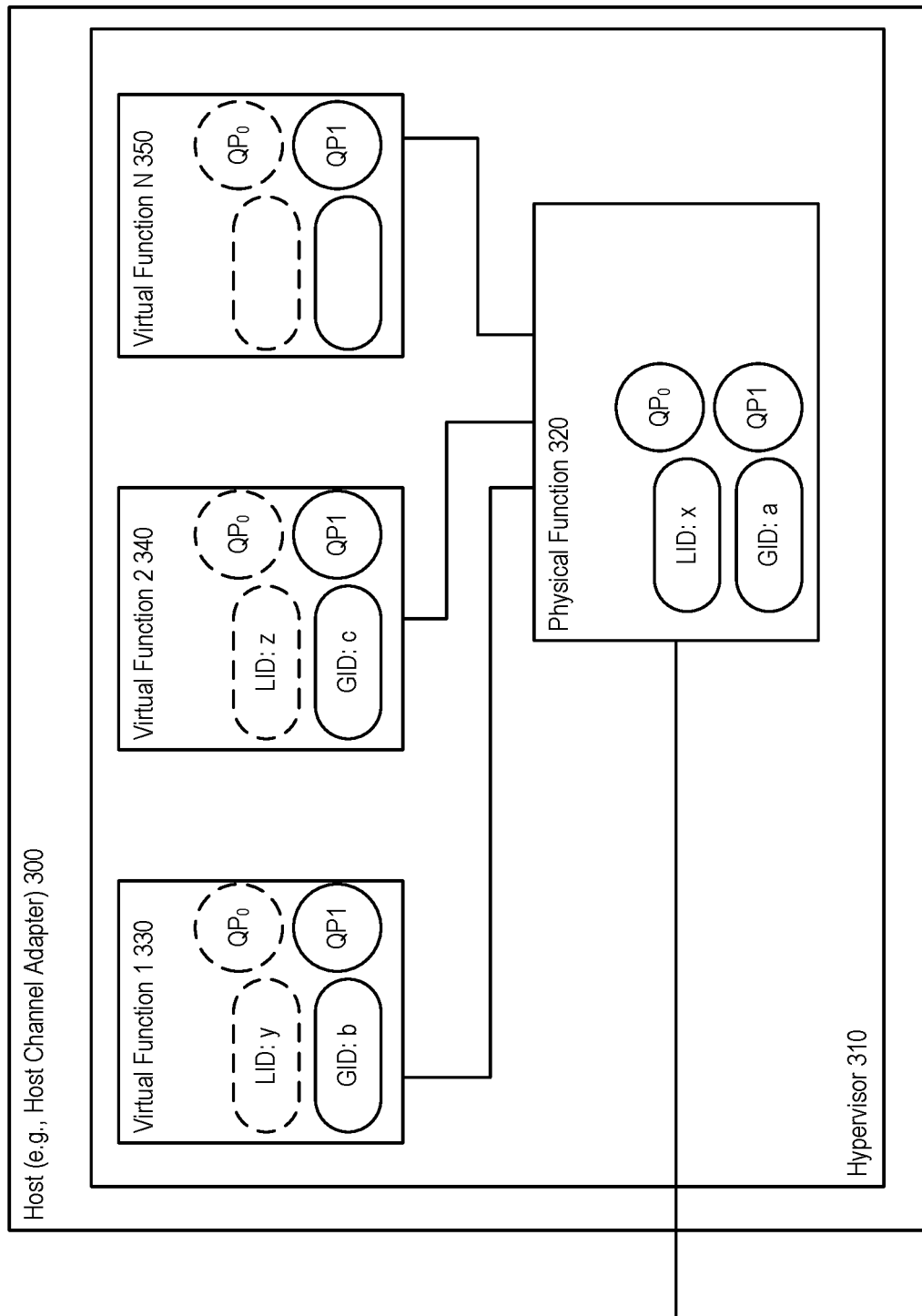
FIG. 6 shows an exemplary vPort architecture, in accordance with an embodiment.

FIG. 6 shows an exemplary vPort concept, in accordance with an embodiment. As depicted in the figure, a host 300 (e.g., a host channel adapter) can interact with a hypervisor 410, which can assign the various virtual functions 330, 340, 350, to a number of virtual machines. As well, the physical function can be handled by the hypervisor 310.

In accordance with an embodiment, the vPort concept is loosely defined in order to give freedom of implementation to vendors (e.g. the definition does not rule that the implementation has to be SRIOV specific), and a goal of the vPort is to standardize the way VMs are handled in subnets. With the vPort concept, both SR-IOV Shared-Port-like and vSwitch-like architectures or a combination of both, that can be more scalable in both the space and performance domains, can be defined. A vPort supports optional LIDs, and unlike the Shared-Port, the SM is aware of all the vPorts available in a subnet even if a vPort is not using a dedicated LID.

InfiniBand SR-IOV Architecture Models—vSwitch with Prepopulated LIDs

In accordance with an embodiment, the present disclosure provides a system and method for providing a vSwitch architecture with prepopulated LIDs.

Figure 7:
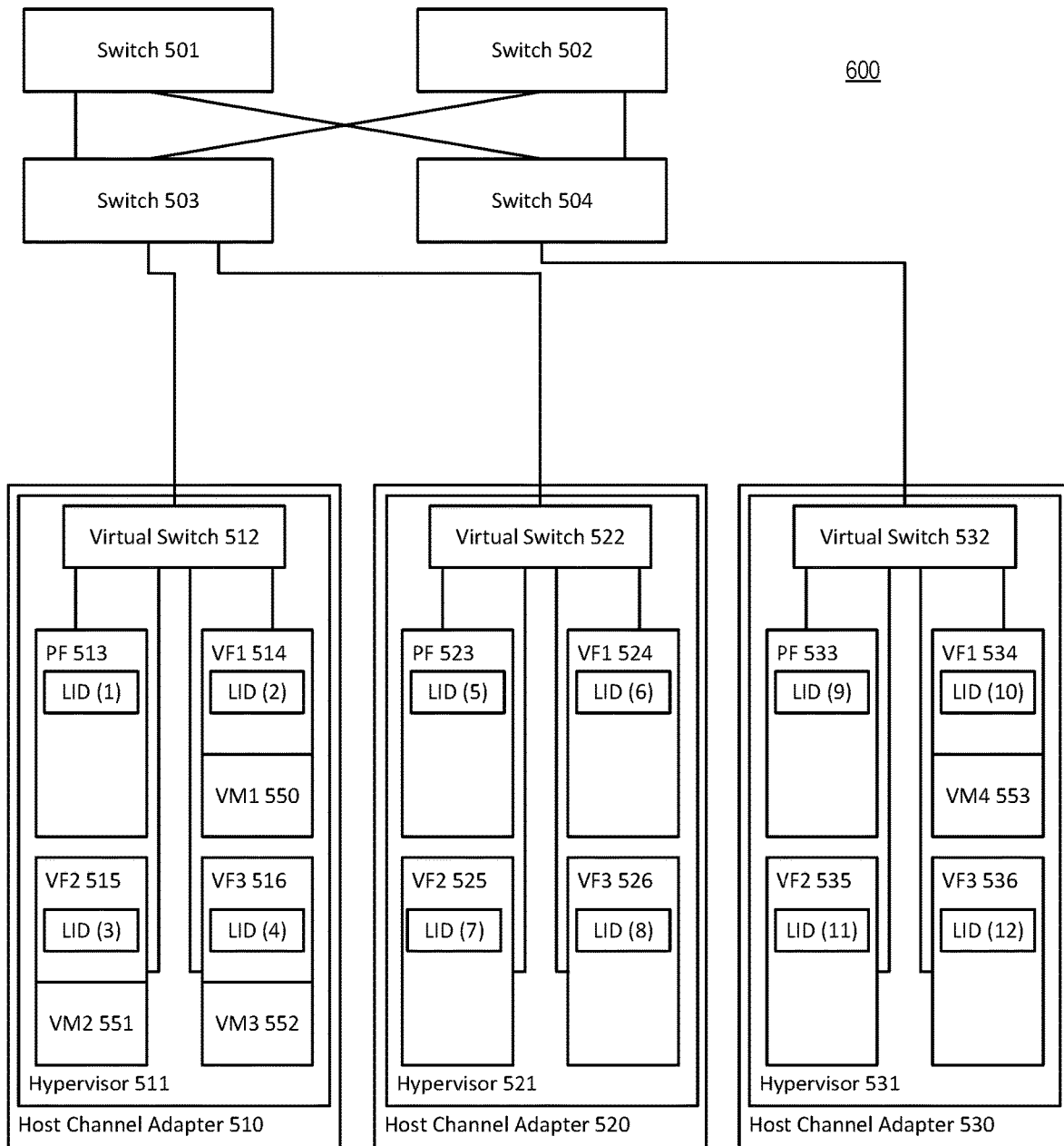
FIG. 7 shows an exemplary vSwitch architecture with prepopulated LIDs, in accordance with an embodiment.

FIG. 7 shows an exemplary vSwitch architecture with prepopulated LIDs, in accordance with an embodiment. As depicted in the figure, a number of switches 501-504 can provide communication within the network switched environment 600 (e.g., an IB subnet) between members of a fabric, such as an InfiniBand fabric. The fabric can include a number of hardware devices, such as host channel adapters 510, 520, 530. Each of the host channel adapters 510, 520, 530, can in turn interact with a hypervisor 511, 521, and 531, respectively. Each hypervisor can, in turn, in conjunction with the host channel adapter it interacts with, setup and assign a number of virtual functions 514, 515, 516, 524, 525, 526, 534, 535, 536, to a number of virtual machines. For example, virtual machine 1 550 can be assigned by the hypervisor 511 to virtual function 1 514. Hypervisor 511 can additionally assign virtual machine 2 551 to virtual function 2 515, and virtual machine 3 552 to virtual function 3 516. Hypervisor 531 can, in turn, assign virtual machine 4 553 to virtual function 1 534. The hypervisors can access the host channel adapters through a fully featured physical function 513, 523, 533, on each of the host channel adapters.

In accordance with an embodiment, each of the switches 501-504 can comprise a number of ports (not shown), which are used in setting a linear forwarding table in order to direct traffic within the network switched environment 600.

In accordance with an embodiment, the virtual switches 512, 522, and 532, can be handled by their respective hypervisors 511, 521, 531. In such a vSwitch architecture each virtual function is a complete virtual Host Channel Adapter (vHCA), meaning that the VM assigned to a VF is assigned a complete set of IB addresses (e.g., GID, GUID, LID) and a dedicated QP space in the hardware. For the rest of the network and the SM (not shown), the HCAs 510, 520, and 530 look like a switch, via the virtual switches, with additional nodes connected to them.

In accordance with an embodiment, the present disclosure provides a system and method for providing a vSwitch architecture with prepopulated LIDs. Referring to FIG. 7, the LIDs are prepopulated to the various physical functions 513, 523, 533, as well as the virtual functions 514-516, 524-526, 534-536 (even those virtual functions not currently associated with an active virtual machine). For example, physical function 513 is prepopulated with LID 1, while virtual function 1 534 is prepopulated with LID 10. The LIDs are prepopulated in an SR-IOV vSwitch-enabled subnet when the network is booted. Even when not all of the VFs are occupied by VMs in the network, the populated VFs are assigned with a LID as shown in FIG. 7.

In accordance with an embodiment, much like physical host channel adapters can have more than one port (two ports are common for redundancy), virtual HCAs can also be represented with two ports and be connected via one, two or more virtual switches to the external IB subnet.

In accordance with an embodiment, in a vSwitch architecture with prepopulated LIDs, each hypervisor can consume one LID for itself through the PF and one more LID for each additional VF. The sum of all the VFs available in all hypervisors in an IB subnet, gives the maximum amount of VMs that are allowed to run in the subnet. For example, in an IB subnet with 16 virtual functions per hypervisor in the subnet, then each hypervisor consumes 17 LIDs (one LID for each of the 16 virtual functions plus one LID for the physical function) in the subnet. In such an IB subnet, the theoretical hypervisor limit for a single subnet is ruled by the number of available unicast LIDs and is: 2891 (49151 available LIDs divided by 17 LIDs per hypervisor), and the total number of VMs (i.e., the limit) is 46256 (2891 hypervisors times 16 VFs per hypervisor). (In actuality, these numbers are actually smaller since each switch, router, or dedicated SM node in the IB subnet consumes a LID as well). Note that the vSwitch does not need to occupy an additional LID as it can share the LID with the PF In accordance with an embodiment, in a vSwitch architecture with prepopulated LIDs, communication paths are computed for all the LIDs the first time the network is booted. When a new VM needs to be started the system does not have to add a new LID in the subnet, an action that would otherwise cause a complete reconfiguration of the network, including path recalculation, which is the most time consuming part. Instead, an available port for a VM is located (i.e., an available virtual function) in one of the hypervisors and the virtual machine is attached to the available virtual function.

In accordance with an embodiment, a vSwitch architecture with prepopulated LIDs also allows for the ability to calculate and use different paths to reach different VMs hosted by the same hypervisor. Essentially, this allows for such subnets and networks to use a LID Mask Control (LMC) like feature to provide alternative paths towards one physical machine, without being bound by the limitation of the LMC that requires the LIDs to be sequential. The freedom to use non-sequential LIDs is particularly useful when a VM needs to be migrated and carry its associated LID to the destination.

In accordance with an embodiment, along with the benefits shown above of a vSwitch architecture with prepopulated LIDs, certain considerations can be taken into account. For example, because the LIDs are prepopulated in an SR-IOV vSwitch-enabled subnet when the network is booted, the initial path computation (e.g., on boot-up) can take longer than if the LIDs were not pre-populated.

InfiniBand SR-IOV Architecture Models—vSwitch with Dynamic LID Assignment

In accordance with an embodiment, the present disclosure provides a system and method for providing a vSwitch architecture with dynamic LID assignment.

Figure 8:
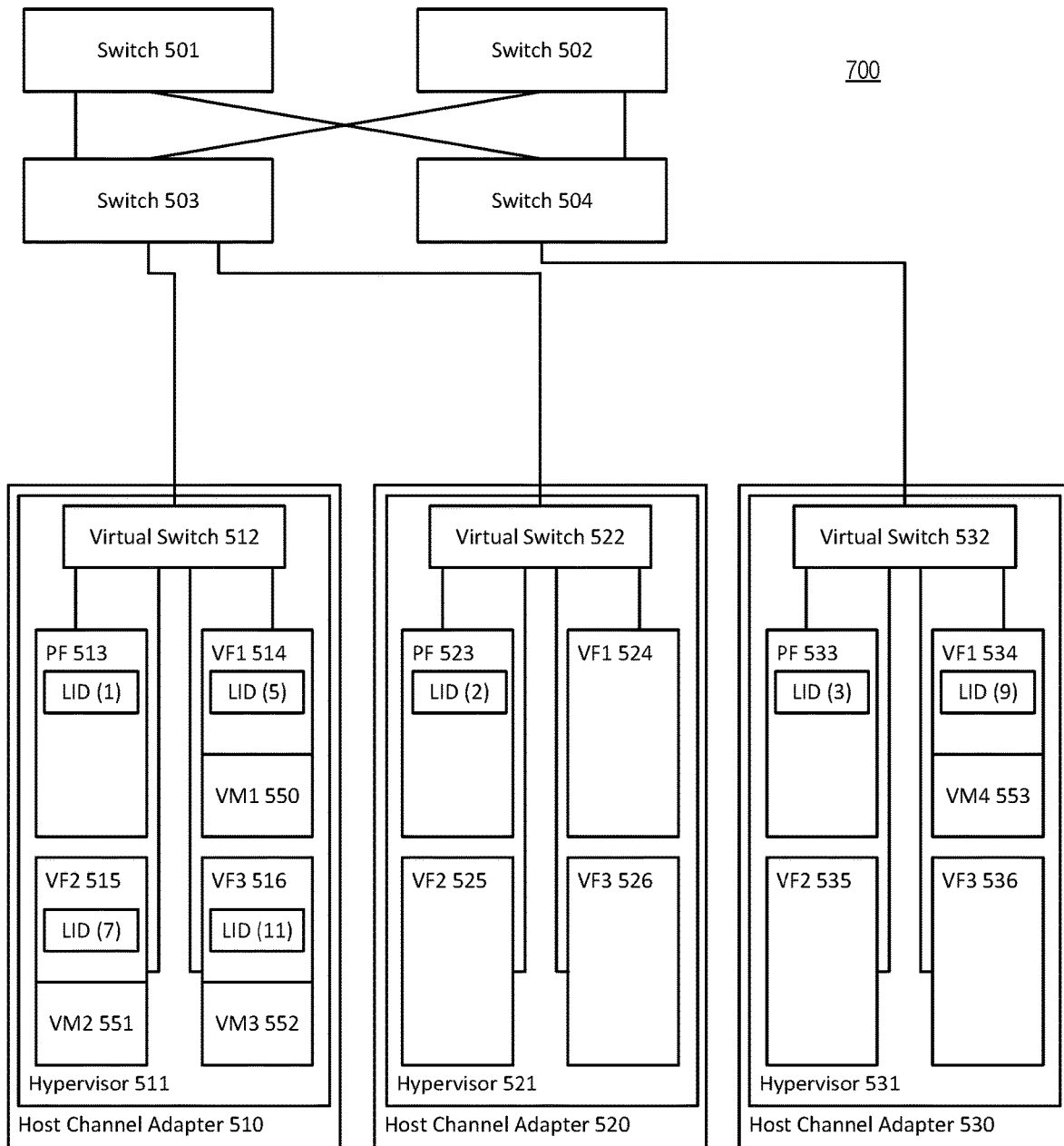
FIG. 8 shows an exemplary vSwitch architecture with dynamic LID assignment, in accordance with an embodiment.

FIG. 8 shows an exemplary vSwitch architecture with dynamic LID assignment, in accordance with an embodiment. As depicted in the figure, a number of switches 501-504 can provide communication within the network switched environment 700 (e.g., an IB subnet) between members of a fabric, such as an InfiniBand fabric. The fabric can include a number of hardware devices, such as host channel adapters 510, 520, 530. Each of the host channel adapters 510, 520, 530, can in turn interact with a hypervisor 511, 521, 531, respectively. Each hypervisor can, in turn, in conjunction with the host channel adapter it interacts with, setup and assign a number of virtual functions 514, 515, 516, 524, 525, 526, 534, 535, 536, to a number of virtual machines. For example, virtual machine 1 550 can be assigned by the hypervisor 511 to virtual function 1 514. Hypervisor 511 can additionally assign virtual machine 2 551 to virtual function 2 515, and virtual machine 3 552 to virtual function 3 516. Hypervisor 531 can, in turn, assign virtual machine 4 553 to virtual function 1 534. The hypervisors can access the host channel adapters through a fully featured physical function 513, 523, 533, on each of the host channel adapters.

In accordance with an embodiment, each of the switches 501-504 can comprise a number of ports (not shown), which are used in setting a linear forwarding table in order to direct traffic within the network switched environment 700.

In accordance with an embodiment, the virtual switches 512, 522, and 532, can be handled by their respective hypervisors 511, 521, 531. In such a vSwitch architecture each virtual function is a complete virtual Host Channel Adapter (vHCA), meaning that the VM assigned to a VF is assigned a complete set of IB addresses (e.g., GID, GUID, LID) and a dedicated QP space in the hardware. For the rest of the network and the SM (not shown), the HCAs 510, 520, and 530 look like a switch, via the virtual switches, with additional nodes connected to them.

In accordance with an embodiment, the present disclosure provides a system and method for providing a vSwitch architecture with dynamic LID assignment. Referring to FIG. 8, the LIDs are dynamically assigned to the various physical functions 513, 523, 533, with physical function 513 receiving LID 1, physical function 523 receiving LID 2, and physical function 533 receiving LID 3. Those virtual functions that are associated with an active virtual machine can also receive a dynamically assigned LID. For example, because virtual machine 1 550 is active and associated with virtual function 1 514, virtual function 514 can be assigned LID 5. Likewise, virtual function 2 515, virtual function 3 516, and virtual function 1 534 are each associated with an active virtual function. Because of this, these virtual functions are assigned LIDs, with LID 7 being assigned to virtual function 2 515, LID 11 being assigned to virtual function 3 516, and LID 9 being assigned to virtual function 1 534. Unlike vSwitch with prepopulated LIDs, those virtual functions not currently associated with an active virtual machine do not receive a LID assignment.

In accordance with an embodiment, with the dynamic LID assignment, the initial path computation can be substantially reduced. When the network is booting for the first time and no VMs are present then a relatively small number of LIDs can be used for the initial path calculation and LFT distribution.

In accordance with an embodiment, much like physical host channel adapters can have more than one port (two ports are common for redundancy), virtual HCAs can also be represented with two ports and be connected via one, two or more virtual switches to the external IB subnet.

In accordance with an embodiment, when a new VM is created in a system utilizing vSwitch with dynamic LID assignment, a free VM slot is found in order to decide on which hypervisor to boot the newly added VM, and a unique non-used unicast LID is found as well. However, there are no known paths in the network and the LFTs of the switches for handling the newly added LID. Computing a new set of paths in order to handle the newly added VM is not desirable in a dynamic environment where several VMs may be booted every minute. In large IB subnets, computing a new set of routes can take several minutes, and this procedure would have to repeat each time a new VM is booted.

Advantageously, in accordance with an embodiment, because all the VFs in a hypervisor share the same uplink with the PF, there is no need to compute a new set of routes. It is only needed to iterate through the LFTs of all the physical switches in the network, copy the forwarding port from the LID entry that belongs to the PF of the hypervisor—where the VM is created—to the newly added LID, and send a single SMP to update the corresponding LFT block of the particular switch. Thus the system and method avoids the need to compute a new set of routes.

In accordance with an embodiment, the LIDs assigned in the vSwitch with dynamic LID assignment architecture do not have to be sequential. When comparing the LIDs assigned on VMs on each hypervisor in vSwitch with prepopulated LIDs versus vSwitch with dynamic LID assignment, it is notable that the LIDs assigned in the dynamic LID assignment architecture are non-sequential, while those prepopulated in are sequential in nature. In the vSwitch dynamic LID assignment architecture, when a new VM is created, the next available LID is used throughout the lifetime of the VM. Conversely, in a vSwitch with prepopulated LIDs, each VM inherits the LID that is already assigned to the corresponding VF, and in a network without live migrations, VMs consecutively attached to a given VF get the same LID.

In accordance with an embodiment, the vSwitch with dynamic LID assignment architecture can resolve the drawbacks of the vSwitch with prepopulated LIDs architecture model at a cost of some additional network and runtime SM overhead. Each time a VM is created, the LFTs of the physical switches in the subnet are updated with the newly added LID associated with the created VM. One subnet management packet (SMP) per switch is needed to be sent for this operation. The LMC-like functionality is also not available, because each VM is using the same path as its host hypervisor. However, there is no limitation on the total amount of VFs present in all hypervisors, and the number of VFs may exceed that of the unicast LID limit. Of course, not all of the VFs are allowed to be attached on active VMs simultaneously if this is the case, but having more spare hypervisors and VFs adds flexibility for disaster recovery and optimization of fragmented networks when operating close to the unicast LID limit.

Figure 9:
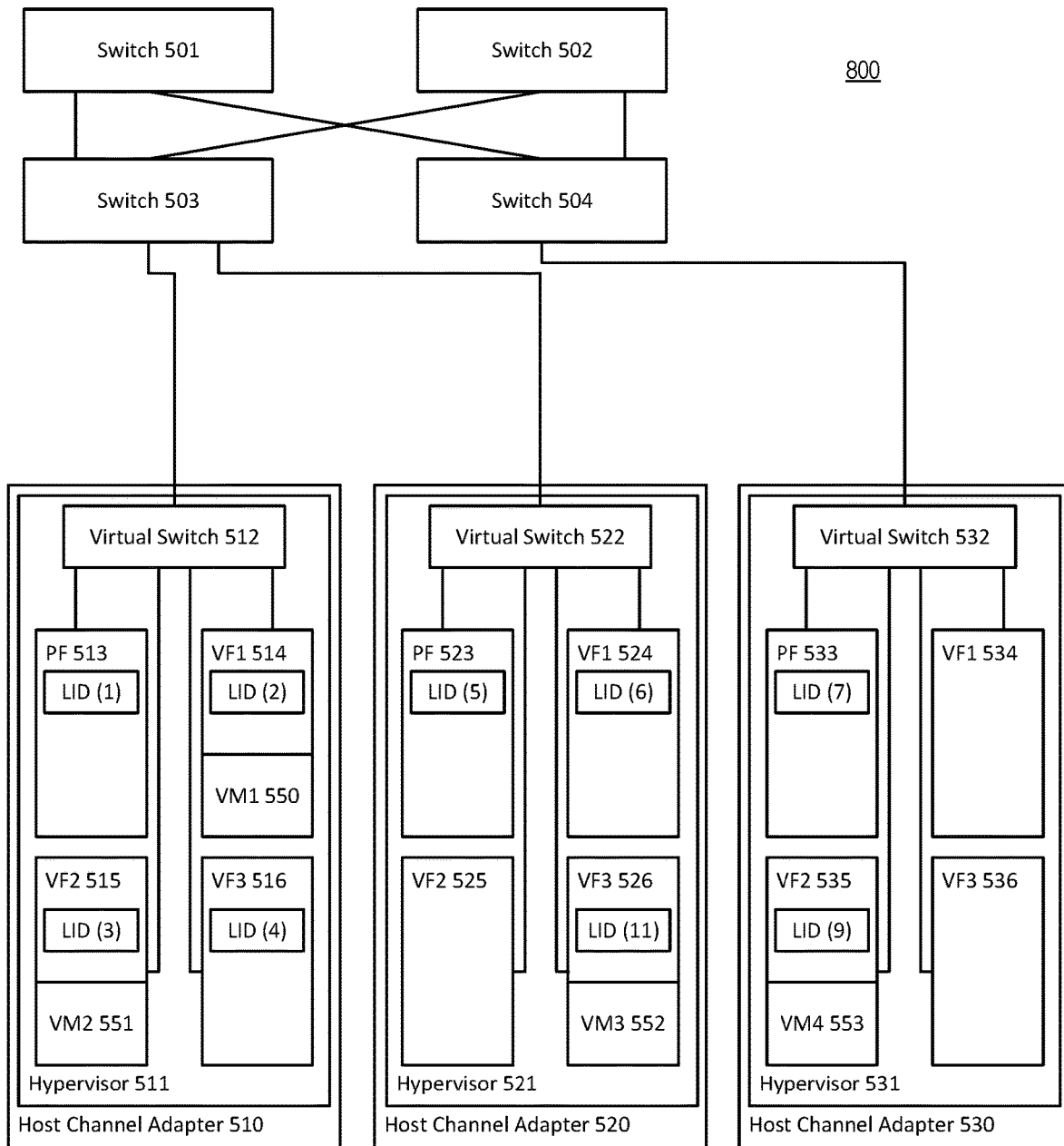
FIG. 9 shows an exemplary vSwitch architecture with vSwitch with dynamic LID assignment and prepopulated LIDs, in accordance with an embodiment.

InfiniBand SR-IOV Architecture Models—vSwitch with Dynamic LID Assignment and Prepopulated LIDs FIG. 9 shows an exemplary vSwitch architecture with vSwitch with dynamic LID assignment and prepopulated LIDs, in accordance with an embodiment. As depicted in the figure, a number of switches 501-504 can provide communication within the network switched environment 800 (e.g., an IB subnet) between members of a fabric, such as an InfiniBand fabric. The fabric can include a number of hardware devices, such as host channel adapters 510, 520, 530. Each of the host channel adapters 510, 520, 530, can in turn interact with a hypervisor 511, 521, and 531, respectively. Each hypervisor can, in turn, in conjunction with the host channel adapter it interacts with, setup and assign a number of virtual functions 514, 515, 516, 524, 525, 526, 534, 535, 536, to a number of virtual machines. For example, virtual machine 1 550 can be assigned by the hypervisor 511 to virtual function 1 514. Hypervisor 511 can additionally assign virtual machine 2 551 to virtual function 2 515. Hypervisor 521 can assign virtual machine 3 552 to virtual function 3 526. Hypervisor 531 can, in turn, assign virtual machine 4 553 to virtual function 2 535. The hypervisors can access the host channel adapters through a fully featured physical function 513, 523, 533, on each of the host channel adapters.

In accordance with an embodiment, each of the switches 501-504 can comprise a number of ports (not shown), which are used in setting a linear forwarding table in order to direct traffic within the network switched environment 800.

In accordance with an embodiment, the virtual switches 512, 522, and 532, can be handled by their respective hypervisors 511, 521, 531. In such a vSwitch architecture each virtual function is a complete virtual Host Channel Adapter (vHCA), meaning that the VM assigned to a VF is assigned a complete set of IB addresses (e.g., GID, GUID, LID) and a dedicated QP space in the hardware. For the rest of the network and the SM (not shown), the HCAs 510, 520, and 530 look like a switch, via the virtual switches, with additional nodes connected to them.

In accordance with an embodiment, the present disclosure provides a system and method for providing a hybrid vSwitch architecture with dynamic LID assignment and prepopulated LIDs. Referring to FIG. 9, hypervisor 511 can be arranged with vSwitch with prepopulated LIDs architecture, while hypervisor 521 can be arranged with vSwitch with prepopulated LIDs and dynamic LID assignment. Hypervisor 531 can be arranged with vSwitch with dynamic LID assignment. Thus, the physical function 513 and virtual functions 514-516 have their LIDs prepopulated (i.e., even those virtual functions not attached to an active virtual machine are assigned a LID). Physical function 523 and virtual function 1 524 can have their LIDs prepopulated, while virtual function 2 and 3, 525 and 526, have their LIDs dynamically assigned (i.e., virtual function 2 525 is available for dynamic LID assignment, and virtual function 3 526 has a LID of 11 dynamically assigned as virtual machine 3 552 is attached). Finally, the functions (physical function and virtual functions) associated with hypervisor 3 531 can have their LIDs dynamically assigned. This results in virtual functions 1 and 3, 534 and 536, are available for dynamic LID assignment, while virtual function 2 535 has LID of 9 dynamically assigned as virtual machine 4 553 is attached there.

In accordance with an embodiment, such as that depicted in FIG. 9, where both vSwitch with prepopulated LIDs and vSwitch with dynamic LID assignment are utilized (independently or in combination within any given hypervisor), the number of prepopulated LIDs per host channel adapter can be defined by a fabric administrator and can be in the range of 0<=prepopulated VFs<=Total VFs (per host channel adapter), and the VFs available for dynamic LID assignment can be found by subtracting the number of prepopulated VFs from the total number of VFs (per host channel adapter).

In accordance with an embodiment, much like physical host channel adapters can have more than one port (two ports are common for redundancy), virtual HCAs can also be represented with two ports and be connected via one, two or more virtual switches to the external IB subnet.

InfiniBand—Inter-Subnet Communication (Fabric Manager)

In accordance with an embodiment, in addition to providing an InfiniBand fabric within a single subnet, embodiments of the current disclosure can also provide for an InfiniBand fabric that spans two or more subnets.

Figure 10:
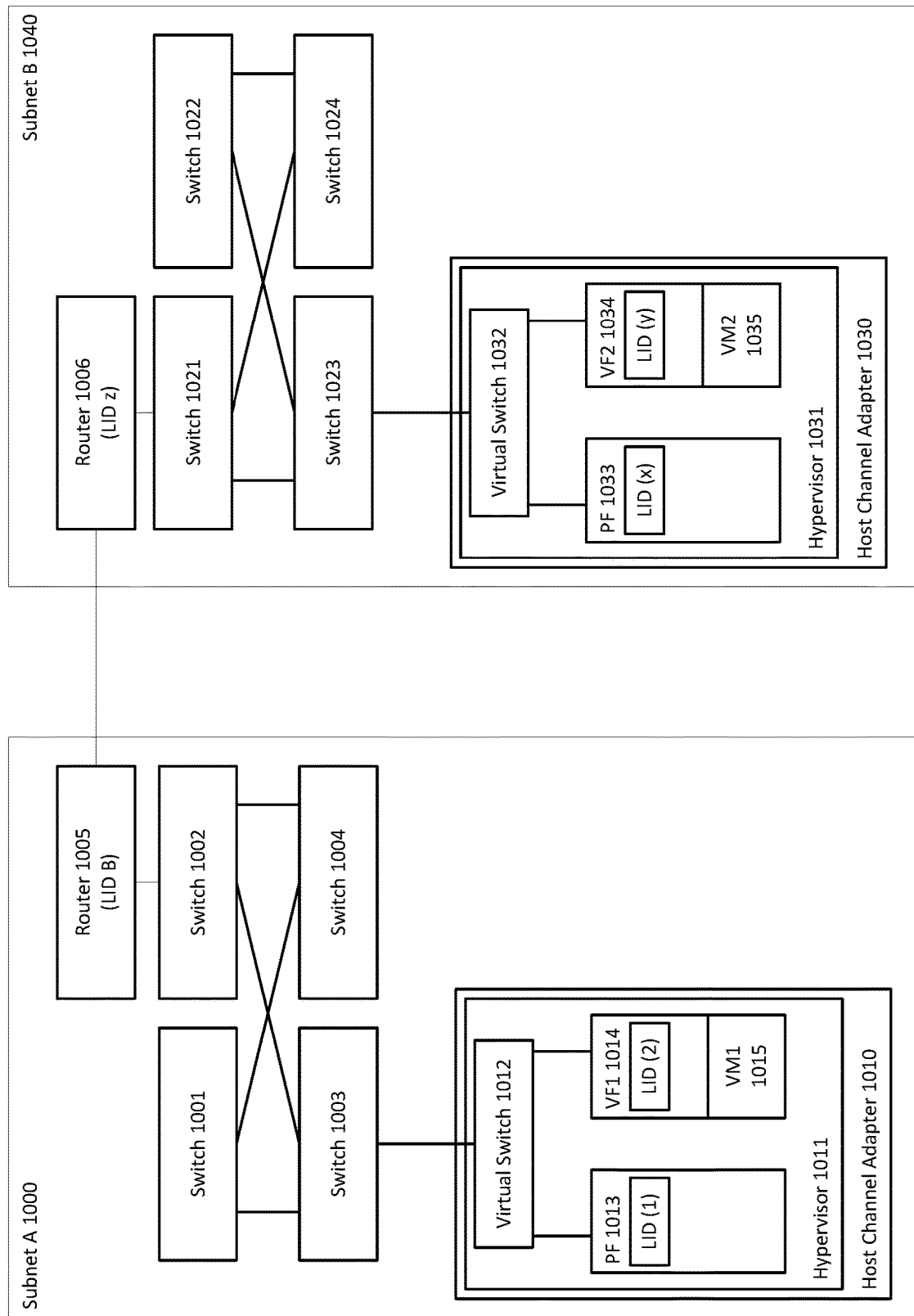
FIG. 10 shows an exemplary multi-subnet InfiniBand fabric, in accordance with an embodiment.

FIG. 10 shows an exemplary multi-subnet InfiniBand fabric, in accordance with an embodiment. As depicted in the figure, within subnet A 1000, a number of switches 1001-1004 can provide communication within subnet A 1000 (e.g., an IB subnet) between members of a fabric, such as an InfiniBand fabric. The fabric can include a number of hardware devices, such as, for example, channel adapter 1010. Host channel adapter 1010 can in turn interact with a hypervisor 1011. The hypervisor can, in turn, in conjunction with the host channel adapter it interacts with, setup a number of virtual functions 1014. The hypervisor can additionally assign virtual machines to each of the virtual functions, such as virtual machine 1 1015 being assigned to virtual function 1 1014. The hypervisor can access their associated host channel adapters through a fully featured physical function, such as physical function 1013, on each of the host channel adapters. Within subnet B 1040, a number of switches 1021-1024 can provide communication within subnet B 1040 (e.g., an IB subnet) between members of a fabric, such as an InfiniBand fabric. The fabric can include a number of hardware devices, such as, for example, channel adapter 1030. Host channel adapter 1030 can in turn interact with a hypervisor 1031. The hypervisor can, in turn, in conjunction with the host channel adapter it interacts with, setup a number of virtual functions 1034. The hypervisor can additionally assign virtual machines to each of the virtual functions, such as virtual machine 2 1035 being assigned to virtual function 2 1034. The hypervisor can access their associated host channel adapters through a fully featured physical function, such as physical function 1033, on each of the host channel adapters. It is noted that although only one host channel adapter is shown within each subnet (i.e., subnet A and subnet B), it is to be understood that a plurality of host channel adapters, and their corresponding components, can be included within each subnet.

In accordance with an embodiment, each of the host channel adapters can additionally be associated with a virtual switch, such as virtual switch 1012 and virtual switch 1032, and each HCA can be set up with a different architecture model, as discussed above. Although both subnets within FIG. 10 are shown as using a vSwitch with prepopulated LID architecture model, this is not meant to imply that all such subnet configurations can follow a similar architecture model.

In accordance with an embodiment, at least one switch within each subnet can be associated with a router, such as switch 1002 within subnet A 1000 being associated with router 1005, and switch 1021 within subnet B 1040 being associated with router 1006.

In accordance with an embodiment, at least one device (e.g., a switch, a node . . . etc.) can be associated with a fabric manager (not shown). The fabric manager can be used, for example, to discover inter-subnet fabric topology, create a fabric profile (e.g., a virtual machine fabric profile), build virtual machine related database objects that forms the basis for building a virtual machine fabric profile. In addition, the fabric manager can define legal inter-subnet connectivity in terms of which subnets are allowed to communicate via which router ports using which partition numbers.

In accordance with an embodiment, when traffic at an originating source, such as virtual machine 1 within subnet A, is addressed to a destination in a different subnet, such as virtual machine 2 within subnet B, the traffic can be addressed to the router within subnet A, i.e., router 1005, which can then pass the traffic to subnet B via its link with router 1006.

Virtual Dual Port Router

In accordance with an embodiment, a dual port router abstraction can provide a simple way for enabling subnet-to-subnet router functionality to be defined based on a switch hardware implementation that has the ability to do GRH (global route header) to LRH (local route header) conversion in addition to performing normal LRH based switching.

In accordance with an embodiment, a virtual dual-port router can logically be connected outside a corresponding switch port. This virtual dual-port router can provide an InfiniBand specification compliant view to a standard management entity, such as a Subnet Manager.

In accordance with an embodiment, a dual-ported router model implies that different subnets can be connected in a way where each subnet fully controls the forwarding of packets as well as address mappings in the ingress path to the subnet, and without impacting the routing and logical connectivity within either of the incorrectly connected subnets.

In accordance with an embodiment, in a situation involving an incorrectly connected fabric, the use of a virtual dual-port router abstraction can also allow a management entity, such as a Subnet Manager and IB diagnostic software, to behave correctly in the presence of un-intended physical connectivity to a remote subnet.

Figure 11:
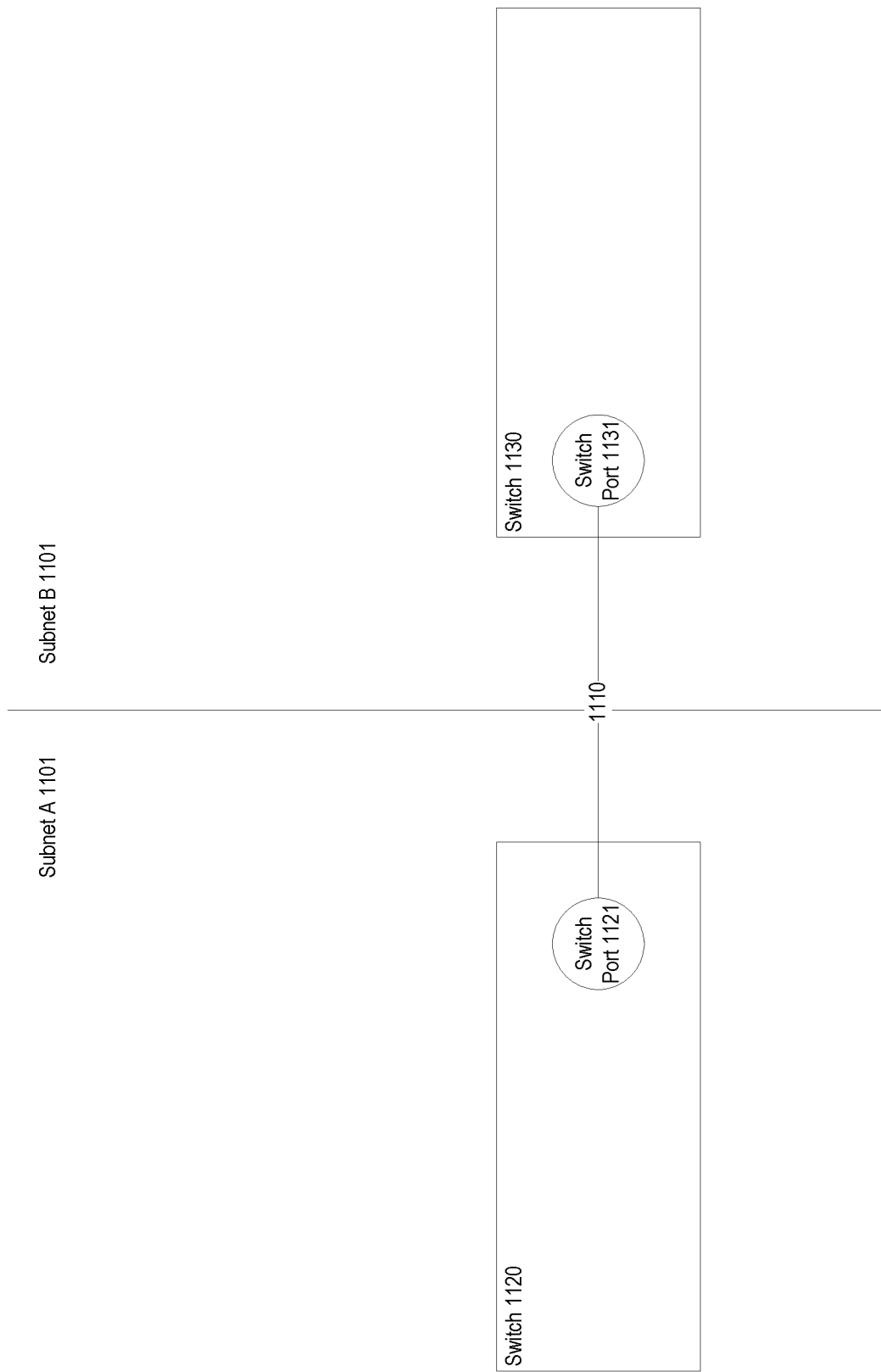
FIG. 11 shows an interconnection between two subnets in a high performance computing environment, in accordance with an embodiment.

FIG. 11 shows an interconnection between two subnets in a high performance computing environment, in accordance with an embodiment. Prior to configuration with a virtual dual port router, a switch 1120 in subnetA 1101 can be connected through a switch port 1121 of switch 1120, via a physical connection 1110, to a switch 1130 in subnet B 1102, via a switch port 1131 of switch 1130. In such an embodiment, each switch port, 1121 and 1131, can act both as switch ports and router ports.

In accordance with an embodiment, a problem with this configuration is that a management entity, such as a subnet manager in an InfiniBand subnet, cannot distinguish between a physical port that is both a switch port and a router port. In such a situation, a SM can treat the switch port as having a router port connected to that switch port. But if the switch port is connected to another subnet, via, for example, a physical link, with another subnet manager, then the subnet manager can be able to send a discovery message out on the physical link. However, such a discovery message cannot be allowed at the other subnet.

Figure 12:
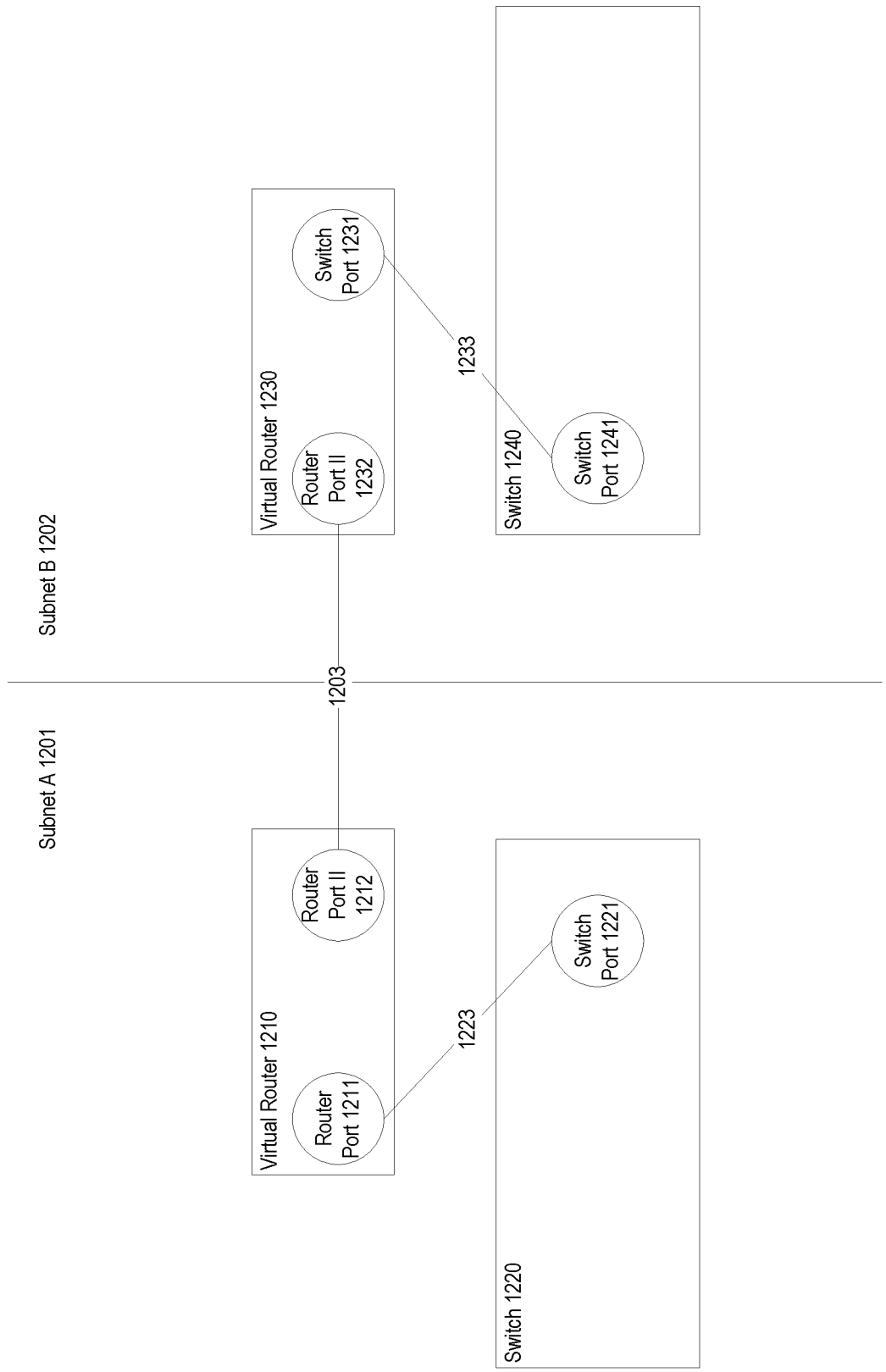
FIG. 12 shows an interconnection between two subnets via a dual-port virtual router configuration in a high performance computing environment, in accordance with an embodiment.

FIG. 12 shows an interconnection between two subnets via a dual-port virtual router configuration in a high performance computing environment, in accordance with an embodiment.

In accordance with an embodiment, after configuration, a dual-port virtual router configuration can be provided such that a subnet manager sees a proper end node, signifying an end of the subnet that the subnet manager is responsible for.

In accordance with an embodiment, at a switch 1220 in subnetA 1201, a switch port can be connected (i.e., logically connected) to a router port 1211 in a virtual router 1210 via a virtual link 1223. The virtual router 1210 (e.g., a dual-port virtual router), which while shown as being external to the switch 1220 can, in embodiments, be logically contained within the switch 1220, can also comprise a second router port, router port II 1212. In accordance with an embodiment, a physical link 1203, which can have two ends, can connect the subnetA 1201 via first end of the physical link with subnet B 1202 via a second end of the physical link, via router port II 1212 and router port II 1232, contained in virtual router 1230 in subnet B 1202. Virtual router 1230 can additionally comprise router port 1231, which can be connected (i.e., logically connected) to switch port 1241 on switch 1240 via a virtual link 1233.

In accordance with an embodiment, a subnet manager (not shown) on subnetA can detect router port 1211, on virtual router 1210 as an end point of the subnet that the subnet manager controls. The dual-port virtual router abstraction can allow the subnet manager on subnetA to deal with subnetA in a usual manner (e.g., as defined per the InfiniBand specification). At the subnet management agent level, the dual-port virtual router abstraction can be provided such that the SM sees the normal switch port, and then at the SMA level, the abstraction that there is another port connected to the switch port, and this port is a router port on a dual-port virtual router. In the local SM, a conventional fabric topology can continue to be used (the SM sees the port as a standard switch port in the topology), and thus the SM sees the router port as an end port. Physical connection can be made between two switch ports that are also configured as router ports in two different subnets.

In accordance with an embodiment, the dual-port virtual router can also resolve the issue that a physical link could be mistakenly connected to some other switch port in the same subnet, or to a switch port that was not intended to provide a connection to another subnet. Therefore, the methods and systems described herein also provide a representation of what is on the outside of a subnet.

In accordance with an embodiment, within a subnet, such as subnet A, a local SM determines a switch port, and then determines a router port connected to that switch port (e.g., router port 1211 connected, via a virtual link 1223, to switch port 1221). Because the SM sees the router port 1211 as the end of the subnet that the SM manages, the SM cannot send discovery and/or management messages beyond this point (e.g., to router port II 1212).

In accordance with an embodiment, the dual-port virtual router described above provides a benefit that the dual-port virtual router abstraction is entirely managed by a management entity (e.g., SM or SMA) within the subnet that the dual-port virtual router belongs to. By allowing management solely on the local side, a system does not have to provide an external, independent management entity. That is, each side of a subnet to subnet connection can be responsible for configuring its own dual-port virtual router.

In accordance with an embodiment, in a situation where a packet, such as an SMP, is addressed to a remote destination (i.e., outside of the local subnet) arrives local target port that is not configured via the dual-port virtual router described above, then the local port can return a message specifying that it is not a router port.

Many features of the present invention can be performed in, using, or with the assistance of hardware, software, firmware, or combinations thereof. Consequently, features of the present invention may be implemented using a processing system (e.g., including one or more processors).

FIG. 13 shows a method for supporting dual-port virtual router in a high performance computing environment, in accordance with an embodiment. At step 1310, the method can provide at one or more computers, including one or more microprocessors, a first subnet, the first subnet comprising a plurality of switches, the plurality of switches comprising at least a leaf switch, wherein each of the plurality of switches comprise a plurality of switch ports, a plurality of host channel adapters, each host channel adapter comprising at least one host channel adapter port, a plurality of end nodes, wherein each of the end nodes are associated with at least one host channel adapter of the plurality of host channel adapters, and a subnet manager, the subnet manager running on one of the plurality of switches and the plurality of host channel adapters.

At step 1320, the method can configure a switch port of the plurality of switch ports on a switch of the plurality of switches as a router port.

At step 1330, the method can logically connect the switch port configured as the router port to a virtual router, the virtual router comprising at least two virtual router ports.

Quality of Service and Service Level Agreements in Private Fabrics

In accordance with an embodiment, high performance computing environments, such as switched networks running on InfiniBand or RoCE, within the cloud as well as larger cloud at customer and on-premise installations have the ability to deploy virtual machine (VM) based workloads where an inherent requirement is that it is possible to define and control Quality of Service (QOS) for different types of communication flows. Additionally, workloads belonging to different tenants must be executed within the boundaries of relevant Service Level Agreements (SLAs) while minimizing interference between such workloads and maintaining the QOS assumptions for the different communication types.

RDMA Read as a Restricted Feature (ORA200246-US-NP-1)

In accordance with an embodiment, when defining bandwidth limitations in systems using conventional network interfaces (NICs) it is in general sufficient to control the egress bandwidth that each node/VM is allowed to generate onto the network.

However, in accordance with an embodiment, with RDMA based networking where the different nodes are able to generate RDMA read requests (i.e., egress bandwidth), this can represent a small amount of egress bandwidth. However, such RDMA read requests can potentially represent a very large amount of ingress RDMA traffic in response to such RDMA read requests. In such situations, it is no longer sufficient to restrict egress bandwidth for all nodes/VMs in order to control the total traffic generation in the system.

In accordance with an embodiment, by making RDMA read operations a restricted feature and only allowing such read requests for nodes/VMs that are trusted to not generate excessive RDMA read based ingress bandwidth, it is possible to restrict the total bandwidth utilization while only restricting send (egress) bandwidth for non-trusted nodes/VMs.

Figure 14:
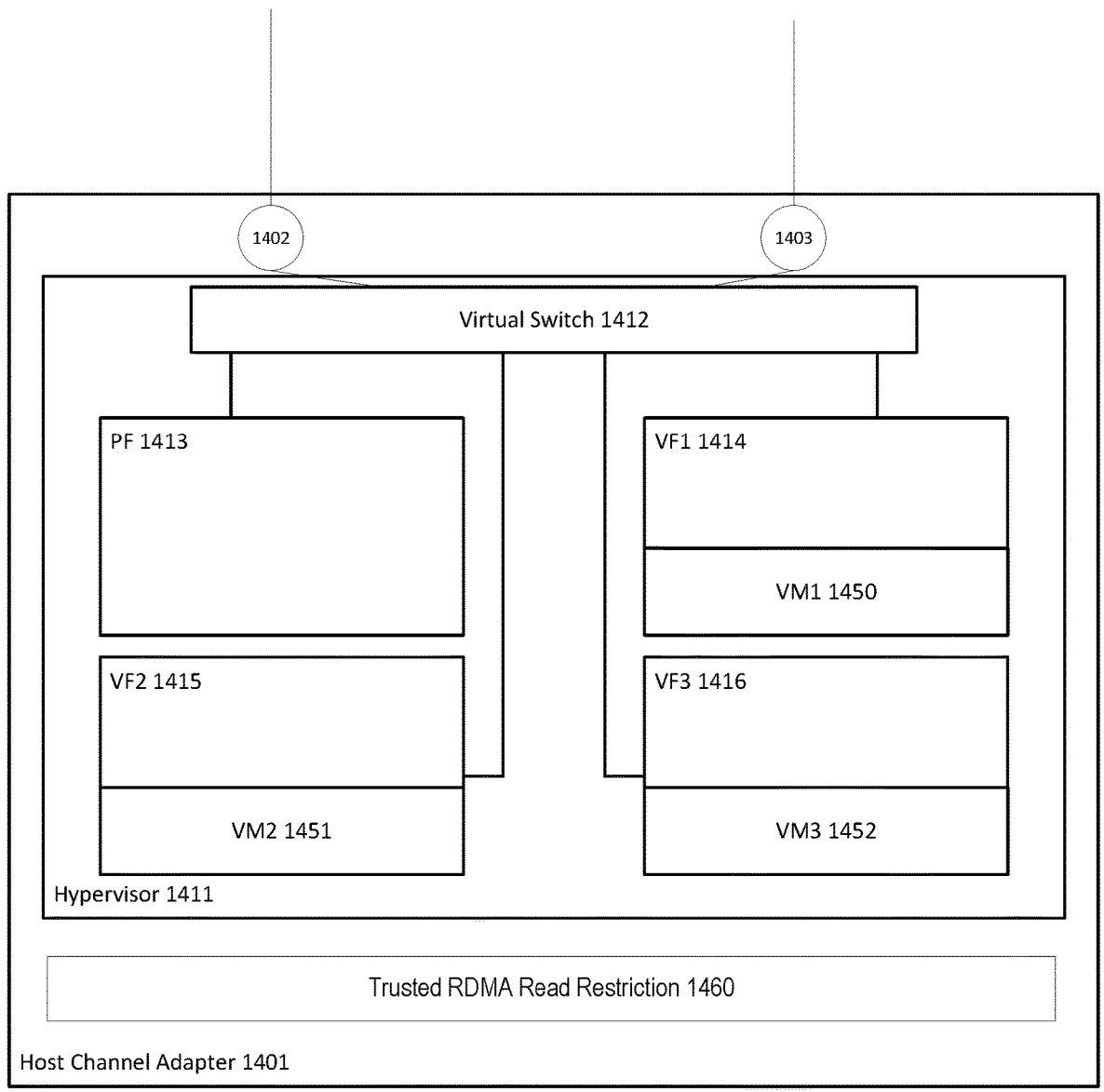
FIG. 14 shows a system for providing RDMA read requests as a restricted feature in a high performance computing environment, in accordance with an embodiment.

FIG. 14 shows a system for providing RDMA read requests as a restricted feature in a high performance computing environment, in accordance with an embodiment.

More specifically, in accordance with an embodiment, FIG. 14 shows a host channel adapter 1401 that comprises a hypervisor 1411. The hypervisor can host/be associated with a number of virtual functions (VF), such as VF1414-1416, as well as a physical function (PF) 1413. The host channel adapter can additionally support/comprise a number of ports, such as port 1402 and 1403, which are used to connect the host channel adapter to a network, such as network 1400. The network can comprise, for example, a switched network, such as an InfiniBand network or a RoCE network that can connect the HCA 1401 to a number of other nodes, such as switches, additional and separate HCAs, and the like.

In accordance with an embodiment, as described above, each of the virtual functions can host a virtual machine (VM), such as VM1 1450, VM2 1451, and VM3 1452.

In accordance with an embodiment, the host channel adapter 1401 can additionally support, via the hypervisor, a virtual switch 1412. This is for situations where a vSwitch architecture is implemented. Although not shown, embodiments of the present disclosure can additionally support a virtual port (vPort) architecture, as described above.

In accordance with an embodiment, the host channel adapter can implement a trusted RDMA read restriction 1460, whereby the read restriction 1460 can be configured to block any of the virtual machines (e.g., VM1, VM2, and/or VM3) from sending any RDMA read request out into the network (e.g., via ports 1402 or 1403).

In accordance with an embodiment, the trusted RDMA read restriction 1460 can implement host channel adapter level blocking of certain types of packets from certain end points, such as virtual machines, or other physical nodes that utilize the HCA 1401 to connect to the network, from generating (i.e., egressing) RDMA read request packets. This configurable restriction component 1460 can, for example, only allow trusted nodes (e.g., VMs or physical end nodes) to generate such types of packets.

In accordance with an embodiment, the trusted RDMA read restriction component can be configured, e.g., based upon instructions received by the host channel adapter, or it can be directly configured, e.g., by a subnet manager (not shown).

Figure 15:
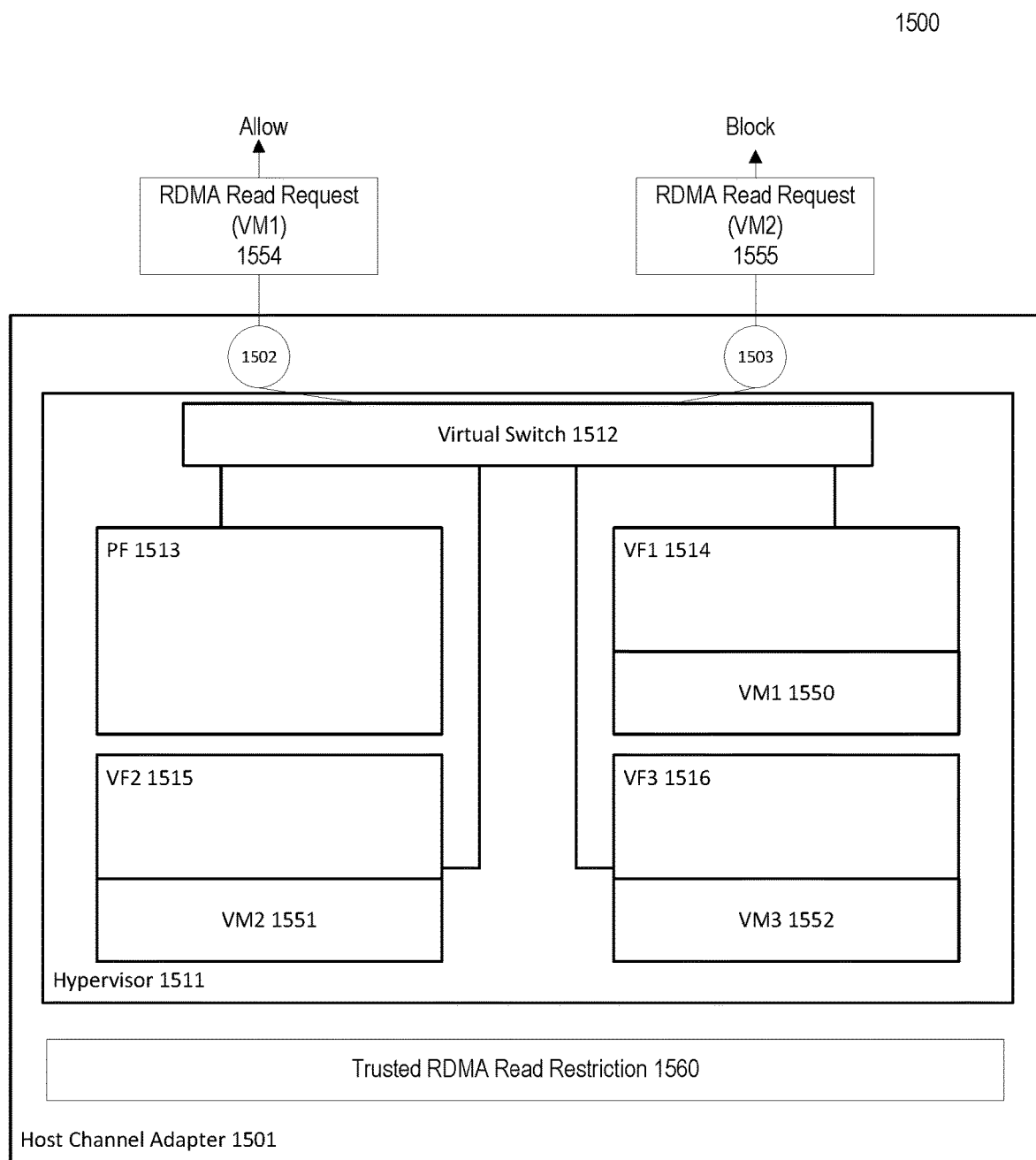
FIG. 15 shows a system for providing RDMA read requests as a restricted feature in a high performance computing environment, in accordance with an embodiment.

FIG. 15 shows a system for providing RDMA read requests as a restricted feature in a high performance computing environment, in accordance with an embodiment.

More specifically, in accordance with an embodiment, FIG. 15 shows a host channel adapter 1501 that comprises a hypervisor 1511. The hypervisor can host/be associated with a number of virtual functions (VF), such as VF1514-1516, as well as a physical function (PF) 1513. The host channel adapter can additionally support/comprise a number of ports, such as port 1502 and 1503, which are used to connect the host channel adapter to a network, such as network 1500. The network can comprise, for example, a switched network, such as an InfiniBand network or a RoCE network that can connect the HCA 1501 to a number of other nodes, such as switches, additional and separate HCAs, and the like.

In accordance with an embodiment, as described above, each of the virtual functions can host a virtual machine (VM), such as VM1 1550, VM2 1551, and VM3 1552.

In accordance with an embodiment, the host channel adapter 1501 can additionally support, via the hypervisor, a virtual switch 1512. This is for situations where a vSwitch architecture is implemented. Although not shown, embodiments of the present disclosure can additionally support a virtual port (vPort) architecture, as described above.

In accordance with an embodiment, the host channel adapter can implement a trusted RDMA read restriction 1560, whereby the read restriction 1560 can be configured to block any of the virtual machines (e.g., VM1, VM2, and/or VM3) from sending any RDMA read request out into the network (e.g., via ports 1502 or 1503).

In accordance with an embodiment, the trusted RDMA read restriction 1560 can implement host channel adapter level blocking of certain types of packets from certain end points, such as virtual machines, or other physical nodes that utilize the HCA 1501 to connect to the network, from generating (i.e., egressing) RDMA read request packets. This configurable restriction component 1560 can, for example, only allow trusted nodes (e.g., VMs or physical end nodes) to generate such types of packets.

In accordance with an embodiment, the trusted RDMA read restriction component can be configured, e.g., based upon instructions received by the host channel adapter, or it can be directly configured, e.g., by a subnet manager (not shown).

In accordance with an embodiment, as an example, the trusted RDMA read restriction 1560 can be configured to trust VM1 1550, and to not trust VM2 1551. Thus, a RDMA read request 1554 initiating from VM1 can be allowed, while a RDMA read request 1555 initiating from VM2 can be blocked before the read request leaves to the host channel adapter 1501 (although shown outside the HCA within FIG. 15, this is merely for convenience in drawing).

Figure 16:
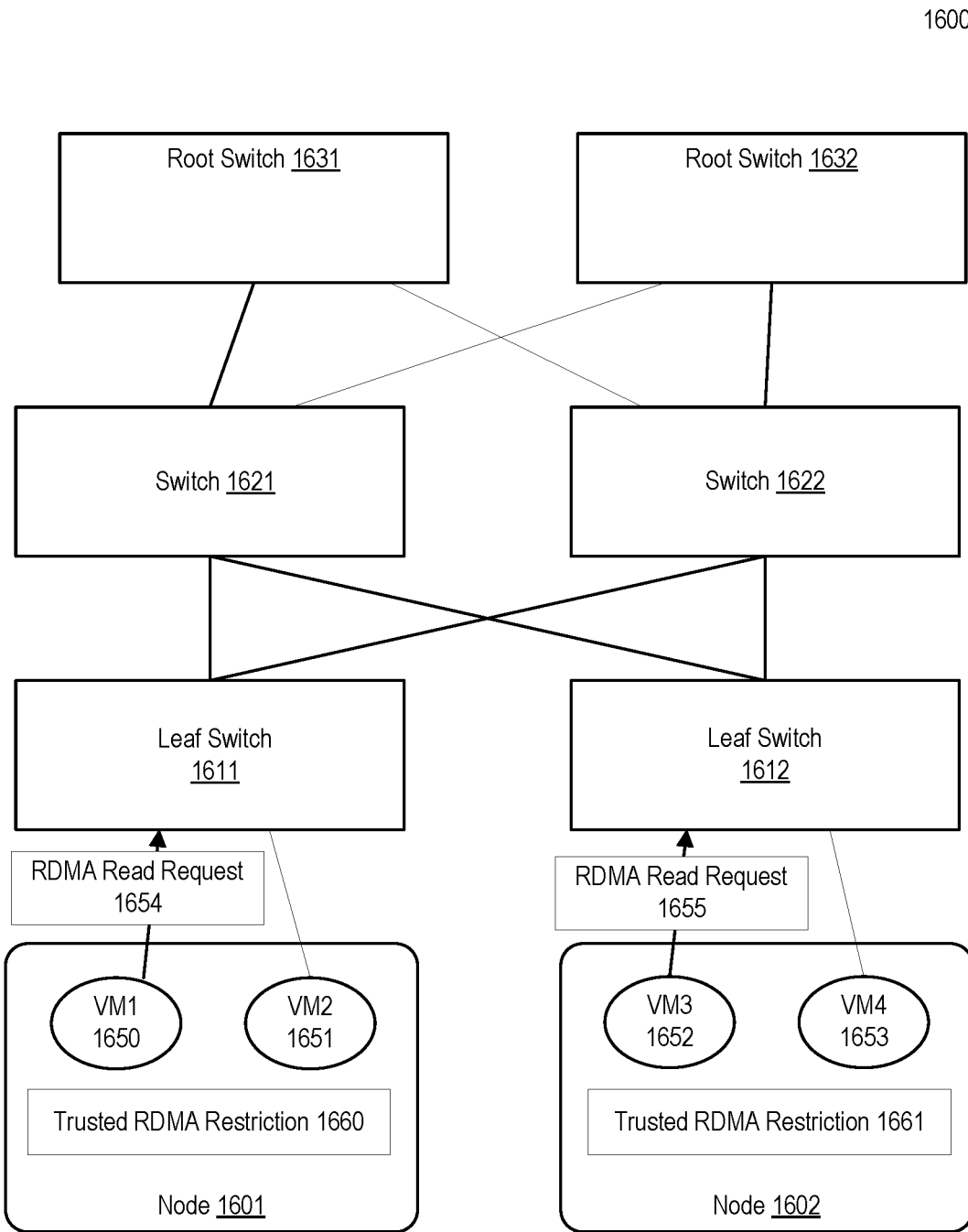
FIG. 16 shows a system for providing RDMA read requests as a restricted feature in a high performance computing environment, in accordance with an embodiment.

FIG. 16 shows a system for providing RDMA read requests as a restricted feature in a high performance computing environment, in accordance with an embodiment.

In accordance with an embodiment, within a high performance computing environment, such as a switched network or subnet 1600, a number of end nodes 1601 and 1602 can support a number of virtual machines, VM1-VM4 1650-1653, which are interconnected via a number of switches, such as leaf switches 1611 and 1612, switches 1621 and 1622, and root switches 1631 and 1632.

In accordance with an embodiment, not shown in the figure are the various host channel adapters that provided the functionality for connection of the nodes 1601 and 1602, as well as the virtual machines to be connected to the subnet. Discussion of such embodiments are above with regard to SR-IOV, wherein each virtual machine can be associated with a virtual function of a hypervisor on a host channel adapter.

In accordance with an embodiment, in general systems, RDMA egress bandwidth is restricted from any one virtual machine from the end node in order to prevent any one virtual machine from monopolizing the bandwidth of any link connecting the end node to the subnet. However, such egress bandwidth restriction, while effective in the general case, does not prevent virtual machines from issuing RDMA read requests, such as RDMA read request 1654 and 1655. This is because such RDMA read requests are generally small packets and do little to utilize egress bandwidth.

In accordance with an embodiment, however, such RDMA read requests can result in the generation of a large amount of return traffic to the issuing entity, such as VM1 and VM3. In such situations, then, the RDMA read requests can lead to link congestion and a decrease in network performance when, for example, read request 1654 results in a large amount of data traffic flowing back to VM1 as a result of the execution of the read request at the destination.

In accordance with an embodiment, and especially in situations where more than one tenant shares the subnet 1600, this can lead to a loss in performance of the subnet such.

In accordance with an embodiment, each node (or host channel adapter) can be configured with a RDMA read restriction 1660 and 1661 that places a block on any VM from issuing a RDMA read request when the VM is not trusted. Such RDMA read restrictions can vary from a permanent block to issue RDMA read requests, to restrictions that place a time frame on when a virtual machine configured with a RDMA read request restriction can issue a RDMA read request (e.g., during slow network traffic periods). In addition, the RDMA read restriction 1660 and 1661 can additionally allow trusted VMs to issue RDMA read requests.

In accordance with an embodiment, since it is possible to have scenarios where multiple VMs/tenants is sharing a "new" HCA—i.e. a HCA with support for the relevant new features, but are performing RDMA requests to remote "old" HCAs that have no such support, it would make sense to have a way to limit the ingress bandwidth that such VMs can generate in terms of RDMA read responses without relying on static rate configurations on the "old" RDMA read responder HCAs. As long as the VM is allowed to generate "any" RDMA read size, there is no straight forward way to do this. Also, since multiple RDMA read requests generated over a period of time in principle may all receive response data at the same time, it is not possible to ensure that the ingress bandwidth cannot exceed a max bandwidth for more than a very limited amount of time unless there is a limitation on both the RDMA read size that can be generated in a single request, and also a limitation on the total number of outstanding RDMA read requests from the same vHCA port.

In accordance with an embodiment, hence, given that a max read size is defined for the vHCA, then the bandwidth control can either be based on a quota on the sum of all outstanding read sizes or a simpler scheme could be to just limit the max number of outstanding RDMA reads based on "worst case" read sizes. Hence, in either case, there is no limit (except for the HCA port max link bandwidth) on peak bandwidth within a short interval, but the duration of such peak bandwidth "windows" will be limited. However, additionally, the sending rate for RDMA read requests must also be throttled so that the sending rate for requests does not exceed the max allowed ingress rate assuming the responses with data are received at the same rate. In other words, the max outstanding requests limit defines the worst case short interval bandwidth and the request send rate limitation would ensure that a new request cannot be generated immediately when a response is received, but only after the relevant delay that represents the acceptable average ingress bandwidth for RDMA read responses. Hence, in the worst case, the allowed number of requests have been sent without any responses, and then all these responses are received at the "same time". At this point, the next request can be sent immediately when the first response arrives, but the following request will have to be delayed for the specified delay period. Hence, over time, the average ingress bandwidth cannot exceed what the request rate defines. However, a smaller max number of outstanding requests will reduce the possible "variance".

Use of Explicit RDMA Read Bandwidth Restrictions (ORA200246-US-NP-1)

In accordance with an embodiment, when defining bandwidth limitations in systems using conventional network interfaces (NICs) it is in general sufficient to control the egress bandwidth that each node/VM is allowed to generate onto the network.

However, in accordance with an embodiment, with RDMA based networking where the different nodes are able to generate RDMA read requests that represents a small request message but potentially very large response messages, it is no longer sufficient to restrict egress bandwidth for all nodes/VMs in order to control the total traffic generation in the system.

In accordance with an embodiment, by defining explicit quotas for how much RDMA read ingress bandwidth a node/VM is allowed to generate independently of any send/egress bandwidth restrictions, it is possible to control the total traffic generation in the system without relying on restricting the use of RDMA read for non-trusted nodes/VMs.

In accordance with an embodiment, systems and methods can support a worst case duration/length of max link bandwidth bursts (i.e., as a result of RDMA read responses "piling up"), in addition to supporting for average ingress bandwidth utilization due to locally generated RDMA read requests.

Figure 17:
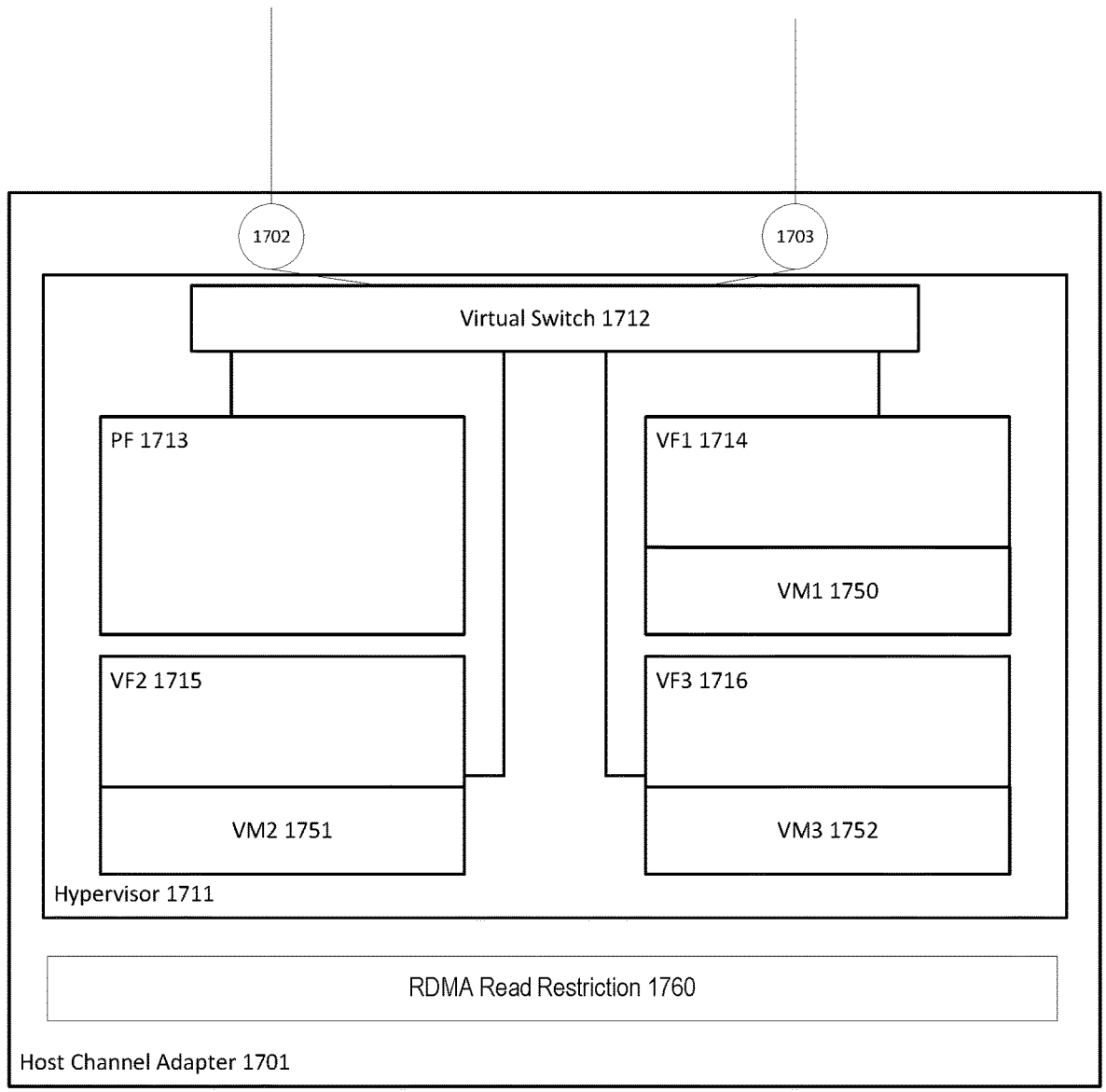
FIG. 17 shows a system for providing explicit RDMA read bandwidth restrictions in a high performance computing environment, in accordance with an embodiment.

FIG. 17 shows a system for providing explicit RDMA read bandwidth restrictions in a high performance computing environment, in accordance with an embodiment.

More specifically, in accordance with an embodiment, FIG. 17 shows a host channel adapter 1701 that comprises a hypervisor 1711. The hypervisor can host/be associated with a number of virtual functions (VF), such as VF1714-1716, as well as a physical function (PF) 1713. The host channel adapter can additionally support/comprise a number of ports, such as port 1702 and 1703, which are used to connect the host channel adapter to a network, such as network 1700. The network can comprise, for example, a switched network, such as an InfiniBand network or a RoCE network that can connect the HCA 1701 to a number of other nodes, such as switches, additional and separate HCAs, and the like.

In accordance with an embodiment, as described above, each of the virtual functions can host a virtual machine (VM), such as VM1 1750, VM2 1751, and VM3 1752.

In accordance with an embodiment, the host channel adapter 1701 can additionally support, via the hypervisor, a virtual switch 1712. This is for situations where a vSwitch architecture is implemented. Although not shown, embodiments of the present disclosure can additionally support a virtual port (vPort) architecture, as described above.

In accordance with an embodiment, the host channel adapter can implement a RDMA read restriction 1760, whereby the read restriction 1760 can be configured to place a quota on the amount of ingress bandwidth that any VM (of HCA 1701) can generate with respect to responses to RDMA read requests that are sent out by the particular VMs. Restricting such ingress bandwidth is performed locally at the host channel adapter.

In accordance with an embodiment, the RDMA read restriction component can be configured, e.g., based upon instructions received by the host channel adapter, or it can be directly configured, e.g., by a subnet manager (not shown).

Figure 18:
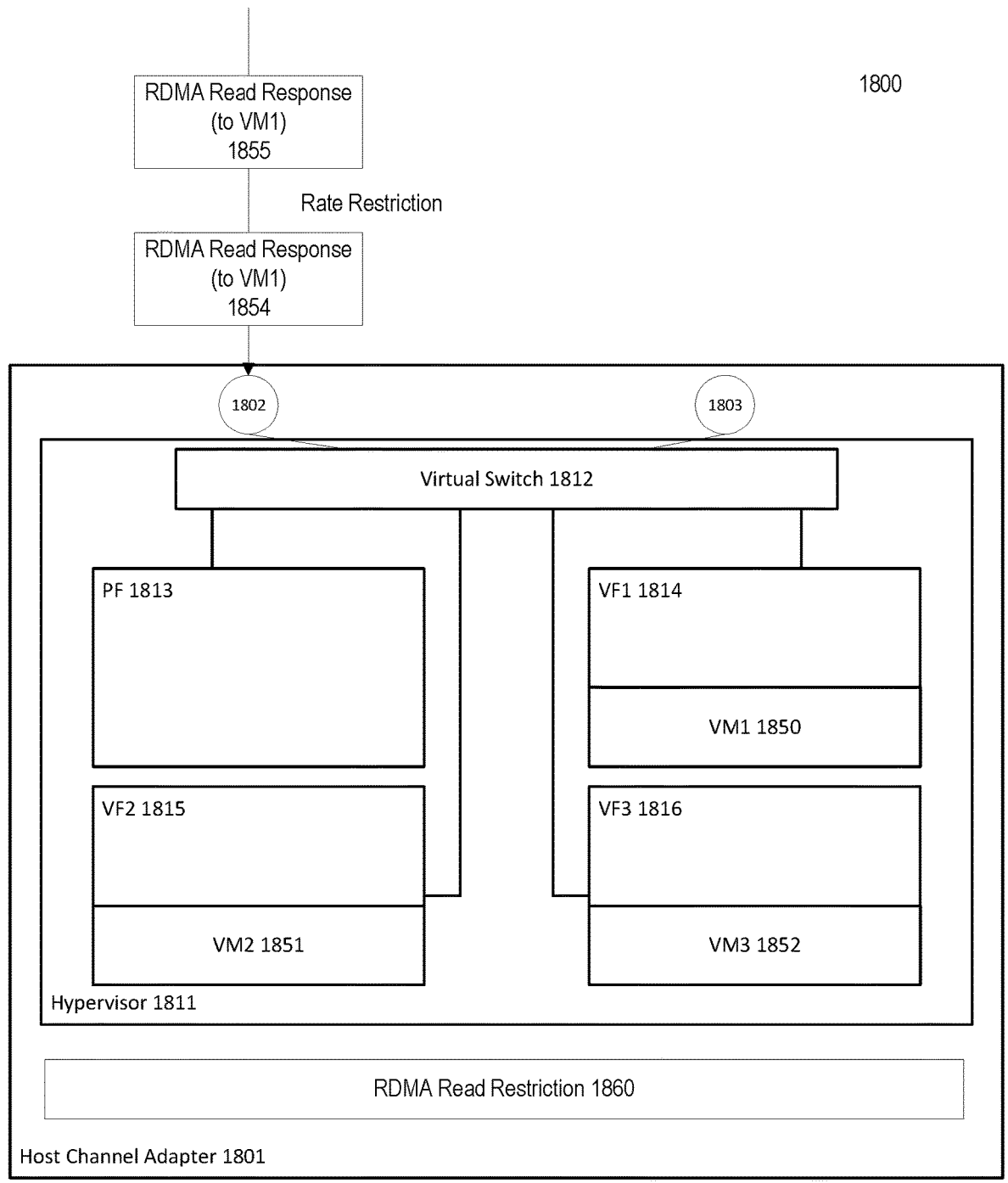
FIG. 18 shows a system for providing explicit RDMA read bandwidth restrictions in a high performance computing environment, in accordance with an embodiment.

FIG. 18 shows a system for providing explicit RDMA read bandwidth restrictions in a high performance computing environment, in accordance with an embodiment.

More specifically, in accordance with an embodiment, FIG. 18 shows a host channel adapter 1801 that comprises a hypervisor 1811. The hypervisor can host/be associated with a number of virtual functions (VF), such as VF1814-1816, as well as a physical function (PF) 1813. The host channel adapter can additionally support/comprise a number of ports, such as port 1802 and 1803, which are used to connect the host channel adapter to a network, such as network 1800. The network can comprise, for example, a switched network, such as an InfiniBand network or a RoCE network that can connect the HCA 1801 to a number of other nodes, such as switches, additional and separate HCAs, and the like.

In accordance with an embodiment, as described above, each of the virtual functions can host a virtual machine (VM), such as VM1 1850, VM2 1851, and VM3 1852.

In accordance with an embodiment, the host channel adapter 1801 can additionally support, via the hypervisor, a virtual switch 1812. This is for situations where a vSwitch architecture is implemented. Although not shown, embodiments of the present disclosure can additionally support a virtual port (vPort) architecture, as described above.

In accordance with an embodiment, the host channel adapter can implement a RDMA read restriction 1860, whereby the read restriction 1860 can be configured to place a quota on the amount of ingress bandwidth that any VM (of HCA 1701) can generate with respect to responses to RDMA read requests that are sent out by the particular VMs. Restricting such ingress bandwidth is performed locally at the host channel adapter.

In accordance with an embodiment, the RDMA read restriction component can be configured, e.g., based upon instructions received by the host channel adapter, or it can be directly configured, e.g., by a subnet manager (not shown).

In accordance with an embodiment, for example, VM1 can have previously sent out at least two RDMA read requests, requesting read operations to be performed on connected nodes. In response, VM1 can be in the process of receiving multiple responses to the RDMA read requests, shown in the figure as RDMA Read Response 1855 and 1854. Because these RDMA read responses can be quite large, especially when compared to the RDMA read request originally sent by VM1, these read responses 1854 and 1855 can be subject to RDMA read restriction 1860, and the ingress bandwidth can be limited or throttled. This throttling can be based upon explicit ingress bandwidth restrictions, or it can be based upon a QoS and/or SLA of VM1 set within RDMA restriction 1860.

Figure 19:
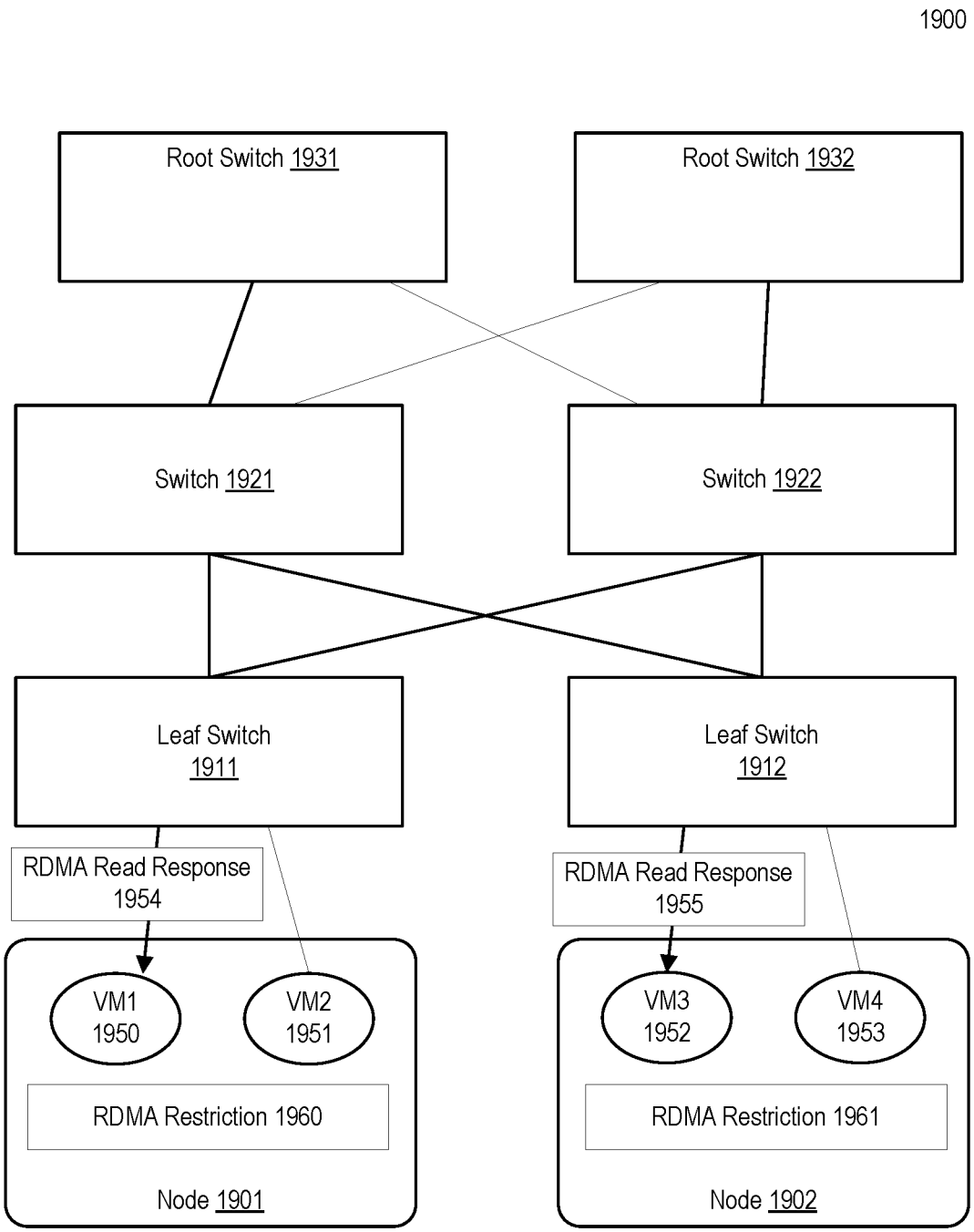
FIG. 19 shows a system for providing explicit RDMA read bandwidth restrictions in a high performance computing environment, in accordance with an embodiment.

FIG. 19 shows a system for providing explicit RDMA read bandwidth restrictions in a high performance computing environment, in accordance with an embodiment.

In accordance with an embodiment, within a high performance computing environment, such as a switched network or subnet 1900, a number of end nodes 1901 and 1902 can support a number of virtual machines, VM1-VM4 1950-1953, which are interconnected via a number of switches, such as leaf switches 1911 and 1912, switches 1921 and 1922, and root switches 1931 and 1932.

In accordance with an embodiment, not shown in the figure are the various host channel adapters that provided the functionality for connection of the nodes 1901 and 1902, as well as the virtual machines to be connected to the subnet. Discussion of such embodiments are above with regard to SR-IOV, wherein each virtual machine can be associated with a virtual function of a hypervisor on a host channel adapter.

In accordance with an embodiment, in general systems, RDMA egress bandwidth is restricted from any one virtual machine from the end node in order to prevent any one virtual machine from monopolizing the bandwidth of any link connecting the end node to the subnet. However, such egress bandwidth restriction, while effective in the general case, cannot prevent an influx of RDMA read responses from monopolizing links between requesting VMs and the network.

In accordance with an embodiment, put another way, if VM1 sends out a number of RDMA read requests, VM1 has no control over when the responses to such read requests will be returned to VM1. This can result in a backup/pileup of responses to the RDMA read requests, each attempting to use the same link to return the requested information back to VM1 (via RDMA read responses 1954). This results in congestion and backlog of traffic in the network.

In accordance with an embodiment, the RDMA restriction 1960 and 1961 can place a quota on the amount of ingress bandwidth that a VM can generate with respect to responses to RDMA read requests that are sent out by the particular VMs. Restricting such ingress bandwidth is performed locally.

In accordance with an embodiment, given that a max read size is defined for the vHCA, then the bandwidth control can either be based on a quota on the sum of all outstanding read sizes or a simpler scheme could be to just limit the maximum number of outstanding RDMA reads based on "worst case" read sizes. Hence, in either case, there is no limit (except for the HCA port max link bandwidth) on peak bandwidth within a short interval, but the duration of such peak bandwidth "windows" will be limited. However, additionally, the sending rate for RDMA read requests must also be throttled so that the sending rate for requests does not exceed the max allowed ingress rate assuming the responses with data are received at the same rate. In other words, the max outstanding requests limit defines the worst case short interval bandwidth and the request send rate limitation would ensure that a new request cannot be generated immediately when a response is received, but only after the relevant delay that represents the acceptable average ingress bandwidth for RDMA read responses. Hence, in the worst case, the allowed number of requests have been sent without any responses, and then all these responses are received at the "same time". At this point, the next request can be sent immediately when the first response arrives, but the following request will have to be delayed for the specified delay period. Hence, over time, the average ingress bandwidth cannot exceed what the request rate defines. However, a smaller max number of outstanding requests will reduce the possible "variance".

Figure 20:
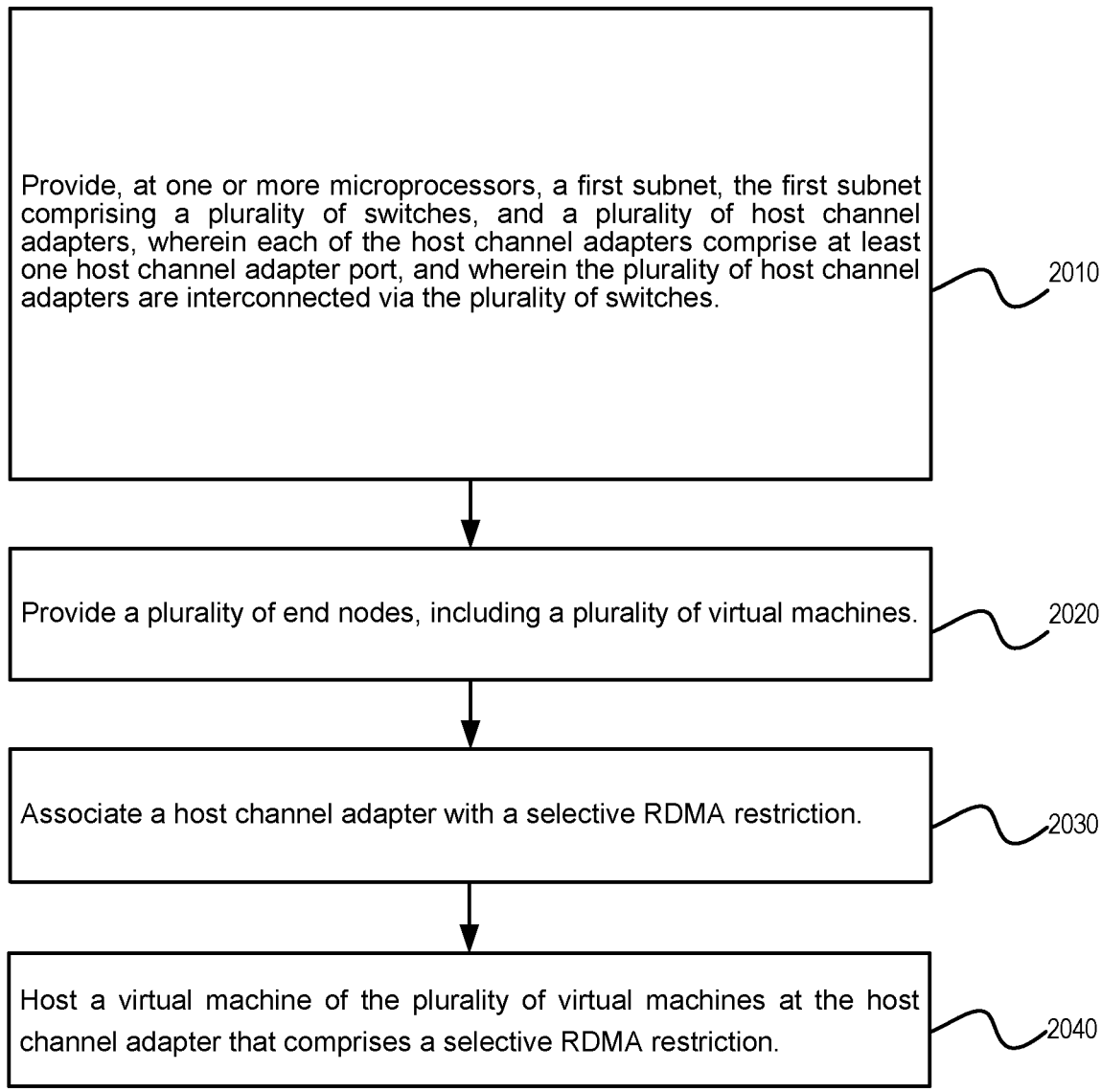
FIG. 20 is a flowchart of a method for providing RDMA (remote direct memory access) read requests as a restricted feature in a high performance computing environment.

FIG. 20 is a flowchart of a method for providing RDMA (remote direct memory access) read requests as a restricted feature in a high performance computing environment, in accordance with an embodiment.

In accordance with an embodiment, at step 2010, the method can provide, at one or more microprocessors, a first subnet, the first subnet comprising a plurality of switches, a plurality of host channel adapters, wherein each of the host channel adapters comprise at least one host channel adapter port, and wherein the plurality of host channel adapters are interconnected via the plurality of switches.

In accordance with an embodiment, at step 2020, the method can provide a plurality of end nodes, including a plurality of virtual machines.

In accordance with an embodiment, at step 2030 the method can associate a host channel adapter with a selective RDMA restriction.

In accordance with an embodiment, at step 2040, the method can host a virtual machine of the plurality of virtual machines at the host channel adapter that comprises a selective RDMA restriction.

Combining Multiple Shared Bandwidth Segments (ORA200246-US-NP-3)

In accordance with an embodiment, conventional bandwidth/rate limitation schemes for network interfaces are typically limited to a combination of total combined send rate and possibly also max rates for individual destinations. However, in many cases, there are shared bottlenecks in the intermediate network/fabric topology that implies that the total bandwidth available to a set of targets is limited by this shared bottleneck. Hence, unless such shared bottlenecks are considered when deciding at what rate various data flows can be sent at, it is highly likely that the shared bottleneck can get overloaded despite that each per target rate limitation is observed.

In accordance with an embodiment, the systems and methods herein can introduce an object "target group" that multiple individual flows can be associated with and where the target group can represent a rate limitation of an individual (potentially shared) link or other bottleneck within the network/fabric path that the flow is using. Further, the systems and methods can allow each flow to relate to a hierarchy of such target groups so that all link segments and any other (shared) bottleneck in the path between the sender and target for the individual flow can be represented.

In accordance with an embodiment, in order to limit egress bandwidth, the systems and methods can establish groups of destinations that share bandwidth quotas in order to reduce the chance of congestion on shared ISLs (inter-switch links). This requires a destination/path related lookup mechanism that can be managed in terms of which destinations/paths will map to which groups at the logical level. The implication of this is that the hyper privileged communication infrastructure must be aware of the actual location of peer nodes in the fabric topology as well as relevant routing and capacity information that can be mapped into "target groups" (i.e., a HCA-level object type) within the local HCA with associated bandwidth quotas. However, it will not be practical to have the HW perform direct lookup of WQE (work queue entry)/packet address information in order to map to relevant target group(s). Instead, the HCA implementation can provide an association between RC (reliable connected) QPs (queue pairs) and address handles that represents the sending contexts for outgoing traffic and relevant target groups. In this way, the associations may be transparent at verbs level and can instead be set up by hyper-privileged software levels and subsequently be enforced at HCA HW (and firmware) level. A significant additional complexity associated with this scheme is that live VM migration where the relevant VM or vHCA port address information is maintained across the migration might still imply that there is a change of target group for different communication peers. However, the target group associations do not have to be synchronously updated as long as the systems and methods tolerate some transient periods where relevant bandwidth quotas are not 100% correct. Hence, while the logical connectivity and ability to communicate may not change due to VM migration, the target group(s) associated with RC connections and address handles in both the VM being migrated as well as in its communication peer VMs may be "completely wrong" after a migration. This may imply both that less bandwidth than available is utilized (e.g. when a VM is moved from a remote location and into the same "leaf group" as its peers) and also that excessive bandwidth is generated (e.g. when a VM is moved from the same "leaf group" as its peers to a remote location that implies shared ISLs with restricted bandwidth).

In accordance with an embodiment, the target group specific bandwidth quotas can in principle also be divided into quotas for specific priorities ("QOS classes") in order to reflect the expected bandwidth usage for the various priorities within the relevant paths in the fabric that the target groups represent.

In accordance with an embodiment, the target group decouples the object from a specific destination address, and the systems and methods get the ability to represent an intermediate, shared link or groups of links that may represent a bandwidth limitation that is in addition to the target and that may be more restrictive than the target limit.

In accordance with an embodiment, the systems and methods can consider a hierarchy of target groups (bandwidth quotas) reflecting bandwidth/link sharing at different stages towards different targets. In principle, this implies that a specific flow should be associated with the target group (max rate) that represents the most limited rate in the hierarchy. That is, for example, if the target limit is 30 Gb/s whereas the intermediate up-link limit is 50 Gb/s, then the max rate towards the target can never be more than 30 Gb/s. On the other hand, if multiple 30 Gb/s targets are sharing the same 50 Gb/s intermediate limitation, then the use of the relevant target rate limit for flows towards these targets could imply overrun of the intermediate rate limit. Hence, in order to ensure the best possible utilization and throughput within the relevant limits, all the target groups in the relevant hierarchy can be considered in the relevant strict order. This implies that a packet can be sent towards the relevant destination if and only if each target group in the hierarchy represents available bandwidth. Hence, if a single flow is active towards one of the targets in the above example, then this flow will be allowed to operate at 30 Gb/s. However, once another flow becomes active towards another target (via the shared intermediate target group), then each flow will be limited to 25 Gb/s. If in the next round an additional flow towards one of the two targets becomes active, then the two flows to the same target would be operating at 12.5 Gb/s each (i.e. on average, and unless they have any additional bandwidth quotas/restrictions).

In accordance with an embodiment, when multiple tenants are sharing the server/HCA, both the initial egress bandwidth as well as the actual target bandwidth may be shared in addition to sharing of any intermediate ISL bandwidth. On the other hand, in scenarios with dedicated servers/HCAs per tenant, then intermediate ISL bandwidth represents the only possible "inter tenant" bandwidth sharing.

In accordance with an embodiment, the target groups should normally be global for the HCA port, and VF/tenant quotas at the HCA level would represent the max local traffic that the tenant can generate for any combinations of targets either globally or for specific priorities. Still, it would be possible to use target groups that are specific for some tenants as well as "global" target groups in the same hierarchy.

In accordance with an embodiment, there are several possible ways to implement target groups as well as to represent the target group associations (hierarchy) for a specific QP or address handle. However, a 16 bit target group ID space as well as support for up to 4 or 8 target group associations for each QP and address handle can be provided. Each target group ID value would then represent some HW state reflecting the relevant IPD (inter packet delay) value for the relevant rate as well as the timer info defining when next packet associated with this target group can be sent.

In accordance with an embodiment, since different flows/paths may use different "QOS IDs" (i.e. Service Levels, Priorities etc.) on the same shared link segments, it is also be possible to associate different target groups with the same link segment so that different target groups represent the bandwidth quota for such different QOS IDs. However, it is also possible to represent both QOS IDs specific target groups as well as a single target group representing the physical link for the same link segment.

In accordance with an embodiment, similarly, the systems and methods can additionally distinguish between different flow types defined either by explicit flow-type packet header parameters and/or by taking into account the operation type (e.g. RDMA read/write/send) in order to implement different "sub quotas" to arbitrate between different such flow types. In particular, this may be useful to distinguish between flows that represent responder mode bandwidth (i.e. typically RDMA read response traffic) versus requester mode traffic originally initiated by the local node itself.

In accordance with an embodiment, with strict use of target groups and with rate limits for all relevant sender HCAs that adds up to a total max rate that does not exceed the capacity of any target or shared ISL segment, it is in principle possible to avoid "any" congestion. However, this may imply severe limitation of both sustained bandwidth for different flows and also low average utilization of the available link bandwidth. Hence, the various rate limits may be set to allow different HCAs to use a more optimistic max rate. In this case, the aggregated total is higher than the sustainable max, and may therefore lead to congestion.

Figure 21:
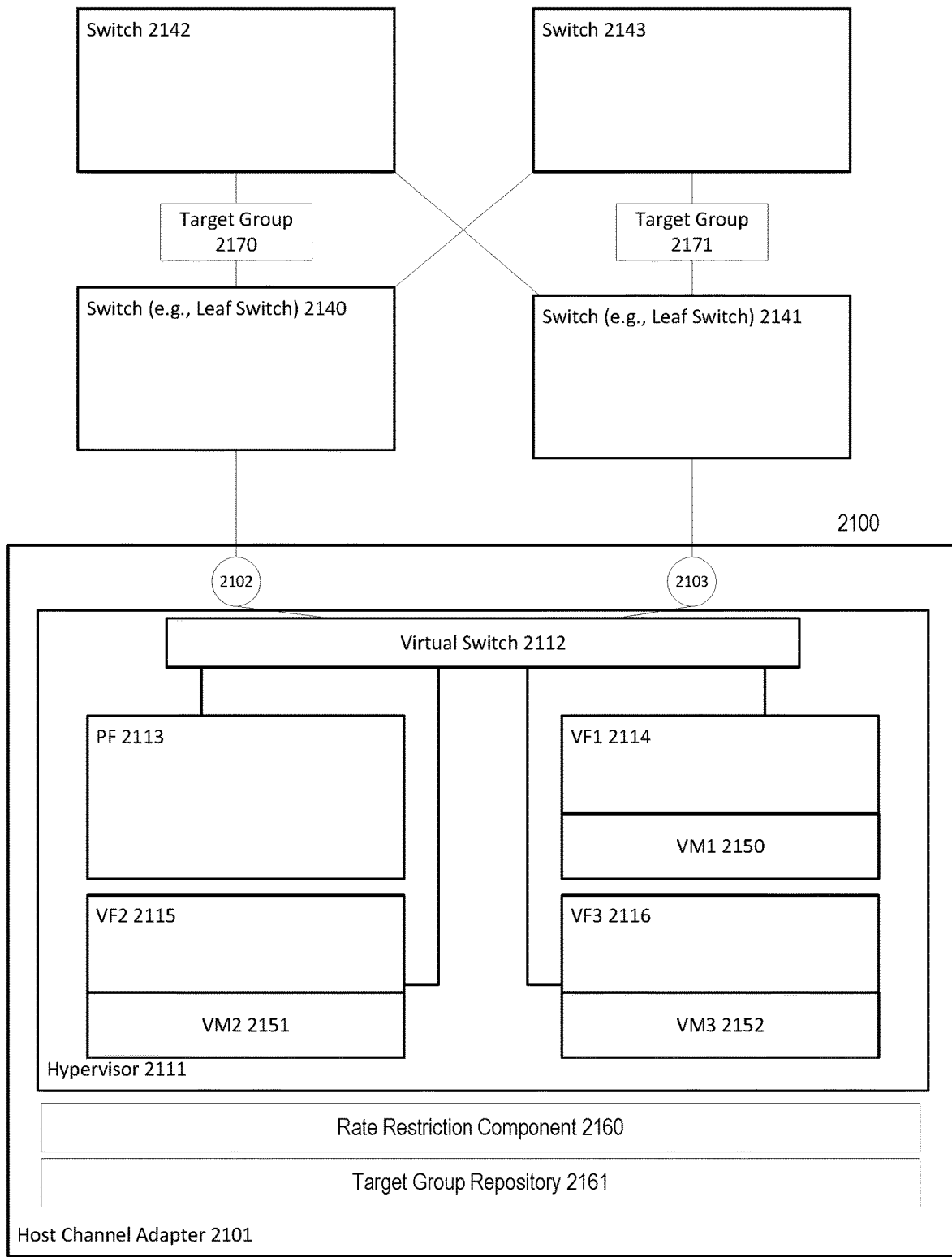
FIG. 21 shows a system for combining multiple shared bandwidth segments in a high performance computing environment, in accordance with an embodiment.

FIG. 21 shows a system for combining multiple shared bandwidth segments in a high performance computing environment, in accordance with an embodiment.

More specifically, in accordance with an embodiment, FIG. 21 shows a host channel adapter 2101 that comprises a hypervisor 2111. The hypervisor can host/be associated with a number of virtual functions (VF), such as VF2114-2116, as well as a physical function (PF) 2113. The host channel adapter can additionally support/comprise a number of ports, such as port 2102 and 2103, which are used to connect the host channel adapter to a network, such as network 2100. The network can comprise, for example, a switched network, such as an InfiniBand network or a RoCE network that can connect the HCA 2101 to a number of other nodes, such as switches, additional and separate HCAs, and the like.

In accordance with an embodiment, as described above, each of the virtual functions can host a virtual machine (VM), such as VM1 2150, VM2 2151, and VM3 2152.

In accordance with an embodiment, the host channel adapter 2101 can additionally support, via the hypervisor, a virtual switch 2112. This is for situations where a vSwitch architecture is implemented. Although not shown, embodiments of the present disclosure can additionally support a virtual port (vPort) architecture, as described above.

In accordance with an embodiment, the network 2100, as shown, can comprise a number of switches, such as switches 2140, 2141, 2142, and 2143, which are interconnected and which can be connected, e.g., via leaf switches 2140 and 2141, to the host channel adapter 2101.

In accordance with an embodiment, the switches 2140-2143 can be interconnected, and can additionally be connected with other switches and other end nodes (e.g., other HCAs) that are not shown in the figure.

In accordance with an embodiment, target groups, such as target groups 2170 and 2171, can be defined along inter-switch links (ISLs), such as ISLs between leaf switch 2140 and switch 2142, as well as leaf switch 2141 and switch 2143. These target groups 2170 and 2171 can represent, for example, bandwidth quotas as HCA objects, stored at a target group repository 2161 associated with the HCA, which is accessible by a rate restriction component 2160.

In accordance with an embodiment, the target groups 2170 and 2171 can represent specific (and different) bandwidth quotas. These bandwidth quotas can be divided into quotas for specific priorities ("QOS classes") in order to reflect the expected bandwidth usage for the various priorities within the relevant paths in the fabric that the target groups represent.

In accordance with an embodiment, the target groups 2170 and 2171 decouple the object from a specific destination address, and the systems and methods get the ability to represent an intermediate, shared link or groups of links that may represent a bandwidth limitation that is in addition to the target and that may be more restrictive than the target limit. That is, for example, if a default/original egress limit on VM2 2151 is set at one threshold, but the destination of a packet sent from VM2 would pass through target group 2170 that sets a lower bandwidth limitation, then the egress bandwidth from VM2 can be restricted to a level lower than that of default/original egress limit placed on VM2. The HCA can be responsible for such throttling/egress bandwidth limitation adjustment, dependent upon the target groups implicated by the routing of packets from VM2, for example.

In accordance with an embodiment, target groups can also be hierarchical in nature, whereby the systems and methods can consider a hierarchy of target groups (bandwidth quotas) reflecting bandwidth/link sharing at different stages towards different targets. In principle, this implies that a specific flow should be associated with the target group (max rate) that represents the most limited rate in the hierarchy. That is, for example, if target group 2170 represents a bandwidth limitation higher than that of target group 2171, and a packet is addressed through both inter-switch links represented by the two target groups, then the bandwidth limitation of target group 2171 is the controlling bandwidth limiting factor.

In accordance with an embodiment, target groups can also be shared by multiple flows. Depending on QoS and SLAs associated with respective flows, for example, the bandwidth quotas represented by target groups can be divided. As an example, of VM1 and VM2 both concurrently send flows that would implicate target group 2170, which, for example, represents a bandwidth quota of 10 Gb/s, and the respective flows have equal QoS and SLAs associated therewith, then target group 2170 would represent a 5 Gb/s limitation for each flow. This sharing or dividing of target group bandwidth quotas can be varied based upon QoS and SLAs associated with respective flows.

Figure 22:
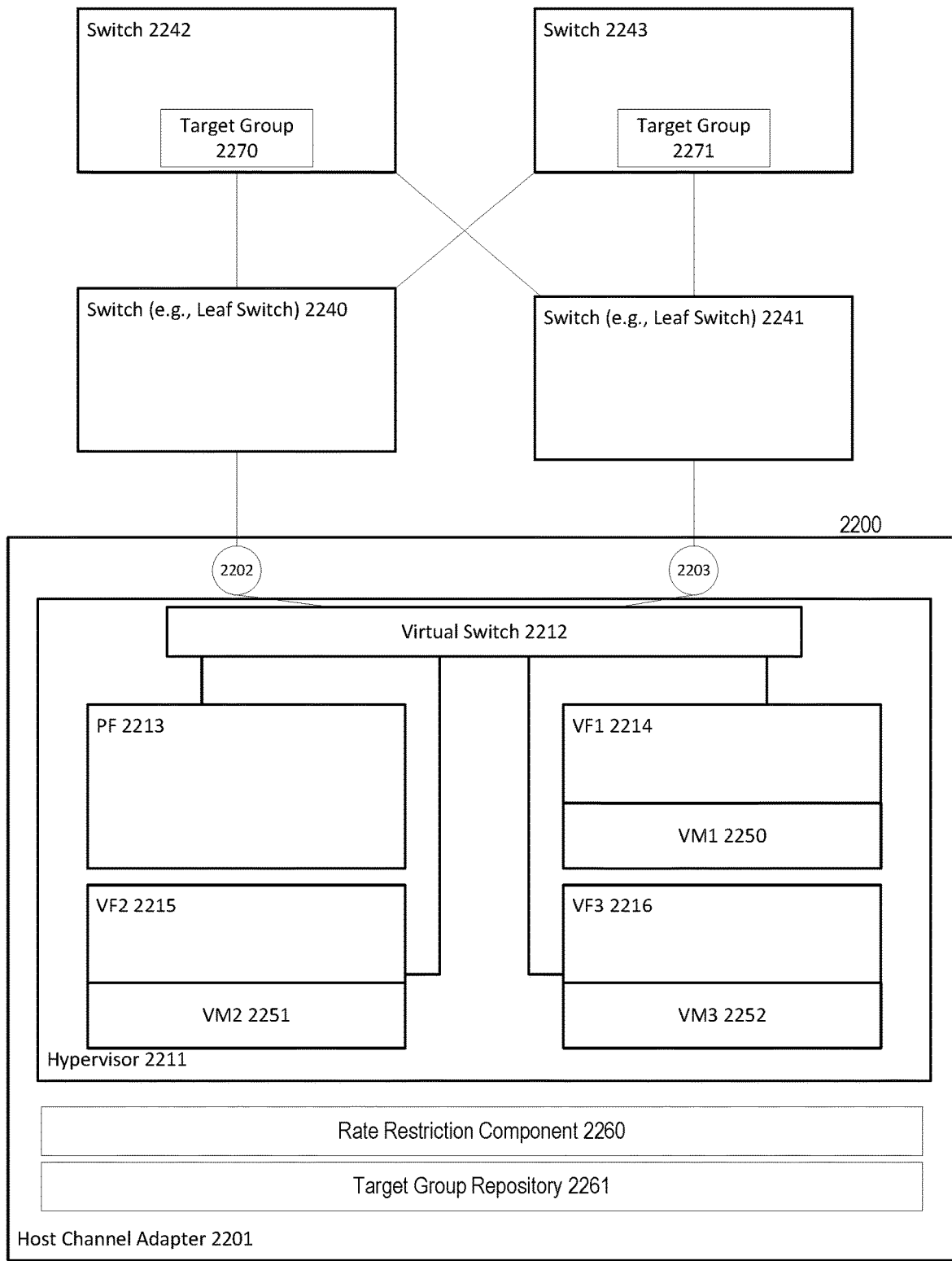
FIG. 22 shows a system for combining multiple shared bandwidth segments in a high performance computing environment, in accordance with an embodiment.

FIG. 22 shows a system for combining multiple shared bandwidth segments in a high performance computing environment, in accordance with an embodiment.

More specifically, in accordance with an embodiment, FIG. 22 shows a host channel adapter 2201 that comprises a hypervisor 2211. The hypervisor can host/be associated with a number of virtual functions (VF), such as VF2214-2216, as well as a physical function (PF) 2213. The host channel adapter can additionally support/comprise a number of ports, such as port 2202 and 2203, which are used to connect the host channel adapter to a network, such as network 2200. The network can comprise, for example, a switched network, such as an InfiniBand network or a RoCE network that can connect the HCA 2201 to a number of other nodes, such as switches, additional and separate HCAs, and the like.

In accordance with an embodiment, as described above, each of the virtual functions can host a virtual machine (VM), such as VM1 2250, VM2 2251, and VM3 2252.

In accordance with an embodiment, the host channel adapter 2201 can additionally support, via the hypervisor, a virtual switch 2212. This is for situations where a vSwitch architecture is implemented. Although not shown, embodiments of the present disclosure can additionally support a virtual port (vPort) architecture, as described above.

In accordance with an embodiment, the network 2200, as shown, can comprise a number of switches, such as switches 2240, 2241, 2242, and 2243, which are interconnected and which can be connected, e.g., via leaf switches 2240 and 2241, to the host channel adapter 2201.

In accordance with an embodiment, the switches 2240-2243 can be interconnected, and can additionally be connected with other switches and other end nodes (e.g., other HCAs) that are not shown in the figure.

In accordance with an embodiment, target groups, such as target groups 2270 and 2271, can be defined at, for example, switch ports. As shown in the figure, the target groups 2270 and 2271 are defined at switch ports of switches 2242 and 2243, respectively. These target groups 2270 and 2271 can represent, for example, bandwidth quotas as HCA objects, stored at a target group repository 2261 associated with the HCA, which is accessible by a rate restriction component 2260.

In accordance with an embodiment, the target groups 2270 and 2271 can represent specific (and different) bandwidth quotas. These bandwidth quotas can be divided into quotas for specific priorities ("QOS classes") in order to reflect the expected bandwidth usage for the various priorities within the relevant paths in the fabric that the target groups represent.

In accordance with an embodiment, the target groups 2270 and 2271 decouple the object from a specific destination address, and the systems and methods get the ability to represent an intermediate, shared link or groups of links that may represent a bandwidth limitation that is in addition to the target and that may be more restrictive than the target limit. That is, for example, if a default/original egress limit on VM2 2251 is set at one threshold, but the destination of a packet sent from VM2 would pass through target group 2270 that sets a lower bandwidth limitation, then the egress bandwidth from VM2 can be restricted to a level lower than that of default/original egress limit placed on VM2. The HCA can be responsible for such throttling/egress bandwidth limitation adjustment, dependent upon the target groups implicated by the routing of packets from VM2, for example.

In accordance with an embodiment, target groups can also be hierarchical in nature, whereby the systems and methods can consider a hierarchy of target groups (bandwidth quotas) reflecting bandwidth/link sharing at different stages towards different targets. In principle, this implies that a specific flow should be associated with the target group (max rate) that represents the most limited rate in the hierarchy. That is, for example, if target group 2270 represents a bandwidth limitation higher than that of target group 2271, and a packet is addressed through both inter-switch links represented by the two target groups, then the bandwidth limitation of target group 2271 is the controlling bandwidth limiting factor.

In accordance with an embodiment, target groups can also be shared by multiple flows. Depending on QoS and SLAs associated with respective flows, for example, the bandwidth quotas represented by target groups can be divided. As an example, of VM1 and VM2 both concurrently send flows that would implicate target group 2270, which, for example, represents a bandwidth quota of 10 Gb/s, and the respective flows have equal QoS and SLAs associated therewith, then target group 2270 would represent a 5 Gb/s limitation for each flow. This sharing or dividing of target group bandwidth quotas can be varied based upon QoS and SLAs associated with respective flows.

In accordance with an embodiment, FIGS. 21 and 22 show target groups being defined at inter-switch links and at switch ports, respectively. One of ordinary skill in the art would readily understand that target groups can be defined at various places in the subnet, and that any given subnet is not so limited that target groups are defined only at ISLs and switch ports, but that generally, such target groups can be defined at both ISLs and switch ports within any given subnets.

Figure 23:
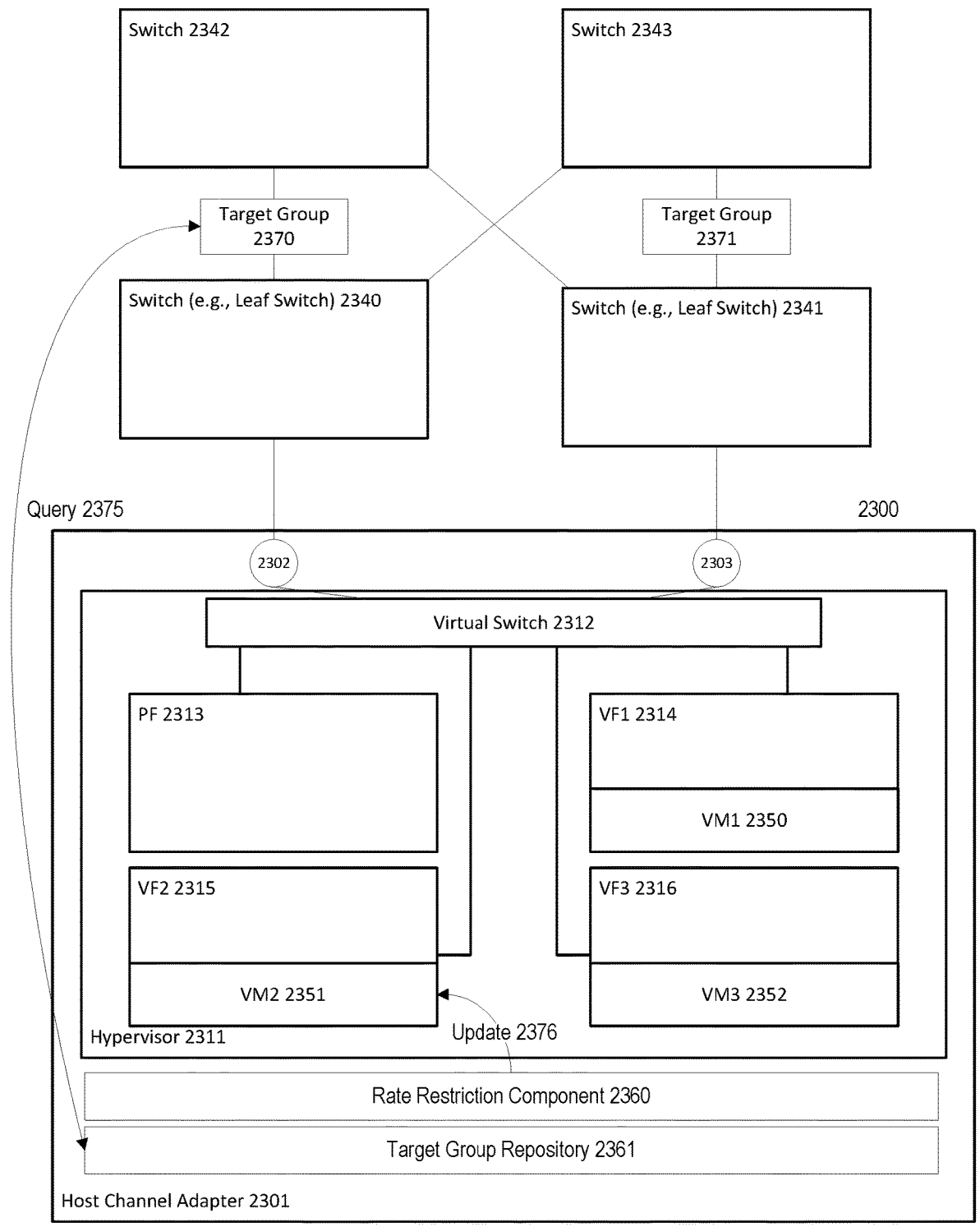
FIG. 23 shows a system for combining multiple shared bandwidth segments in a high performance computing environment, in accordance with an embodiment.

FIG. 23 shows a system for combining multiple shared bandwidth segments in a high performance computing environment, in accordance with an embodiment.

More specifically, in accordance with an embodiment, FIG. 23 shows a host channel adapter 2301 that comprises a hypervisor 2311. The hypervisor can host/be associated with a number of virtual functions (VF), such as VF2314-2316, as well as a physical function (PF) 2313. The host channel adapter can additionally support/comprise a number of ports, such as port 2302 and 2303, which are used to connect the host channel adapter to a network, such as network 2300. The network can comprise, for example, a switched network, such as an InfiniBand network or a RoCE network that can connect the HCA 2301 to a number of other nodes, such as switches, additional and separate HCAs, and the like.

In accordance with an embodiment, as described above, each of the virtual functions can host a virtual machine (VM), such as VM1 2350, VM2 2351, and VM3 2352.

In accordance with an embodiment, the host channel adapter 2301 can additionally support, via the hypervisor, a virtual switch 2312. This is for situations where a vSwitch architecture is implemented. Although not shown, embodiments of the present disclosure can additionally support a virtual port (vPort) architecture, as described above.

In accordance with an embodiment, the network 2300, as shown, can comprise a number of switches, such as switches 2340, 2341, 2342, and 2343, which are interconnected and which can be connected, e.g., via leaf switches 2340 and 2341, to the host channel adapter 2301.

In accordance with an embodiment, the switches 2340-2343 can be interconnected, and can additionally be connected with other switches and other end nodes (e.g., other HCAs) that are not shown in the figure.

In accordance with an embodiment, target groups, such as target groups 2370 and 2371, can be defined along inter-switch links (ISLs), such as ISLs between leaf switch 2340 and switch 2342, as well as leaf switch 2341 and switch 2343. These target groups 2370 and 2371 can represent, for example, bandwidth quotas as HCA objects, stored at a target group repository 2361 associated with the HCA, which is accessible by a rate restriction component 2360.

In accordance with an embodiment, the target groups 2370 and 2371 can represent specific (and different) bandwidth quotas. These bandwidth quotas can be divided into quotas for specific priorities ("QOS classes") in order to reflect the expected bandwidth usage for the various priorities within the relevant paths in the fabric that the target groups represent.

In accordance with an embodiment, the target groups 2370 and 2371 decouple the object from a specific destination address, and the systems and methods get the ability to represent an intermediate, shared link or groups of links that may represent a bandwidth limitation that is in addition to the target and that may be more restrictive than the target limit. That is, for example, if a default/original egress limit on VM2 2351 is set at one threshold, but the destination of a packet sent from VM2 would pass through target group 2370 that sets a lower bandwidth limitation, then the egress bandwidth from VM2 can be restricted to a level lower than that of default/original egress limit placed on VM2. The HCA can be responsible for such throttling/egress bandwidth limitation adjustment, dependent upon the target groups implicated by the routing of packets from VM2, for example.

In accordance with an embodiment, target groups can also be hierarchical in nature, whereby the systems and methods can consider a hierarchy of target groups (bandwidth quotas) reflecting bandwidth/link sharing at different stages towards different targets. In principle, this implies that a specific flow should be associated with the target group (max rate) that represents the most limited rate in the hierarchy. That is, for example, if target group 2370 represents a bandwidth limitation higher than that of target group 2371, and a packet is addressed through both inter-switch links represented by the two target groups, then the bandwidth limitation of target group 2371 is the controlling bandwidth limiting factor.

In accordance with an embodiment, target groups can also be shared by multiple flows. Depending on QoS and SLAs associated with respective flows, for example, the bandwidth quotas represented by target groups can be divided. As an example, of VM1 and VM2 both concurrently send flows that would implicate target group 2370, which, for example, represents a bandwidth quota of 10 Gb/s, and the respective flows have equal QoS and SLAs associated therewith, then target group 2370 would represent a 5 Gb/s limitation for each flow. This sharing or dividing of target group bandwidth quotas can be varied based upon QoS and SLAs associated with respective flows.

In accordance with an embodiment, the target group repository can query 2375 the target group 2370 to determine, for example, a bandwidth quota of the target group. Upon determining the bandwidth quota of the target group, the target group repository can store a quota value associated with the target group. This quota can then be used by the rate restriction component to a) determine if the bandwidth quota of the target group is lower than that of a bandwidth quota for a VM based on QoS or SLA, and b) on such determination, update 2376 the bandwidth quota for the VM based upon a path traversing the target group 2370.

Figure 24:
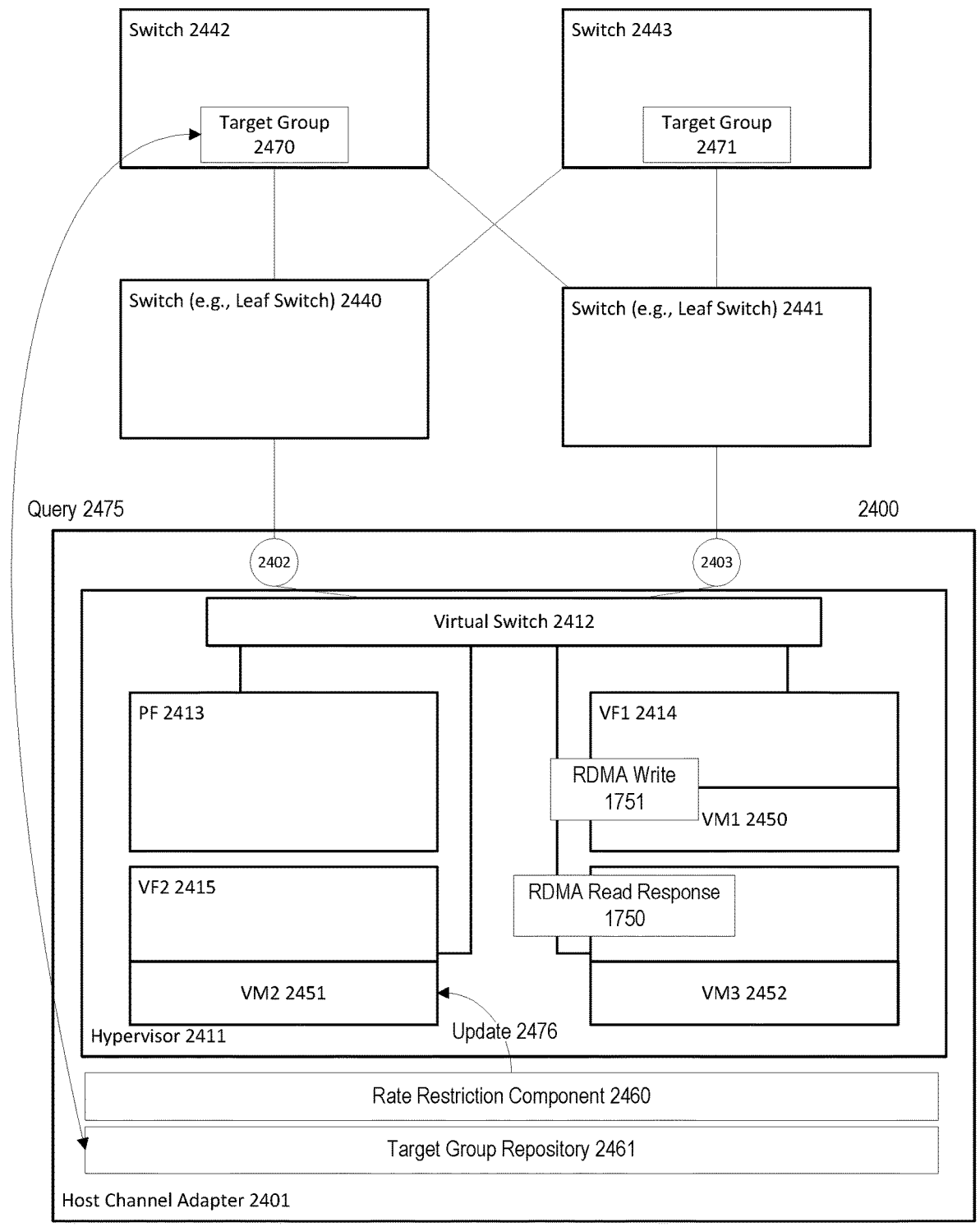
FIG. 24 shows a system for combining multiple shared bandwidth segments in a high performance computing environment, in accordance with an embodiment.

FIG. 24 shows a system for combining multiple shared bandwidth segments in a high performance computing environment, in accordance with an embodiment.

More specifically, in accordance with an embodiment, FIG. 24 shows a host channel adapter 2401 that comprises a hypervisor 2411. The hypervisor can host/be associated with a number of virtual functions (VF), such as VF2414-2416, as well as a physical function (PF) 2413. The host channel adapter can additionally support/comprise a number of ports, such as port 2402 and 2403, which are used to connect the host channel adapter to a network, such as network 2400. The network can comprise, for example, a switched network, such as an InfiniBand network or a RoCE network that can connect the HCA 2401 to a number of other nodes, such as switches, additional and separate HCAs, and the like.

In accordance with an embodiment, as described above, each of the virtual functions can host a virtual machine (VM), such as VM1 2450, VM2 2451, and VM3 2453.

In accordance with an embodiment, the host channel adapter 2401 can additionally support, via the hypervisor, a virtual switch 2412. This is for situations where a vSwitch architecture is implemented. Although not shown, embodiments of the present disclosure can additionally support a virtual port (vPort) architecture, as described above.

In accordance with an embodiment, the network 2400, as shown, can comprise a number of switches, such as switches 2440, 2441, 2442, and 2443, which are interconnected and which can be connected, e.g., via leaf switches 2440 and 2441, to the host channel adapter 2401.

In accordance with an embodiment, the switches 2440-2443 can be interconnected, and can additionally be connected with other switches and other end nodes (e.g., other HCAs) that are not shown in the figure.

In accordance with an embodiment, target groups, such as target groups 2470 and 2471, can be defined at, for example, switch ports. As shown in the figure, the target groups 2470 and 2471 are defined at switch ports of switches 2442 and 2443, respectively. These target groups 2470 and 2471 can represent, for example, bandwidth quotas as HCA objects, stored at a target group repository 2461 associated with the HCA, which is accessible by a rate restriction component 2460.

In accordance with an embodiment, the target groups 2470 and 2471 can represent specific (and different) bandwidth quotas. These bandwidth quotas can be divided into quotas for specific priorities ("QOS classes") in order to reflect the expected bandwidth usage for the various priorities within the relevant paths in the fabric that the target groups represent.

In accordance with an embodiment, the target groups 2470 and 2471 decouple the object from a specific destination address, and the systems and methods get the ability to represent an intermediate, shared link or groups of links that may represent a bandwidth limitation that is in addition to the target and that may be more restrictive than the target limit. That is, for example, if a default/original egress limit on VM2 2451 is set at one threshold, but the destination of a packet sent from VM2 would pass through target group 2470 that sets a lower bandwidth limitation, then the egress bandwidth from VM2 can be restricted to a level lower than that of default/original egress limit placed on VM2. The HCA can be responsible for such throttling/egress bandwidth limitation adjustment, dependent upon the target groups implicated by the routing of packets from VM2, for example.

In accordance with an embodiment, target groups can also be hierarchical in nature, whereby the systems and methods can consider a hierarchy of target groups (bandwidth quotas) reflecting bandwidth/link sharing at different stages towards different targets. In principle, this implies that a specific flow should be associated with the target group (max rate) that represents the most limited rate in the hierarchy. That is, for example, if target group 2470 represents a bandwidth limitation higher than that of target group 2471, and a packet is addressed through both inter-switch links represented by the two target groups, then the bandwidth limitation of target group 2471 is the controlling bandwidth limiting factor.

In accordance with an embodiment, target groups can also be shared by multiple flows. Depending on QoS and SLAs associated with respective flows, for example, the bandwidth quotas represented by target groups can be divided. As an example, of VM1 and VM2 both concurrently send flows that would implicate target group 2470, which, for example, represents a bandwidth quota of 10 Gb/s, and the respective flows have equal QoS and SLAs associated therewith, then target group 2470 would represent a 5 Gb/s limitation for each flow. This sharing or dividing of target group bandwidth quotas can be varied based upon QoS and SLAs associated with respective flows.

In accordance with an embodiment, the target group repository can query 2475 the target group 2470 to determine, for example, a bandwidth quota of the target group. Upon determining the bandwidth quota of the target group, the target group repository can store a quota value associated with the target group. This quota can then be used by the rate restriction component to a) determine if the bandwidth quota of the target group is lower than that of a bandwidth quota for a VM based on QoS or SLA, and b) on such determination, update 2476 the bandwidth quota for the VM based upon a path traversing the target group 2470.

Figure 25:
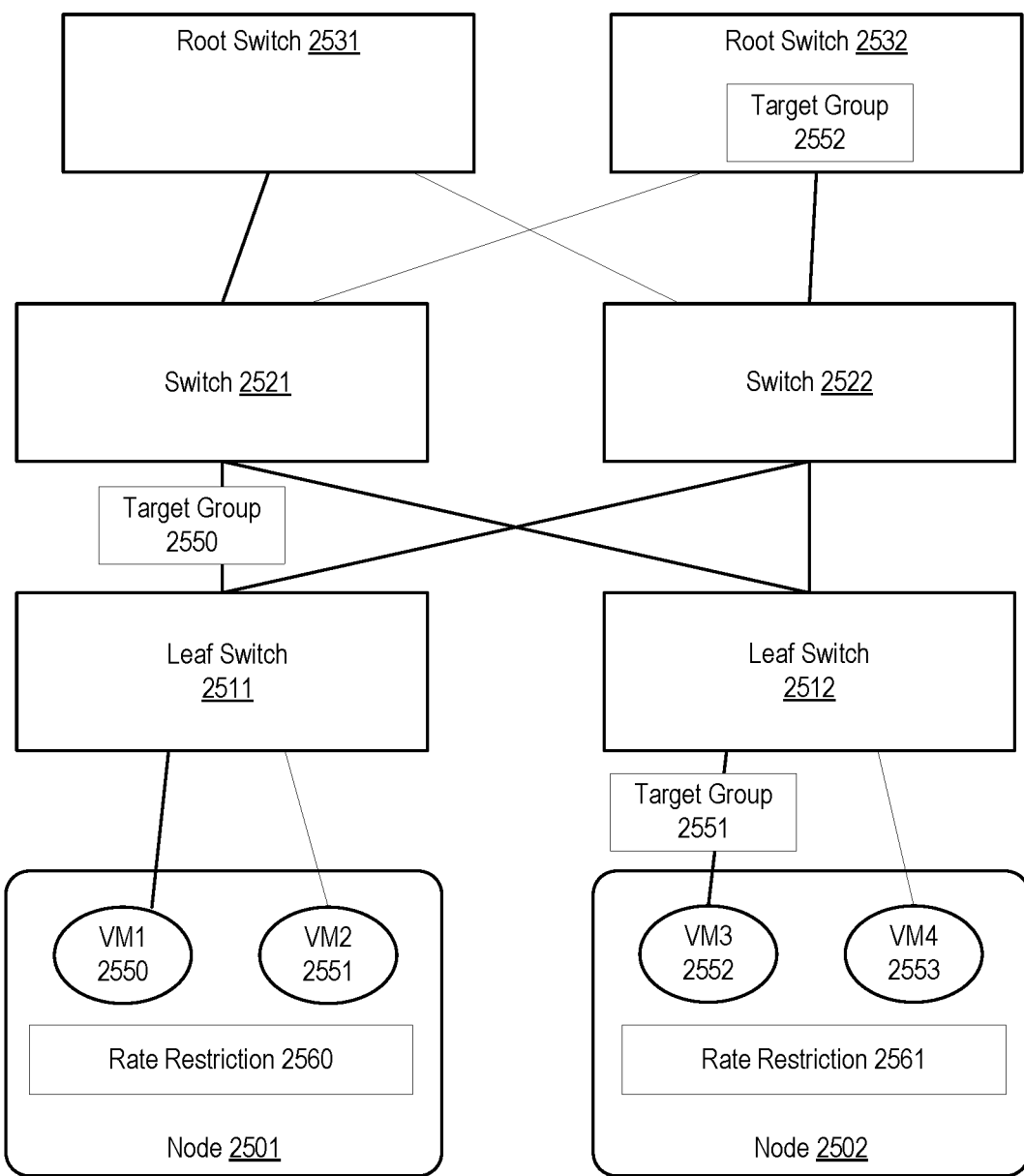
FIG. 25 shows a system for combining multiple shared bandwidth segments in a high performance computing environment, in accordance with an embodiment.

FIG. 25 shows a system for combining multiple shared bandwidth segments in a high performance computing environment, in accordance with an embodiment.

In accordance with an embodiment, within a high performance computing environment, such as a switched network or subnet 2500, a number of end nodes 2501 and 2502 can support a number of virtual machines, VM1-VM4 2550-2553, which are interconnected via a number of switches, such as leaf switches 2511 and 2512, switches 2521 and 2522, and root switches 2531 and 2532.

In accordance with an embodiment, not shown in the figure are the various host channel adapters that provided the functionality for connection of the nodes 2501 and 2502, as well as the virtual machines to be connected to the subnet. Discussion of such embodiments are above with regard to SR-IOV, wherein each virtual machine can be associated with a virtual function of a hypervisor on a host channel adapter.

In accordance with an embodiment, as discussed above, inherent in such switched fabrics is the notion that while each end node, or VM, may have its own egress/ingress bandwidth limitations that traffic flowing into and out of must abide by, there can also exist links or ports within the subnet that represent a bottleneck for traffic flowing therein. As such, when deciding at what rate traffic should flow to and from such end nodes, such as VM1, VM2, VM3, or VM4, a rate restriction component 2560 and 2561 can query various target groups, such as 2550 and 2551, to determine whether such target groups represent a bottleneck for traffic flow. Upon such determination, the rate restriction components 2560 and 2561 can then set different or new bandwidth restrictions on the end points that the rate restriction component has control over.

In accordance with an embodiment, in addition, the target groups can be queried in a nested/hierarchical manner, such that if traffic from VM1 to VM3 were to utilize both target groups 2550 and 2551, then the rate restriction 2560 could take restrictions from both such target groups into consideration when determining the bandwidth restriction from VM1 to VM3.

Figure 26:
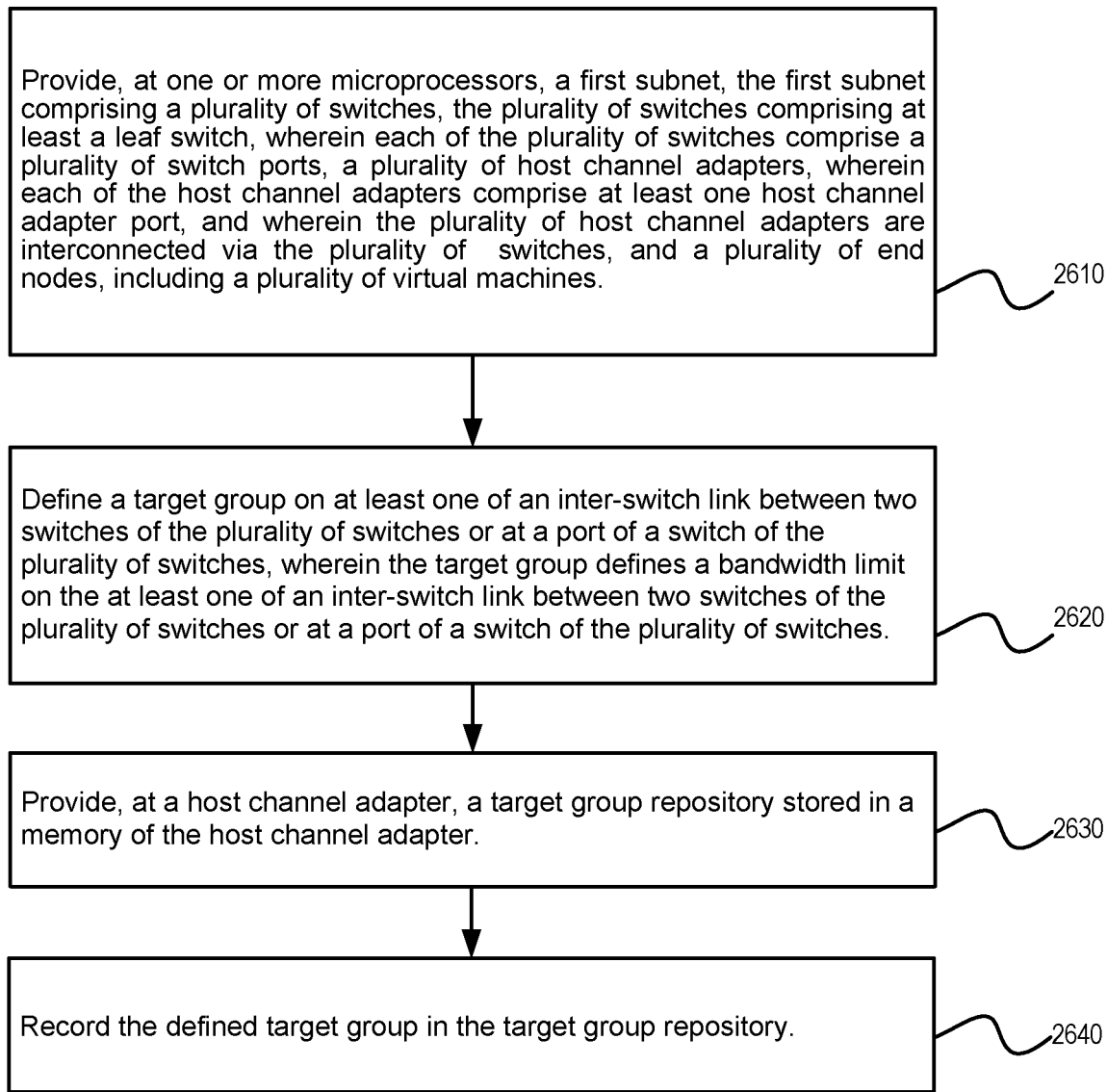
FIG. 26 is a flowchart of a method for combining multiple shared bandwidth segments in a high performance computing environment, in accordance with an embodiment.

FIG. 26 is a flowchart of a method for supporting target groups for congestion control in a private fabric in a high performance computing environment, in accordance with an embodiment.

In accordance with an embodiment, at step 2610, the method can provide, at one or more microprocessors, a first subnet, the first subnet comprising a plurality of switches, the plurality of switches comprising at least a leaf switch, wherein each of the plurality of switches comprise a plurality of switch ports, a plurality of host channel adapters, wherein each of the host channel adapters comprise at least one host channel adapter port, and wherein the plurality of host channel adapters are interconnected via the plurality of switches, and a plurality of end nodes, including a plurality of virtual machines.

In accordance with an embodiment, at step 2620, the method can define a target group on at least one of an inter-switch link between two switches of the plurality of switches or at a port of a switch of the plurality of switches, wherein the target group defines a bandwidth limit on the at least one of an inter-switch link between two switches of the plurality of switches or at a port of a switch of the plurality of switches.

In accordance with an embodiment, at step 2630, the method can provide, at a host channel adapter, a target group repository stored in a memory of the host channel adapter.

In accordance with an embodiment, at step 2640, the method can record the defined target group in the target group repository.

Combining Target Specific Send/RDMA-Write and RDMA-Read Bandwidth Restrictions (ORA200246-US-NP-2)

In accordance with an embodiment, a node/VM can be a target for incoming data traffic that is both a result of Send and RDMA-write operations initiated by peer nodes/VMs as well as a result of RDMA-read operations initiated by the local node/VM itself. In such situations, unless all these flows are coordinated in terms of rate restrictions, it becomes an issue to ensure that the max or average ingress bandwidth for the local node/VM is within the required boundaries.

In accordance with an embodiment, the systems and methods described herein can implement target specific egress rate control in a way that allows all flows that represent fetching of data from local memory and sending the data to the relevant remote target are all subject to the same shared rate limitations and associated flow scheduling and arbitration. Also, different flow types may be given different priorities and/or different shares of the available bandwidth.

In accordance with an embodiment, as long as the target group associations for flows from "producer/sender" nodes implies bandwidth regulation of all outgoing data packets—including UD (unreliable datagram) sends, RDMA write, RDMA send as well as RDMA read (i.e. the RDMA read responses with data), there is complete control of all ingress bandwidth for a vHCA port. This is independent of whether the VM owning the target vHCA port is generating "excessive" amounts of RDMA read requests to multiple peer nodes.

In accordance with an embodiment, the coupling of target groups to both flow specific and "unsolicited" BECN signaling implies the per vHCA port ingress bandwidth can be throttled dynamically for any number of remote peers.

In accordance with an embodiment, the "unsolicited BECN" messages can also be used to communicate specific rate values in addition to pure CE flagging/un-flagging for different stage numbers. In this way, it is possible to have schemes where an initial incoming packet from a new peer (e.g. a communication management (CM) packet) can trigger the generation of one or more "unsolicited BECN" messages to both the HCA (i.e. the relevant firmware/hyperprivileged software) that the incoming packet came from, as well as to current communication peers.

In accordance with an embodiment, in cases where both ports on an HCA are used concurrently (i.e. active-active scheme), then it may make sense to share target groups between the local HCA ports if it is possible that concurrent flows are sharing some ISLs or even can be targeting the same destination port.

In accordance with an embodiment, another reason for sharing target groups between HCA ports is if the HCA local memory bandwidth is not able to sustain full link speed for both (all) HCA ports. In this case, the target groups can be set up so that the total aggregated link bandwidth is never exceeding the local memory bandwidth independently of which port is involved on either source or destination HCA.

In accordance with an embodiment, in cases with fixed routes towards a specific destination, any intermediate target group(s) will typically represent only a single ISL at a specific stage in the path. However, when dynamic forwarding is active, then both target groups as well as ECN handling must take this into account. In the case where dynamic forwarding decisions will only take place in order to balance traffic between parallel ISLs between a pair of switches (e.g. uplinks from a single leaf switch to a single spine switch), then all handling is in principle very similar to when only a single ISL is being used. FECN notification would take place based on the state of all ports in the relevant group and the signaling could be "aggressive" in the sense that it is signaled based on congestion indication from any of the ports, or it could be more conservative and be based on the size of a shared output queue for all ports in the group. Target group configuration would normally represent the aggregated bandwidth for all links in the group as long as the forwarding allows any packet to select the best output port at that point in time. However, if there is a notion of strict packet order preservation for each flow, then the evaluation of bandwidth quotas is more complex since some flows may "have to" use the same ISL at some point in time. If such flow-order schemes are based on well-defined header fields, then it may be best to represent each port in the group as an independent target group. In this case, the selection of target group at the sender side HCA must be able to make the same evaluation of header fields that will be associated with an RC QP connection or address handle as what the switch will perform at run time for every packet.

In accordance with an embodiment, by default, an initial target group rate for a new remote target can be set conservatively low. In this way, there is an inherent throttling until the target has had a chance to update the relevant rate. Hence, all such rate control is independent of the involved VMs themselves, but the VM would be able to request the hypervisor to update the quotas for different remote peers for both ingress and egress traffic, but this would only be granted within the total constraints defined for both the local and remote vHCA ports.

Figure 27:
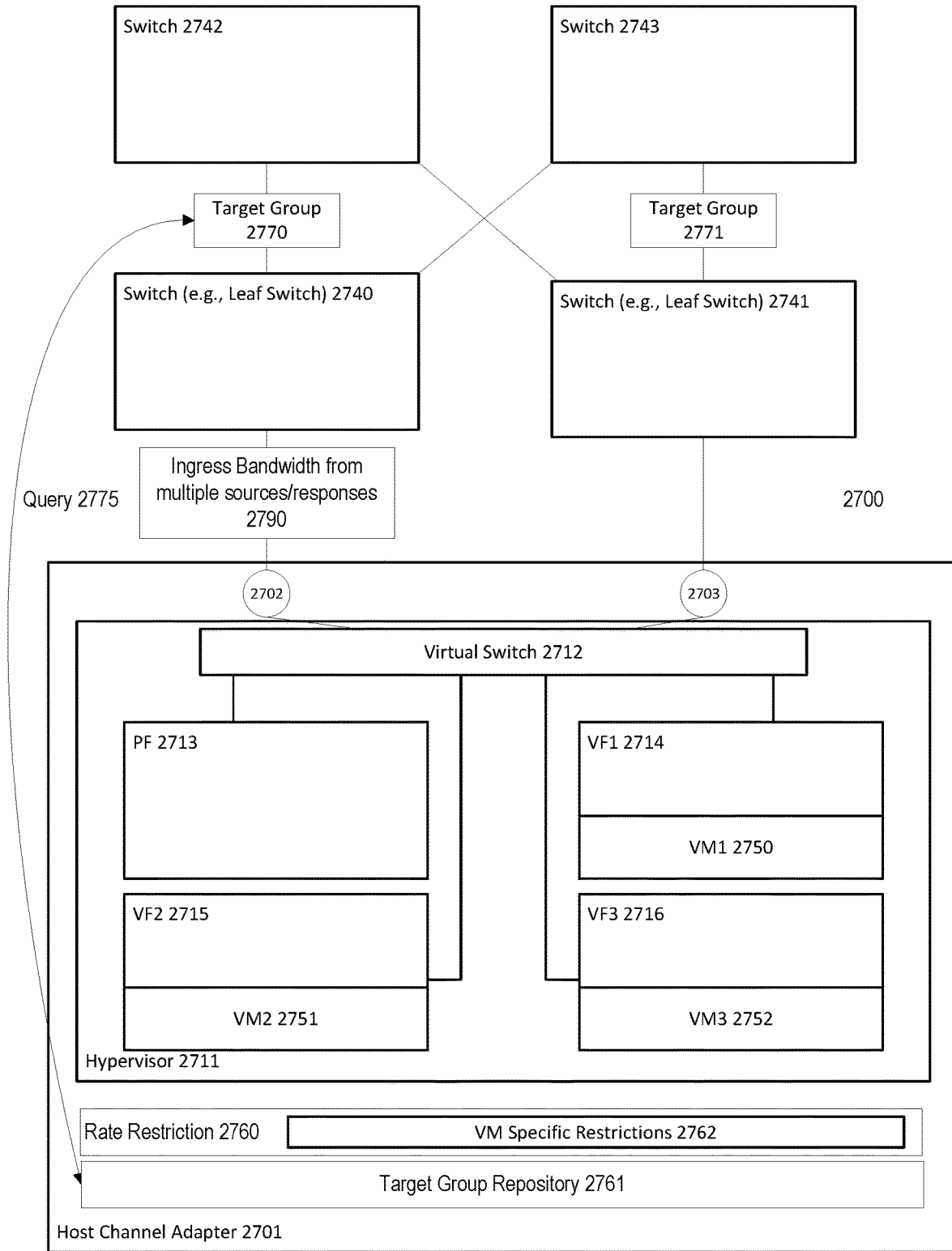
FIG. 27 shows a system for combining target specific RDMA-write and RDMA-read bandwidth restrictions in a high performance computing environment, in accordance with an embodiment.

FIG. 27 shows a system for combining target specific RDMA-write and RDMA-read bandwidth restrictions in a high performance computing environment, in accordance with an embodiment.

More specifically, in accordance with an embodiment, FIG. 27 shows a host channel adapter 2701 that comprises a hypervisor 2711. The hypervisor can host/be associated with a number of virtual functions (VF), such as VF2714-2716, as well as a physical function (PF) 2713. The host channel adapter can additionally support/comprise a number of ports, such as port 2702 and 2703, which are used to connect the host channel adapter to a network, such as network 2700. The network can comprise, for example, a switched network, such as an InfiniBand network or a RoCE network that can connect the HCA 2701 to a number of other nodes, such as switches, additional and separate HCAs, and the like.

In accordance with an embodiment, as described above, each of the virtual functions can host a virtual machine (VM), such as VM1 2750, VM2 2751, and VM3 2752.

In accordance with an embodiment, the host channel adapter 2701 can additionally support, via the hypervisor, a virtual switch 2712. This is for situations where a vSwitch architecture is implemented. Although not shown, embodiments of the present disclosure can additionally support a virtual port (vPort) architecture, as described above.

In accordance with an embodiment, the network 2700, as shown, can comprise a number of switches, such as switches 2740, 2741, 2742, and 2743, which are interconnected and which can be connected, e.g., via leaf switches 2740 and 2741, to the host channel adapter 2701.

In accordance with an embodiment, the switches 2740-2743 can be interconnected, and can additionally be connected with other switches and other end nodes (e.g., other HCAs) that are not shown in the figure.

In accordance with an embodiment, target groups, such as target groups 2770 and 2771, can be defined at inter-switch links (ISLs), such as ISLs between leaf switch 2740 and switch 2742, as well as leaf switch 2741 and switch 2743. These target groups 2770 and 2771 can represent, for example, bandwidth quotas as HCA objects, stored at a target group repository 2761 associated with the HCA, which is accessible by a rate restriction component 2760.

In accordance with an embodiment, the target groups 2770 and 2771 can represent specific (and different) bandwidth quotas. These bandwidth quotas can be divided into quotas for specific priorities ("QOS classes") in order to reflect the expected bandwidth usage for the various priorities within the relevant paths in the fabric that the target groups represent.

In accordance with an embodiment, the target groups 2770 and 2771 decouple the object from a specific destination address, and the systems and methods get the ability to represent an intermediate, shared link or groups of links that may represent a bandwidth limitation that is in addition to the target and that may be more restrictive than the target limit. That is, for example, if a default/original egress limit on VM2 2751 is set at one threshold, but the destination of a packet sent from VM2 would pass through target group 2770 that sets a lower bandwidth limitation, then the egress bandwidth from VM2 can be restricted to a level lower than that of default/original egress limit placed on VM2. The HCA can be responsible for such throttling/egress bandwidth limitation adjustment, dependent upon the target groups implicated by the routing of packets from VM2, for example.

In accordance with an embodiment, target groups can also be hierarchical in nature, whereby the systems and methods can consider a hierarchy of target groups (bandwidth quotas) reflecting bandwidth/link sharing at different stages towards different targets. In principle, this implies that a specific flow should be associated with the target group (max rate) that represents the most limited rate in the hierarchy. That is, for example, if target group 2770 represents a bandwidth limitation higher than that of target group 2771, and a packet is addressed through both inter-switch links represented by the two target groups, then the bandwidth limitation of target group 2771 is the controlling bandwidth limiting factor.

In accordance with an embodiment, target groups can also be shared by multiple flows. Depending on QoS and SLAs associated with respective flows, for example, the bandwidth quotas represented by target groups can be divided. As an example, of VM1 and VM2 both concurrently send flows that would implicate target group 2770, which, for example, represents a bandwidth quota of 10 Gb/s, and the respective flows have equal QoS and SLAs associated therewith, then target group 2770 would represent a 5 Gb/s limitation for each flow. This sharing or dividing of target group bandwidth quotas can be varied based upon QoS and SLAs associated with respective flows.

In accordance with an embodiment, bandwidth quota and performance issues may arise when a VM, e.g., VM1 2750, is subject to an excess of ingress bandwidth 2790 from multiple sources. This can arise, for example, in situations where VM1 is subject to one or more RDMA read responses concurrently with one or more RDMA write operations, where the ingress bandwidth on VM1 is coming from two or more sources (e.g., one RDMA read response from a connected VM, and one RDMA write request from another connected VM). In such situations, for example, a target group, such as target group 2770 on an inter-switch link, can be updated to reflect a lower bandwidth quota, via a, e.g., a query 2775, than would typically be allowed.

In accordance with an embodiment, in addition, the rate restriction component 2760 of the HCA can additionally comprise VM specific rate restrictions 2762, which can be negotiated with other peer HCAs in order to coordinate an ingress bandwidth restriction, e.g., for VM1, with egress bandwidth restrictions for the nodes responsible for generating the ingress bandwidth on VM1. These other HCAs/nodes are not shown in the figure.

Figure 28:
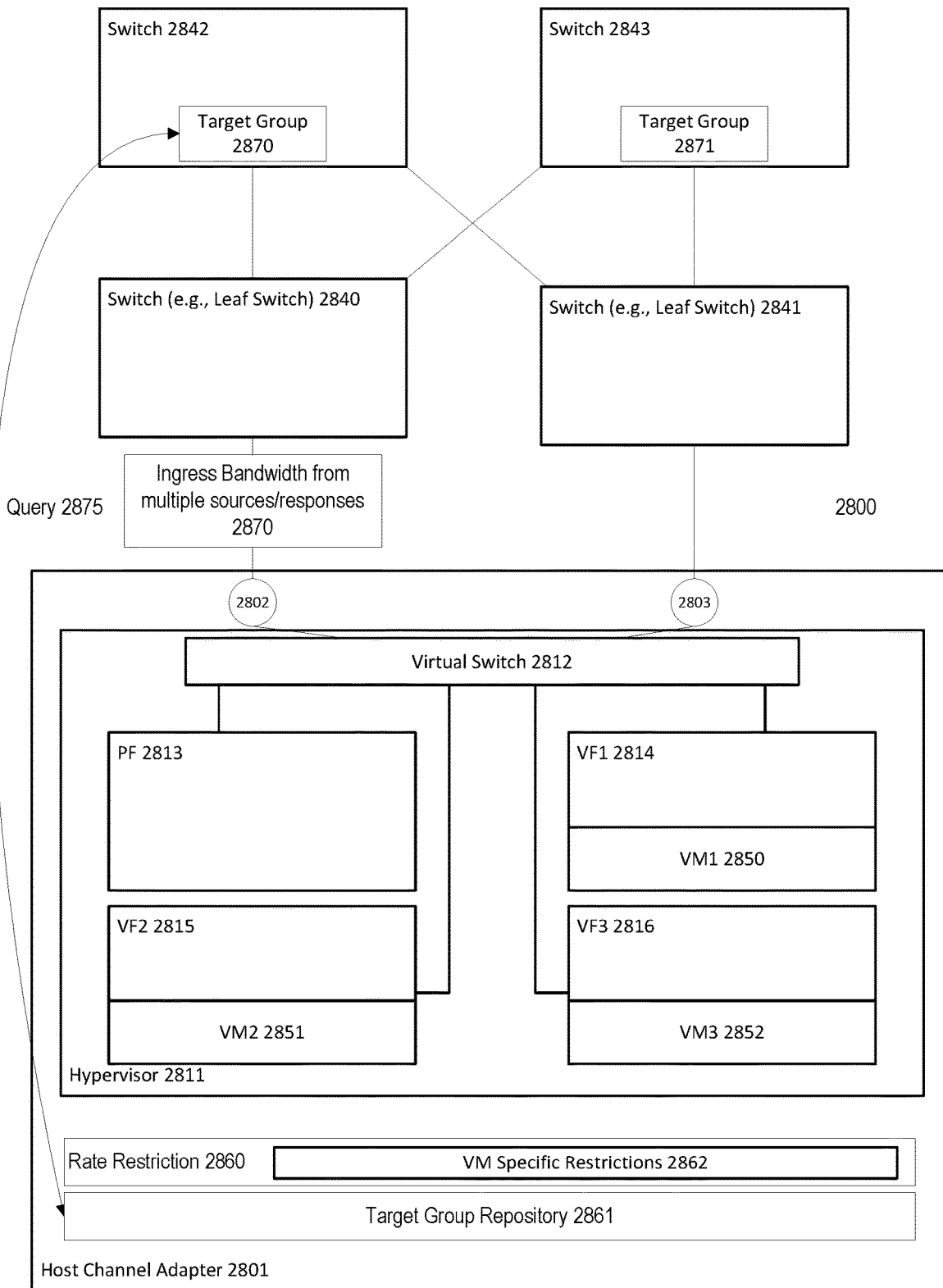
FIG. 28 shows a system for combining target specific RDMA-write and RDMA-read bandwidth restrictions in a high performance computing environment, in accordance with an embodiment.

FIG. 28 shows a system for combining target specific RDMA-write and RDMA-read bandwidth restrictions in a high performance computing environment, in accordance with an embodiment.

More specifically, in accordance with an embodiment, FIG. 28 shows a host channel adapter 2801 that comprises a hypervisor 2811. The hypervisor can host/be associated with a number of virtual functions (VF), such as VF2814-2816, as well as a physical function (PF) 2813. The host channel adapter can additionally support/comprise a number of ports, such as port 2802 and 2803, which are used to connect the host channel adapter to a network, such as network 2800. The network can comprise, for example, a switched network, such as an InfiniBand network or a RoCE network that can connect the HCA 2801 to a number of other nodes, such as switches, additional and separate HCAs, and the like.

In accordance with an embodiment, as described above, each of the virtual functions can host a virtual machine (VM), such as VM1 2850, VM2 2851, and VM3 2852.

In accordance with an embodiment, the host channel adapter 2801 can additionally support, via the hypervisor, a virtual switch 2812. This is for situations where a vSwitch architecture is implemented. Although not shown, embodiments of the present disclosure can additionally support a virtual port (vPort) architecture, as described above.

In accordance with an embodiment, the network 2800, as shown, can comprise a number of switches, such as switches 2840, 2841, 2842, and 2843, which are interconnected and which can be connected, e.g., via leaf switches 2840 and 2841, to the host channel adapter 2801.

In accordance with an embodiment, the switches 2840-2843 can be interconnected, and can additionally be connected with other switches and other end nodes (e.g., other HCAs) that are not shown in the figure.

In accordance with an embodiment, target groups, such as target groups 2870 and 2871, can be defined at, for example, switch ports. As shown in the figure, the target groups 2870 and 2871 are defined at switch ports of switches 2842 and 2843, respectively. These target groups 2870 and 2871 can represent, for example, bandwidth quotas as HCA objects, stored at a target group repository 2861 associated with the HCA, which is accessible by a rate restriction component 2860.

In accordance with an embodiment, the target groups 2870 and 2871 can represent specific (and different) bandwidth quotas. These bandwidth quotas can be divided into quotas for specific priorities ("QOS classes") in order to reflect the expected bandwidth usage for the various priorities within the relevant paths in the fabric that the target groups represent.

In accordance with an embodiment, the target groups 2870 and 2871 decouple the object from a specific destination address, and the systems and methods get the ability to represent an intermediate, shared link or groups of links that may represent a bandwidth limitation that is in addition to the target and that may be more restrictive than the target limit. That is, for example, if a default/original egress limit on VM2 2851 is set at one threshold, but the destination of a packet sent from VM2 would pass through target group 2870 that sets a lower bandwidth limitation, then the egress bandwidth from VM2 can be restricted to a level lower than that of default/original egress limit placed on VM2. The HCA can be responsible for such throttling/egress bandwidth limitation adjustment, dependent upon the target groups implicated by the routing of packets from VM2, for example.

In accordance with an embodiment, target groups can also be hierarchical in nature, whereby the systems and methods can consider a hierarchy of target groups (bandwidth quotas) reflecting bandwidth/link sharing at different stages towards different targets. In principle, this implies that a specific flow should be associated with the target group (max rate) that represents the most limited rate in the hierarchy. That is, for example, if target group 2870 represents a bandwidth limitation higher than that of target group 2871, and a packet is addressed through both inter-switch links represented by the two target groups, then the bandwidth limitation of target group 2871 is the controlling bandwidth limiting factor.

In accordance with an embodiment, target groups can also be shared by multiple flows. Depending on QoS and SLAs associated with respective flows, for example, the bandwidth quotas represented by target groups can be divided. As an example, of VM1 and VM2 both concurrently send flows that would implicate target group 2870, which, for example, represents a bandwidth quota of 10 Gb/s, and the respective flows have equal QoS and SLAs associated therewith, then target group 2870 would represent a 5 Gb/s limitation for each flow. This sharing or dividing of target group bandwidth quotas can be varied based upon QoS and SLAs associated with respective flows.

In accordance with an embodiment, bandwidth quota and performance issues may arise when a VM, e.g., VM1 2850, is subject to an excess of ingress bandwidth 2890 from multiple sources. This can arise, for example, in situations where VM1 is subject to one or more RDMA read responses concurrently with one or more RDMA write operations, where the ingress bandwidth on VM1 is coming from two or more sources (e.g., one RDMA read response from a connected VM, and one RDMA write request from another connected VM). In such situations, for example, a target group, such as target group 2870 on an inter-switch link, can be updated to reflect a lower bandwidth quota, via a, e.g., a query 2875, that would typically be allowed.

In accordance with an embodiment, in addition, the rate restriction component 2860 of the HCA can additionally comprise VM specific rate restrictions 2862, which can be negotiated with other peer HCAs in order to coordinate an ingress bandwidth restriction, e.g., for VM1, with egress bandwidth restrictions for the nodes responsible for generating the ingress bandwidth on VM1. These other HCAs/nodes are not shown in the figure.

Figure 29:
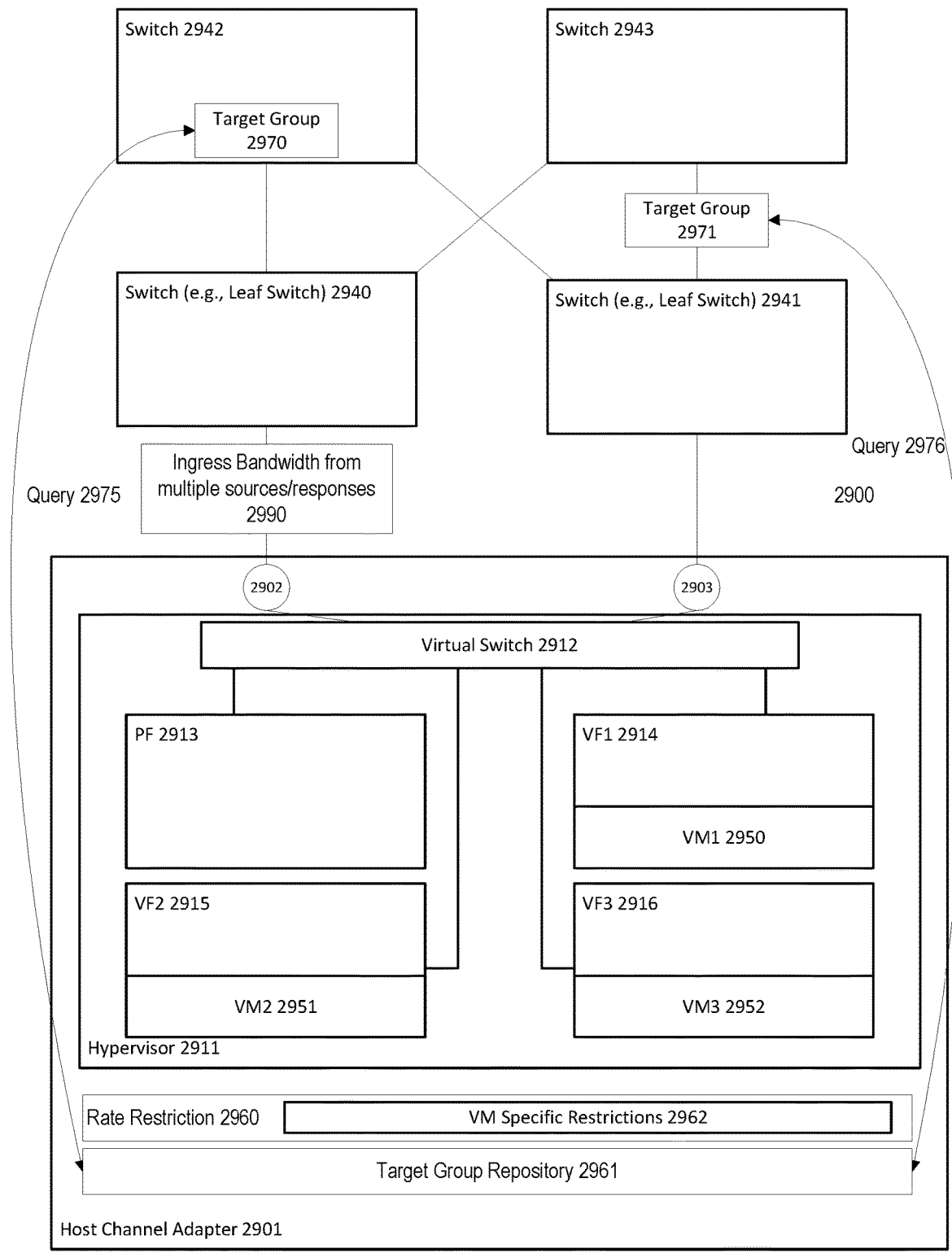
FIG. 29 shows a system for combining target specific RDMA-write and RDMA-read bandwidth restrictions in a high performance computing environment, in accordance with an embodiment.

FIG. 29 shows a system for combining target specific RDMA-write and RDMA-read bandwidth restrictions in a high performance computing environment, in accordance with an embodiment.

More specifically, in accordance with an embodiment, FIG. 29 shows a host channel adapter 2901 that comprises a hypervisor 2911. The hypervisor can host/be associated with a number of virtual functions (VF), such as VF2914-2916, as well as a physical function (PF) 2913. The host channel adapter can additionally support/comprise a number of ports, such as port 2902 and 2903, which are used to connect the host channel adapter to a network, such as network 2900. The network can comprise, for example, a switched network, such as an InfiniBand network or a RoCE network that can connect the HCA 2901 to a number of other nodes, such as switches, additional and separate HCAs, and the like.

In accordance with an embodiment, as described above, each of the virtual functions can host a virtual machine (VM), such as VM1 2950, VM2 2951, and VM3 2952.

In accordance with an embodiment, the host channel adapter 2901 can additionally support, via the hypervisor, a virtual switch 2912. This is for situations where a vSwitch architecture is implemented. Although not shown, embodiments of the present disclosure can additionally support a virtual port (vPort) architecture, as described above.

In accordance with an embodiment, the network 2900, as shown, can comprise a number of switches, such as switches 2940, 2941, 2942, and 2943, which are interconnected and which can be connected, e.g., via leaf switches 2940 and 2941, to the host channel adapter 2901.

In accordance with an embodiment, the switches 2940-2943 can be interconnected, and can additionally be connected with other switches and other end nodes (e.g., other HCAs) that are not shown in the figure.

In accordance with an embodiment, target groups, such as target groups 2971 can be defined along inter-switch links (ISLs), such as ISLs between leaf switch 2941 and switch 2943. Other target groups can be defined at, for example, switch ports. As shown in the figure, the target group 2970 is defined at switch ports of switches 2952. These target groups 2970 and 2971 can represent, for example, bandwidth quotas as HCA objects, stored at a target group repository 2961 associated with the HCA, which is accessible by a rate restriction component 2960.

In accordance with an embodiment, the target groups 2970 and 2971 can represent specific (and different) bandwidth quotas. These bandwidth quotas can be divided into quotas for specific priorities ("QOS classes") in order to reflect the expected bandwidth usage for the various priorities within the relevant paths in the fabric that the target groups represent.

In accordance with an embodiment, the target groups 2970 and 2971 decouple the object from a specific destination address, and the systems and methods get the ability to represent an intermediate, shared link or groups of links that may represent a bandwidth limitation that is in addition to the target and that may be more restrictive than the target limit. That is, for example, if a default/original egress limit on VM2 2951 is set at one threshold, but the destination of a packet sent from VM2 would pass through target group 2970 that sets a lower bandwidth limitation, then the egress bandwidth from VM2 can be restricted to a level lower than that of default/original egress limit placed on VM2. The HCA can be responsible for such throttling/egress bandwidth limitation adjustment, dependent upon the target groups implicated by the routing of packets from VM2, for example.

In accordance with an embodiment, target groups can also be hierarchical in nature, whereby the systems and methods can consider a hierarchy of target groups (bandwidth quotas) reflecting bandwidth/link sharing at different stages towards different targets. In principle, this implies that a specific flow should be associated with the target group (max rate) that represents the most limited rate in the hierarchy. That is, for example, if target group 2970 represents a bandwidth limitation higher than that of target group 2971, and a packet is addressed through both inter-switch links represented by the two target groups, then the bandwidth limitation of target group 2971 is the controlling bandwidth limiting factor.

In accordance with an embodiment, target groups can also be shared by multiple flows. Depending on QoS and SLAs associated with respective flows, for example, the bandwidth quotas represented by target groups can be divided. As an example, of VM1 and VM2 both concurrently send flows that would implicate target group 2970, which, for example, represents a bandwidth quota of 10 Gb/s, and the respective flows have equal QoS and SLAs associated therewith, then target group 2970 would represent a 5 Gb/s limitation for each flow. This sharing or dividing of target group bandwidth quotas can be varied based upon QoS and SLAs associated with respective flows.

In accordance with an embodiment, bandwidth quota and performance issues may arise when a VM, e.g., VM1 2950, is subject to an excess of ingress bandwidth 2990 from multiple sources. This can arise, for example, in situations where VM1 is subject to one or more RDMA read responses concurrently with one or more RDMA write operations, where the ingress bandwidth on VM1 is coming from two or more sources (e.g., one RDMA read response from a connected VM, and one RDMA write request from another connected VM). In such situations, for example, a target group, such as target group 2970 on an inter-switch link, can be updated to reflect a lower bandwidth quota, via a, e.g., a query 2975, that would typically be allowed.

In accordance with an embodiment, in addition, the rate restriction component 2960 of the HCA can additionally comprise VM specific rate restrictions 2962, which can be negotiated with other peer HCAs in order to coordinate an ingress bandwidth restriction, e.g., for VM1, with egress bandwidth restrictions for the nodes responsible for generating the ingress bandwidth on VM1. These other HCAs/nodes are not shown in the figure.

Figure 30:
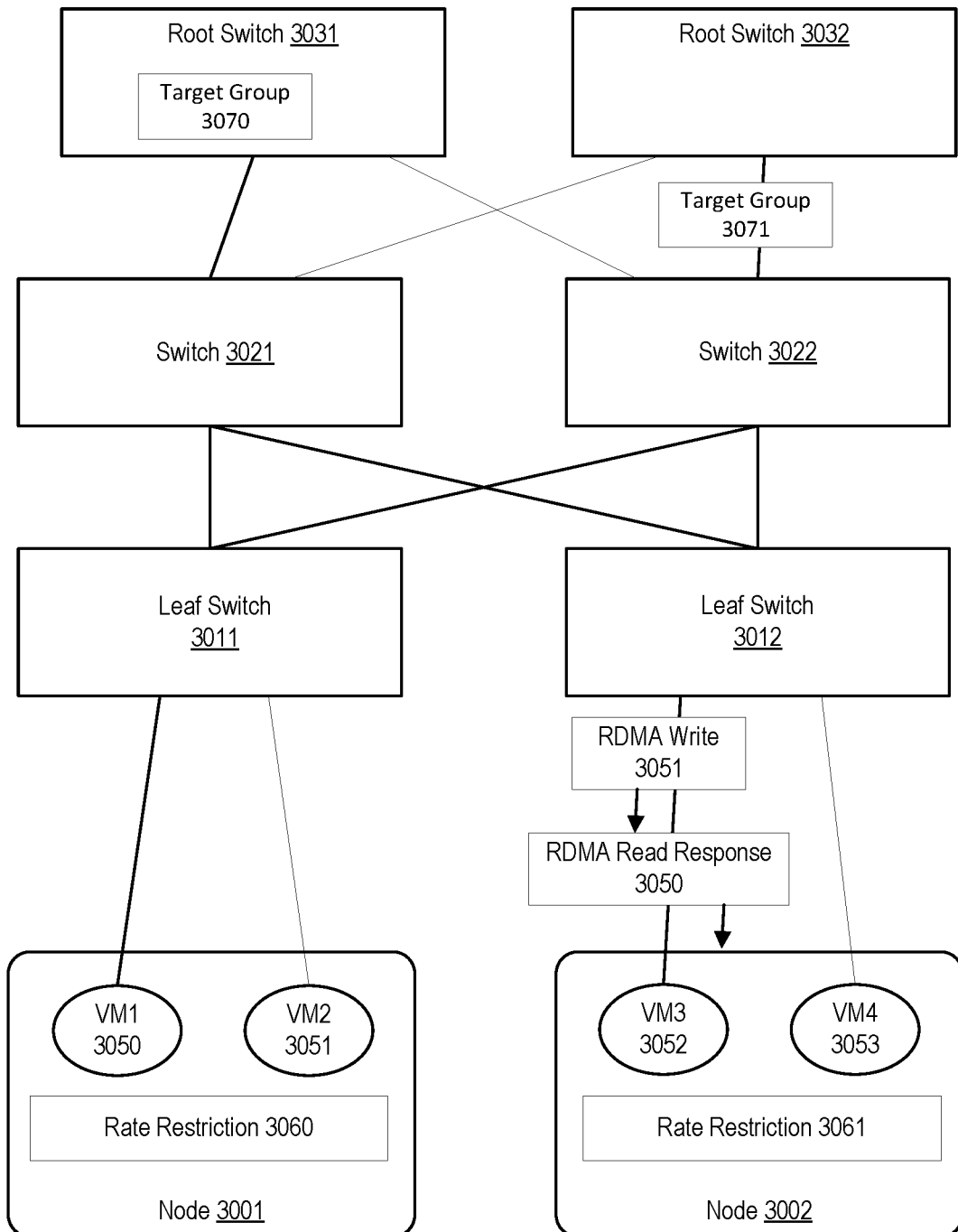
FIG. 30 shows a system for combining target specific RDMA-write and RDMA-read bandwidth restrictions in a high performance computing environment, in accordance with an embodiment.

FIG. 30 shows a system for combining target specific RDMA-write and RDMA-read bandwidth restrictions in a high performance computing environment, in accordance with an embodiment.

In accordance with an embodiment, within a high performance computing environment, such as a switched network or subnet 3000, a number of end nodes 3001 and 3002 can support a number of virtual machines, VM1-VM4 3050-3053, which are interconnected via a number of switches, such as leaf switches 3011 and 3012, switches 3021 and 3022, and root switches 3031 and 3032.

In accordance with an embodiment, not shown in the figure are the various host channel adapters that provided the functionality for connection of the nodes 3001 and 3002, as well as the virtual machines to be connected to the subnet. Discussion of such embodiments are above with regard to SR-IOV, wherein each virtual machine can be associated with a virtual function of a hypervisor on a host channel adapter.

In accordance with an embodiment, a node, such as VM3 3052, can run into bandwidth restrictions (e.g., from rate restriction 3061) when it is concurrently processing RDMA read responses 3050 and RDMA write requests 3051 (bandwidth on ingress).

In accordance with an embodiment, the rate restrictions 3060 and 3061 can be configured, for example, to ensure that the ingress bandwidth quotas are not violated by coordinating the of RDMA requests (i.e., a message sent by VM3 to VM4 requesting a RDMA read, resulting in RDMA read response 3050), as well as RDMA write operations (e.g., a RDMA write from VM2 to VM3).

For each individual node, systems and methods can have a chain of such target groups such that the flow will always be coordinated with all other flows that share link bandwidth in different parts of the fabric that are represented in the target group.

Figure 31:
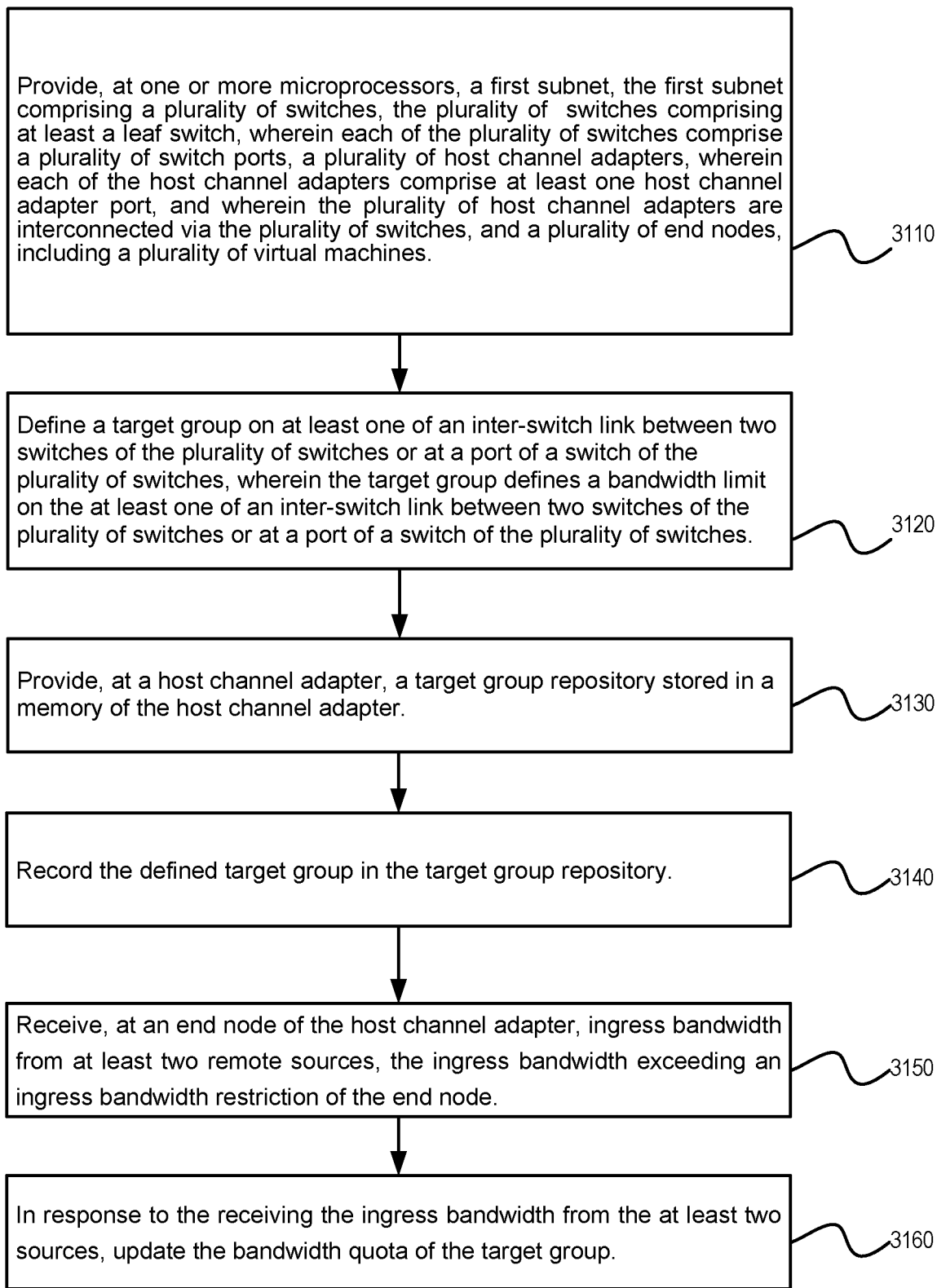
FIG. 31 is a flowchart of a method for combining target specific RDMA-write and RDMA-read bandwidth restrictions in a high performance computing environment, in accordance with an embodiment.

FIG. 31 is a flowchart of a method for combining target specific RDMA-write and RDMA-read bandwidth restrictions in a high performance computing environment, in accordance with an embodiment.

In accordance with an embodiment, at step 3110, the method can provide, at one or more microprocessors, a first subnet, the first subnet comprising a plurality of switches, the plurality of switches comprising at least a leaf switch, wherein each of the plurality of switches comprise a plurality of switch ports, a plurality of host channel adapters, wherein each of the host channel adapters comprise at least one host channel adapter port, and wherein the plurality of host channel adapters are interconnected via the plurality of switches, and a plurality of end nodes, including a plurality of virtual machines.

In accordance with an embodiment, at step 3120, the method can define a target group on at least one of an inter-switch link between two switches of the plurality of switches or at a port of a switch of the plurality of switches, wherein the target group defines a bandwidth limit on the at least one of an inter-switch link between two switches of the plurality of switches or at a port of a switch of the plurality of switches.

In accordance with an embodiment, at step 3130, the method can provide, at a host channel adapter, a target group repository stored in a memory of the host channel adapter.

In accordance with an embodiment, at step 3140, the method can record the defined target group in the target group repository.

In accordance with an embodiment, at step 3150, the method can receive, at an end node of the host channel adapter, ingress bandwidth from at least two remote sources, the ingress bandwidth exceeding an ingress bandwidth restriction of the end node.

In accordance with an embodiment, at 3160, in response to the receiving the ingress bandwidth from the at least two sources, the method can update the bandwidth quota of the target group.

Combining Ingress Bandwidth Arbitration And Congestion Feedback (ORA200246-US-NP-2)

In accordance with an embodiment, when multiple sender nodes/VMs are each and/or all sending to a single receiver node/VM, it is not straight forward to achieve an optimal balance between fairness between the senders, avoiding congestion, and at the same time restrict the ingress bandwidth usage the receiver node/VM consumes to be below a max limit that is (well) below the maximum physical link bandwidth that the relevant network interface can provide for ingress traffic. Further, when different senders are supposed to be allocated different bandwidth quotas due to different SLA levels, then the equation becomes even more complex.

In accordance with an embodiment, the systems and methods herein can extend the legacy schemes for end-to-end congestion feedback to include both initial negotiation of bandwidth quotas, dynamic adjustment of such bandwidth quotas (e.g. to adapt to changes in the number of sender nodes sharing the available bandwidth, or changes in SLAs), as well as dynamic congestion feedback to indicate that senders need to temporarily slow down the relevant egress data rate despite that the overall bandwidth quota remains the same. Use both explicit, unsolicited messages as well as "piggyback" information in data packets to convey relevant information from target nodes to sender nodes.

Figure 32:
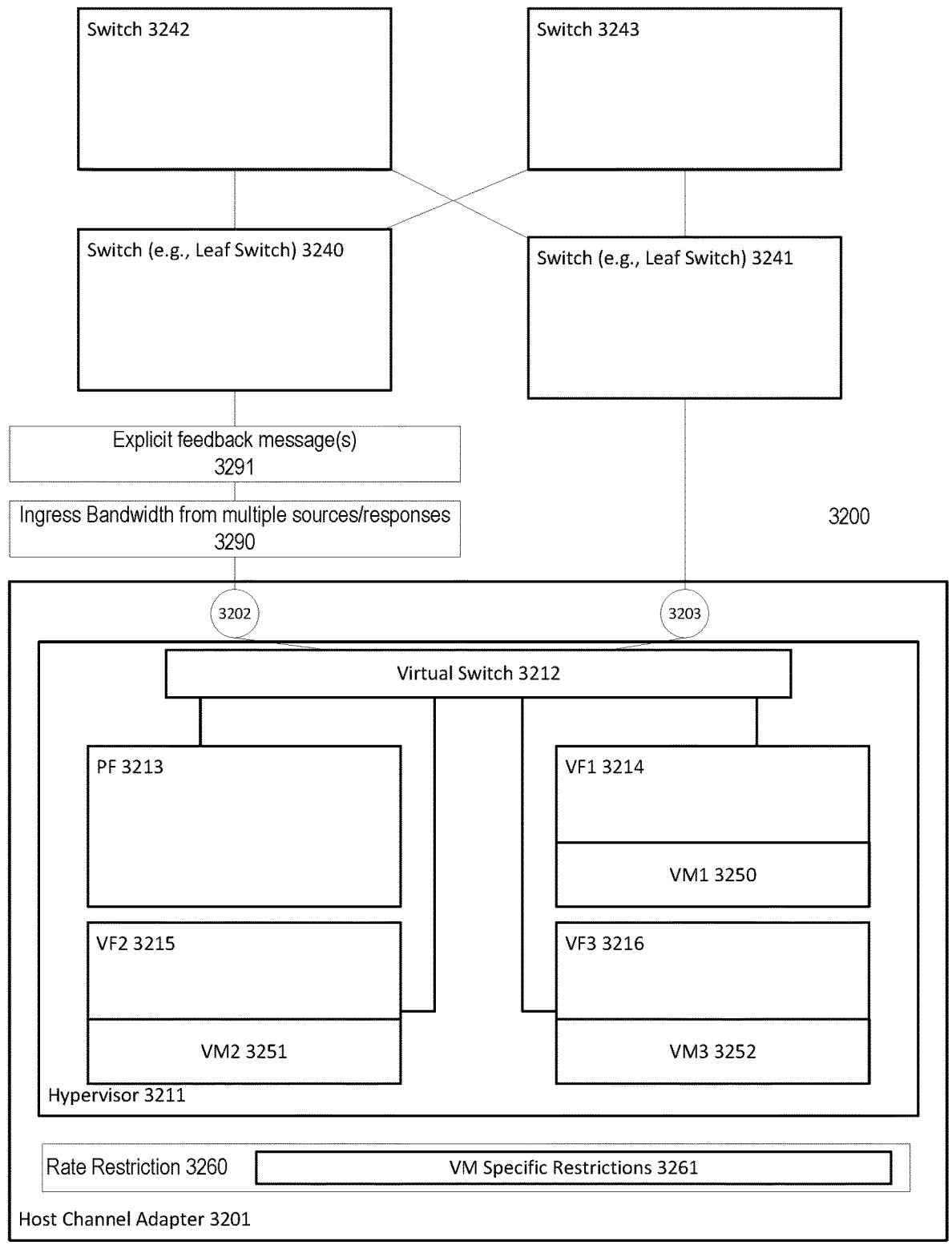
FIG. 32 shows a system for combining ingress bandwidth arbitration and congestion feedback in a high performance computing environment, in accordance with an embodiment.

FIG. 32 shows a system for combining ingress bandwidth arbitration and congestion feedback in a high performance computing environment, in accordance with an embodiment.

More specifically, in accordance with an embodiment, FIG. 32 shows a host channel adapter 3201 that comprises a hypervisor 3211. The hypervisor can host/be associated with a number of virtual functions (VF), such as VF3214-3216, as well as a physical function (PF) 3213. The host channel adapter can additionally support/comprise a number of ports, such as port 3202 and 3203, which are used to connect the host channel adapter to a network, such as network 3200. The network can comprise, for example, a switched network, such as an InfiniBand network or a RoCE network that can connect the HCA 3201 to a number of other nodes, such as switches, additional and separate HCAs, and the like.

In accordance with an embodiment, as described above, each of the virtual functions can host a virtual machine (VM), such as VM1 3250, VM2 3251, and VM3 3252.

In accordance with an embodiment, the host channel adapter 3201 can additionally support, via the hypervisor, a virtual switch 3212. This is for situations where a vSwitch architecture is implemented. Although not shown, embodiments of the present disclosure can additionally support a virtual port (vPort) architecture, as described above.

In accordance with an embodiment, the network 3200, as shown, can comprise a number of switches, such as switches 3240, 3241, 3242, and 3243, which are interconnected and which can be connected, e.g., via leaf switches 3240 and 3241, to the host channel adapter 3201.

In accordance with an embodiment, the switches 3240-3243 can be interconnected, and can additionally be connected with other switches and other end nodes (e.g., other HCAs) that are not shown in the figure.

In accordance with an embodiment, bandwidth quota and performance issues may arise when a VM, e.g., VM1 3250, is subject to an excess of ingress bandwidth 3290 from multiple sources. This can arise, for example, in situations where VM1 is subject to one or more RDMA read responses concurrently with one or more RDMA write operations, where the ingress bandwidth on VM1 is coming from two or more sources (e.g., one RDMA read response from a connected VM, and one RDMA write request from another connected VM).

In accordance with an embodiment, the rate restriction component 3260 of the HCA can additionally comprise VM specific rate restrictions 3261, which can be negotiated with other peer HCAs in order to coordinate an ingress bandwidth restriction, e.g., for VM1, with egress bandwidth restrictions for the nodes responsible for generating the ingress bandwidth on VM1. Such initial negotiation can be performed, for example, to adapt to changes in the number of sender nodes sharing the available bandwidth, or changes in SLAs. These other HCAs/nodes are not shown in the figure.

In accordance with an embodiment, the negotiations above can be updated based upon, for example, explicit and unsolicited feedback messages 3291 generated as a result of the ingress bandwidth. Such feedback messages 3291 can be sent, for example, to multiple remote nodes responsible for generating the ingress bandwidth 3290 on VM1. Upon receiving such feedback messages, the sender nodes (senders of bandwidth responsible for the ingress bandwidth on VM1) can update their relevant egress bandwidth restrictions on the sender nodes in order to not overload, e.g., links connecting to VM1, while still attempting to maintain QoS and SLAs.

Figure 33:
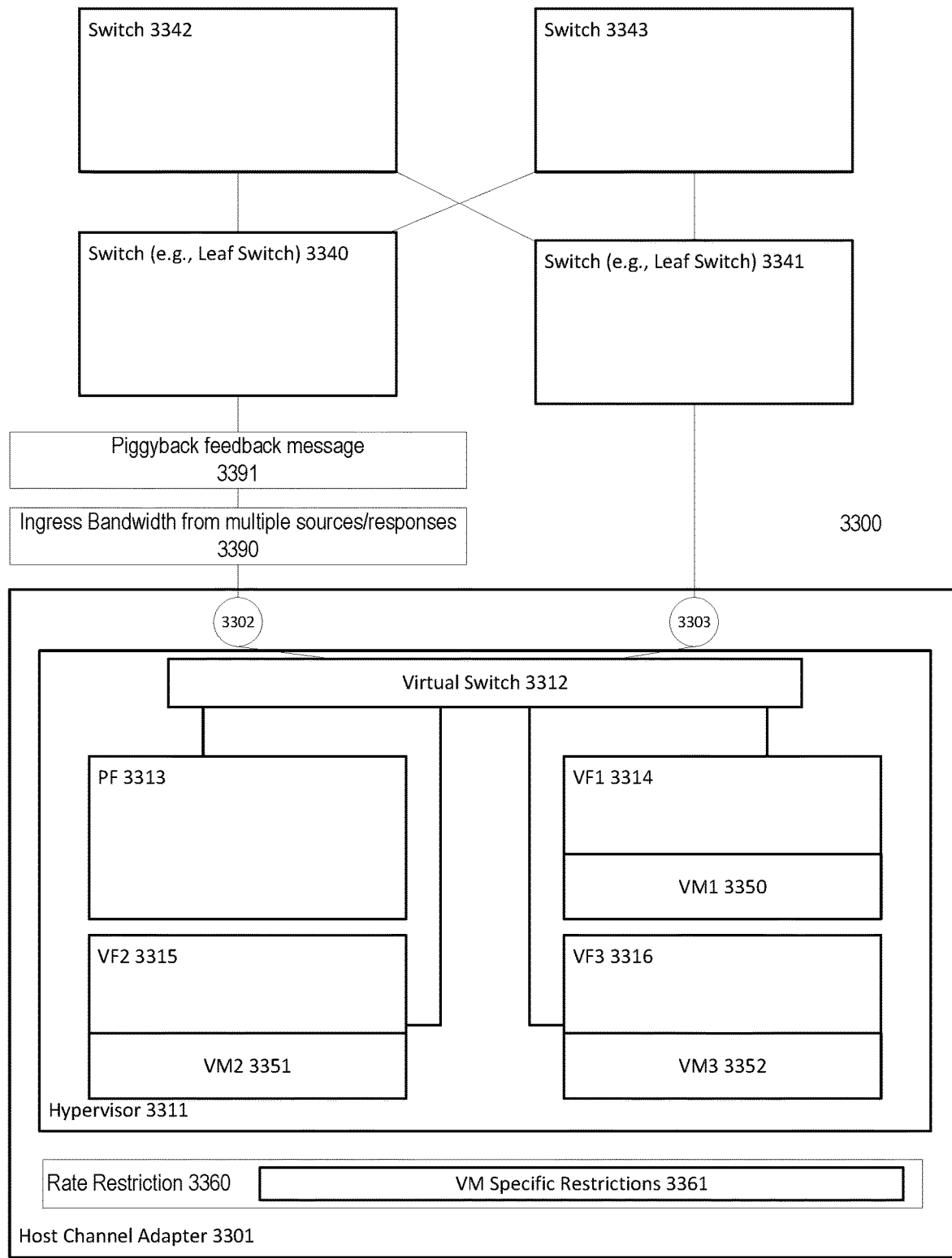
FIG. 33 shows a system for combining ingress bandwidth arbitration and congestion feedback in a high performance computing environment, in accordance with an embodiment.

FIG. 33 shows a system for combining ingress bandwidth arbitration and congestion feedback in a high performance computing environment, in accordance with an embodiment.

More specifically, in accordance with an embodiment, FIG. 33 shows a host channel adapter 3301 that comprises a hypervisor 3311. The hypervisor can host/be associated with a number of virtual functions (VF), such as VF3314-3316, as well as a physical function (PF) 3313. The host channel adapter can additionally support/comprise a number of ports, such as port 3302 and 3303, which are used to connect the host channel adapter to a network, such as network 3300. The network can comprise, for example, a switched network, such as an InfiniBand network or a RoCE network that can connect the HCA 3301 to a number of other nodes, such as switches, additional and separate HCAs, and the like.

In accordance with an embodiment, as described above, each of the virtual functions can host a virtual machine (VM), such as VM1 3350, VM2 3351, and VM3 3352.

In accordance with an embodiment, the host channel adapter 3301 can additionally support, via the hypervisor, a virtual switch 3312. This is for situations where a vSwitch architecture is implemented. Although not shown, embodiments of the present disclosure can additionally support a virtual port (vPort) architecture, as described above.

In accordance with an embodiment, the network 3300, as shown, can comprise a number of switches, such as switches 3340, 3341, 3342, and 3343, which are interconnected and which can be connected, e.g., via leaf switches 3340 and 3341, to the host channel adapter 3301.

In accordance with an embodiment, the switches 3340-3343 can be interconnected, and can additionally be connected with other switches and other end nodes (e.g., other HCAs) that are not shown in the figure.

In accordance with an embodiment, bandwidth quota and performance issues may arise when a VM, e.g., VM1 3350, is subject to an excess of ingress bandwidth 3390 from multiple sources. This can arise, for example, in situations where VM1 is subject to one or more RDMA read responses concurrently with one or more RDMA write operations, where the ingress bandwidth on VM1 is coming from two or more sources (e.g., one RDMA read response from a connected VM, and one RDMA write request from another connected VM).

In accordance with an embodiment, the rate restriction component 3360 of the HCA can additionally comprise VM specific rate restrictions 3361, which can be negotiated with other peer HCAs in order to coordinate an ingress bandwidth restriction, e.g., for VM1, with egress bandwidth restrictions for the nodes responsible for generating the ingress bandwidth on VM1. Such initial negotiation can be performed, for example, to adapt to changes in the number of sender nodes sharing the available bandwidth, or changes in SLAs. These other HCAs/nodes are not shown in the figure.

In accordance with an embodiment, the negotiations above can be updated based upon, for example, piggyback messages 3391 (messages residing on top of regular data or other communication packets sent between end nodes) generated as a result of the ingress bandwidth. Such piggyback messages 3391 can be sent, for example, to multiple remote nodes responsible for generating the ingress bandwidth 3390 on VM1. Upon receiving such feedback messages, the sender nodes (senders of bandwidth responsible for the ingress bandwidth on VM1) can update their relevant egress bandwidth restrictions on the sender nodes in order to not overload, e.g., links connecting to VM1, while still attempting to maintain QoS and SLAs.

Figure 34:
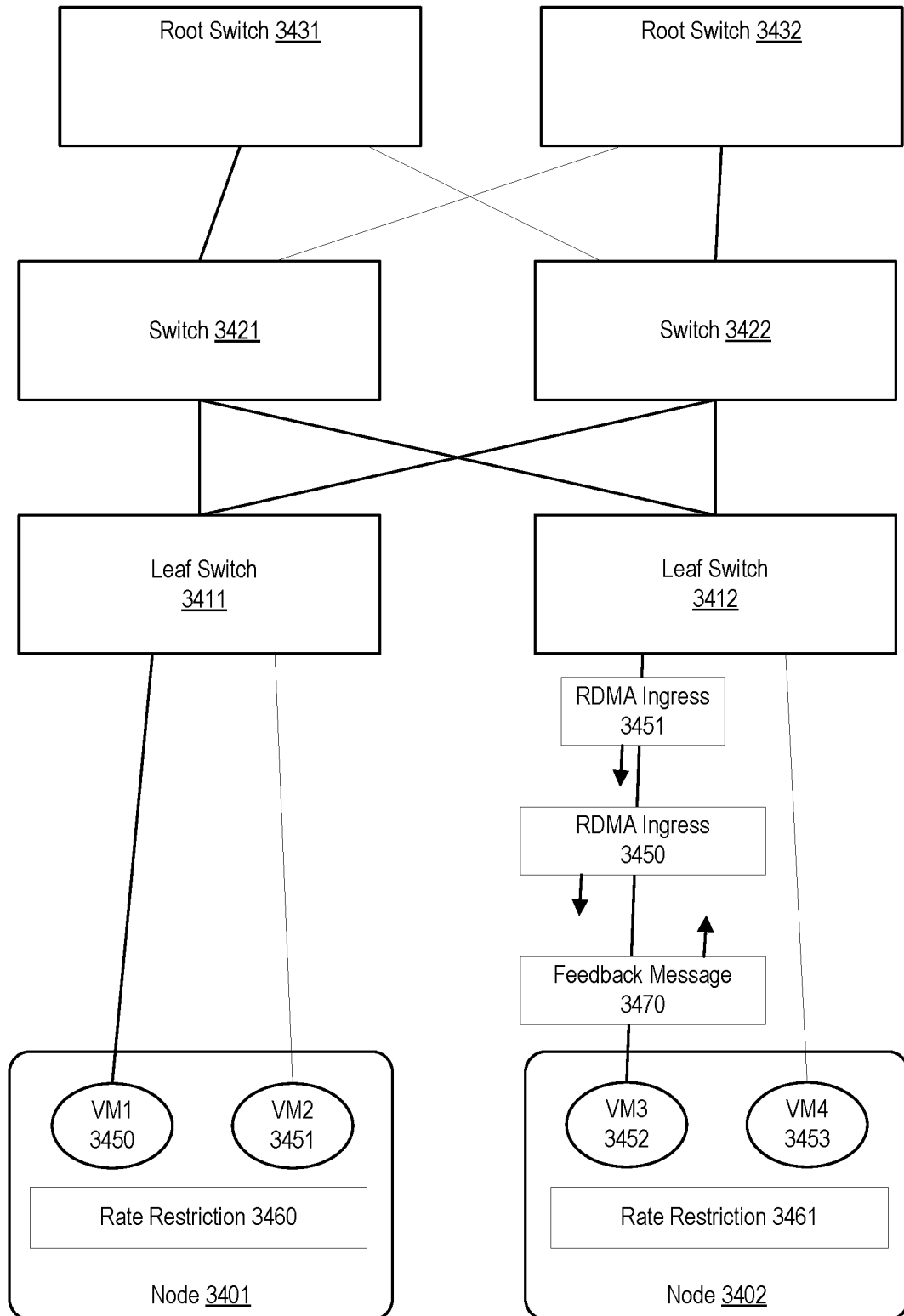
FIG. 34 shows a system for combining ingress bandwidth arbitration and congestion feedback in a high performance computing environment, in accordance with an embodiment.

FIG. 34 shows a system for combining ingress bandwidth arbitration and congestion feedback in a high performance computing environment, in accordance with an embodiment.

In accordance with an embodiment, within a high performance computing environment, such as a switched network or subnet 3400, a number of end nodes 3401 and 3402 can support a number of virtual machines, VM1-VM4 3450-3453, which are interconnected via a number of switches, such as leaf switches 3411 and 3412, switches 3421 and 3422, and root switches 3431 and 3432.

In accordance with an embodiment, not shown in the figure are the various host channel adapters that provided the functionality for connection of the nodes 3401 and 3402, as well as the virtual machines to be connected to the subnet. Discussion of such embodiments are above with regard to SR-IOV, wherein each virtual machine can be associated with a virtual function of a hypervisor on a host channel adapter.

In accordance with an embodiment, a node, such as VM3 3452, can run into ingress bandwidth restrictions (e.g., from rate restriction 3461) when it receives, for example, multiple RDMA ingress bandwidth packets (e.g., multiple RDMA writes), such as 3451 and 3452. This can result, for example, when there is not communication between the various sender nodes to coordinate bandwidth limitations.

In accordance with an embodiment, the systems and methods herein can extend the schemes for end-to-end congestion feedback to include both initial negotiation of bandwidth quotas (i.e., VM3 negotiating, or a bandwidth restriction associated with VM3, negotiating with all sender nodes that target VM3 within ingress traffic), dynamic adjustment of such bandwidth quotas (e.g. to adapt to changes in the number of sender nodes sharing the available bandwidth, or changes in SLAs), as well as dynamic congestion feedback to indicate that senders need to temporarily slow down the relevant egress data rate despite that the overall bandwidth quota remains the same. Such dynamic congestion feedback can, for example, take place in a return message (e.g., feedback message 3470) to the various sender nodes instructing each sender node on an updated bandwidth restriction to utilize in sending traffic to VM3. Such a feedback message 3460 can take the form of an explicit, unsolicited message, as well as "piggyback" information in data packets to convey relevant information from target node (i.e., VM3 in the depicted embodiment) to sender nodes.

Figure 35:
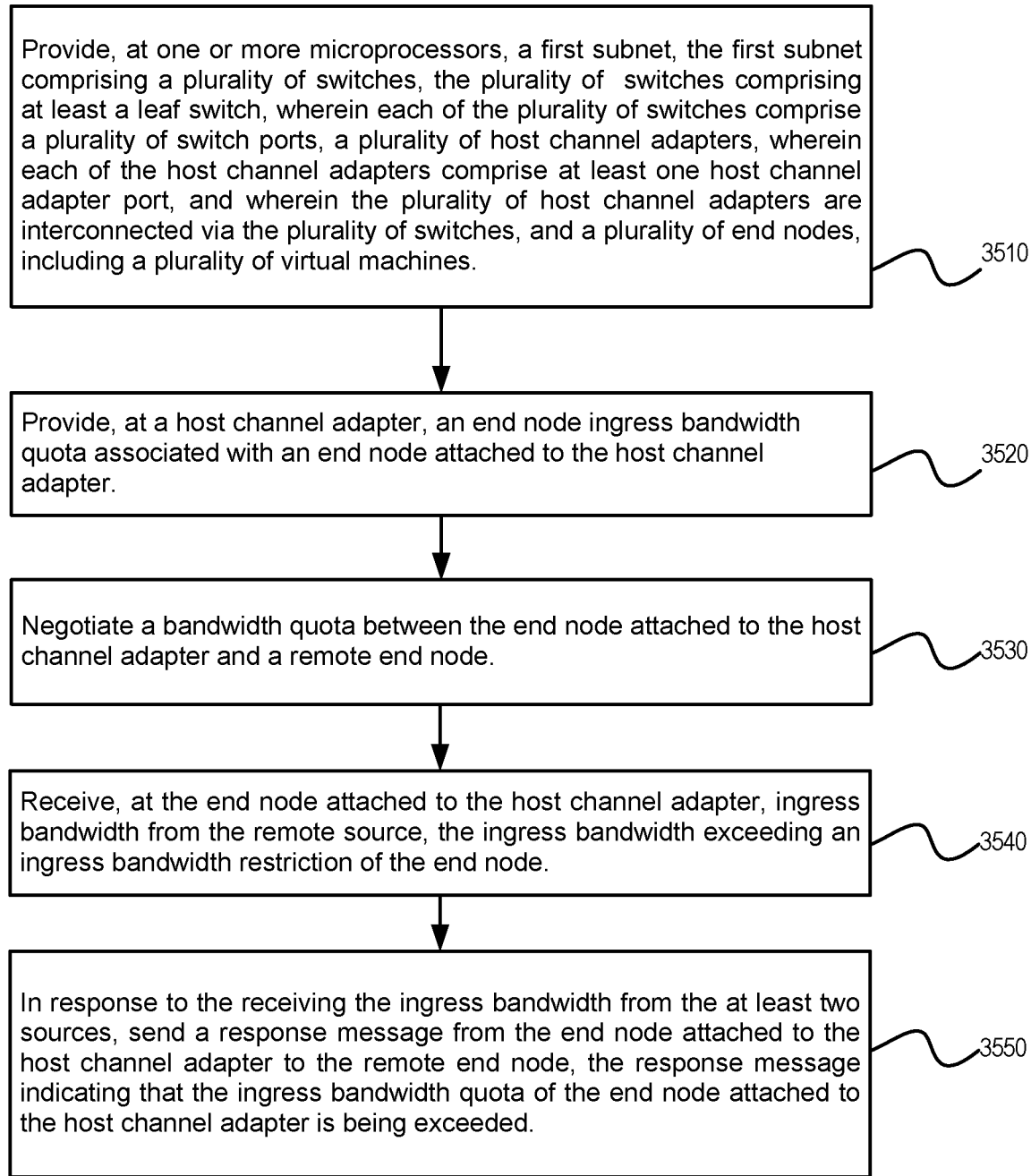
FIG. 35 is a flowchart of a method combining ingress bandwidth arbitration and congestion feedback in a high performance computing environment, in accordance with an embodiment.

FIG. 35 is a flowchart of a method combining ingress bandwidth arbitration and congestion feedback in a high performance computing environment, in accordance with an embodiment.

In accordance with an embodiment, at step 3510, the method can provide, at one or more microprocessors, a first subnet, the first subnet comprising a plurality of switches, the plurality of switches comprising at least a leaf switch, wherein each of the plurality of switches comprise a plurality of switch ports, a plurality of host channel adapters, wherein each of the host channel adapters comprise at least one host channel adapter port, and wherein the plurality of host channel adapters are interconnected via the plurality of switches, and a plurality of end nodes, including a plurality of virtual machines.

In accordance with an embodiment, at step 3520, the method can provide, at a host channel adapter, an end node ingress bandwidth quota associated with an end node attached to the host channel adapter.

In accordance with an embodiment, at step 3530, the method can negotiate a bandwidth quota between the end node attached to the host channel adapter and a remote end node.

In accordance with an embodiment, at step 3540, the method can receive, at the end node attached to the host channel adapter, ingress bandwidth from the remote source, the ingress bandwidth exceeding an ingress bandwidth restriction of the end node.

In accordance with an embodiment, at 3550, in response to the receiving the ingress bandwidth from the at least two sources, the method can send a response message from the end node attached to the host channel adapter to the remote end node, the response message indicating that the ingress bandwidth quota of the end node attached to the host channel adapter is being exceeded.

Using Multiple CE (Congestion Experienced) Flags in Both FECN (Forward Explicit Congestion Notification) and BECN (Backward Explicit Congestion Notification) Signaling (ORA200246-US-NP-4)

In accordance with an embodiment, traditionally, congestion notification is based on data packets that encounter congestion at some point (e.g., some link segment between some node/switch pair along the path from the sender to the target through the network/fabric topology) are marked with a "congested" status flag (aka a CE flag), and then this status is reflected in response packets that are sent back from the target to the sender.

In accordance with an embodiment, an issue with this scheme is that it does not allow sender nodes to discriminate between flows that are subject to congestion at the same link segments despite that they represent different targets. Also, when multiple paths are available between pairs of sender and target nodes, any information about congestion for different alternative paths requires that some flow is active for the relevant target via the relevant paths.

In accordance with an embodiment, the systems and methods described herein extend the congestion marking scheme to facilitate multiple CE flags in the same packet and configure switch ports to represent a stage number that defines what CE flag index it should update. Between a specific sender and a specific target a specific path through an ordered sequence of switch ports will then represent a specific ordered list of unique stage numbers and thereby also CE flag index numbers.

In accordance with an embodiment, in this way, it is possible for a sender node that receives congestion feedback with multiple CE flags set to map the various CE flags onto different "target group" contexts that will then represent the relevant congestion condition state and associated dynamic rate reduction. Further, different flows for different targets will share congestion information and dynamic rate reduction states that are associated with shared link segments represented by shared "target groups" in the sender node.

In accordance with an embodiment, when congestion does occur, a key issue is that congestion feedback should ideally be associated with all relevant target groups in the hierarchy associated with the flow that receives the congestion feedback. The impacted target groups should then dynamically adjust the max rate accordingly. Hence, the HW state for each target group must also include any current congestion status and related "throttle info".

In accordance with an embodiment, an important aspect here is that the FECN signaling should have the ability to include multiple "congestion experienced" (CE) flags so that the switch that detects the congestion could mark the flag that corresponds to its stage in the topology.—In regular fat-trees each switch has a unique (max) stage number in the upward direction and another unique (max) stage number in the downward direction. Hence, a flow that uses a specific path will then be associated with a sequence of specific stage numbers that will include all or only a subset of the total set of stage numbers in the complete fabric. However, for the specific flow, the various stage numbers associated with the path can then be mapped to one or more target groups associated with the flow. In this way a received BECN for a flow can imply that the target group(s) associated with each CE flagged stage in the BECN will be updated to indicate congestion, and the dynamic max rate for those target groups can subsequently be adjusted accordingly.

In accordance with an embodiment, while inherently suited for fat-tree topologies, the "stage number" concept for switches can be generalized to represent almost any topology where it is possible to assign such numbers to switches. However, in such general cases, the stage number is not just a function of the output port but rather a function of each input/output port number tuples. The required amount of stage numbers as well as the path specific mapping to target groups is also more complicated in the general case. Hence, in this context the reasoning assumes fat-tree topologies only.

In accordance with an embodiment, multiple CE flags in a single packet is not currently a supported feature for standard protocol headers. Hence, this could either be supported based on extension of standard headers and/or it could be supported by inserting additional independent FECN packets in the flow.—Conceptually, the generation of additional packets in a flow is similar to the use of encapsulation schemes within a switch and the impact is that packets being received at wire speed cannot be forwarded at the same wire speed since more "overhead bytes" must be transmitted downstream. Inserting an additional packet will typically be more overhead than encapsulation, but as long as this overhead is amortized across multiple data packets (no need to send such extra notifications for every data packet), the overhead will likely be acceptable.

In accordance with an embodiment, it is also possible to have schemes where switch firmware can monitor congestion conditions within the switch and as a result of this send "unsolicited BECNs" to relevant sender nodes. However, this implies that the switch firmware must have more state info about the relevant senders as well as mapping between ports and priorities and relevant senders that may also include dynamic info about what addresses are involved for packets experiencing congestion.

In accordance with an embodiment, for RC QPs, the "CE flag to target group" mapping will typically be part of the QP context, and any BECN information received in ACK/Response packets will thereby be handled for the relevant QP context and associated target groups in a straight forward manner. However, in the case of "unsolicited BECNs" (e.g. as a result of datagram traffic with only application level responses/ACKs, or as a result of "congestion warning" being broadcasted to multiple potential senders, the backward mapping is not straight forward.—At least not in terms of being handled automatically by HW. Hence, a better approach is to have a scheme where FECNs can both lead to automatic HW generated BECNs in the case of connected (RC) flows, but that both FECN events with HW automated BECN generation as well as FECN events with no HW generated BECN can be processed by firmware and/or hyper privileged software associated with the HCA that receives the FECN. In this way there can be a FW/SW generated "unsolicited BECN" sent to one or more potential senders that are impacted by the observed congestion. The FW/SW that receives these "unsolicited BECNs" can then perform mapping to relevant local target groups based on payload data in the received "BECN message" and can then trigger the local HW to update target group state similar to what takes place in fully HW controlled handling of RC related BECNs.

In accordance with an embodiment, RC ACK/response packets without any BECN notification or where the subset of stage numbers with CE flag set is different (less) than earlier recorded state may lead to a corresponding update of the relevant target groups within the local HCA. Similarly, "unsolicited BECNs" can be sent by a responder HCA (i.e. related sw/fw) to indicate that earlier signaled congestion is no longer present.

In accordance with an embodiment, as described above, the target group concept combined with dynamic congestion feedback at either HW or FW/SW level provides flexible control of the egress bandwidth generated by a HCA as well as by individual vHCAs and tenants sharing the physical HCA.

In accordance with an embodiment, since target groups are identified completely independently of the associated remote address and path info at the VM level, there is no dependency between use of target groups and to what extent the communication from the VM is based on overlays or other virtual networking schemes. The only requirement is that the hyper privileged software that controls the HCA resources is able to define the relevant mapping. Also, it would be possible to use a scheme with "logical target group IDs" at the VM/vHCA level that then is mapped to actual target groups by the HCA. However, it is not clear that this is useful except for that it hides the actual target group ID from the tenant.—In cases where there is a need to change what target groups are associated with a specific destination because the underlying path has changed, then this may not involve other destinations. Hence, in the general case, the update of target group has to involve updating all involved QPs and address handles rather than simply updating a logical to physical target group ID mapping.

In accordance with an embodiment, for a virtualized target HCA, it is possible to represent individual vHCA ports rather than the physical HCA port as a final destination target group. In this way the target group hierarchy for remote peer nodes can include both a target group representing the destination physical HCA port as well as an additional target group representing the ultimate destination in terms of the vHCA port. In this way, the systems and methods have the ability to restrict the ingress bandwidth for individual vHCA ports (VFs) at the same time as the per physical HCA port bandwidth and associated sender target groups implies that the sum of per vHCA port ingress bandwidths quotas will not have to be kept less than the physical HCA port bandwidth (or associated bandwidth quotas).

In accordance with an embodiment, within a sender HCA it is possible to use target groups to represent the sharing of the physical HCA port in the egress direction by assigning different target groups to different tenants. Also, in order to facilitate multiple VMs from the same tenant sharing the tenant level target group for the physical HCA port, it is possible to assign different target groups to different such VMs. Such target groups will then be set up as the initial target group for all egress communication from that VM.

Figure 36:
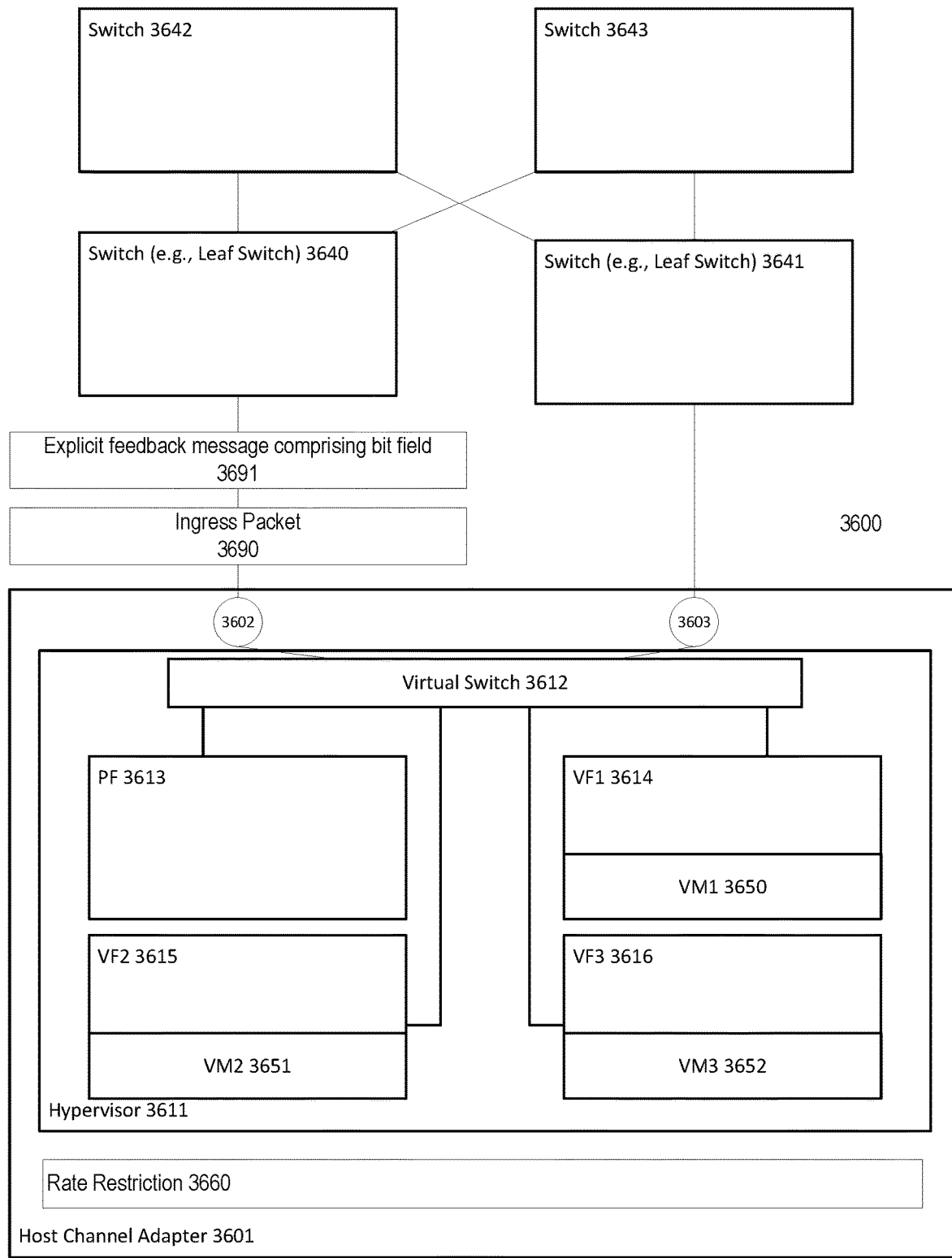
FIG. 36 shows a system for using multiple CE flags in both FECN and BECN in a high performance computing environment, in accordance with an embodiment.

FIG. 36 shows a system for using multiple CE flags in both FECN and BECN in a high performance computing environment, in accordance with an embodiment.

More specifically, in accordance with an embodiment, FIG. 36 shows a host channel adapter 3601 that comprises a hypervisor 3611. The hypervisor can host/be associated with a number of virtual functions (VF), such as VF3614-3616, as well as a physical function (PF) 3613. The host channel adapter can additionally support/comprise a number of ports, such as port 3602 and 3603, which are used to connect the host channel adapter to a network, such as network 3600. The network can comprise, for example, a switched network, such as an InfiniBand network or a RoCE network that can connect the HCA 3601 to a number of other nodes, such as switches, additional and separate HCAs, and the like.

In accordance with an embodiment, as described above, each of the virtual functions can host a virtual machine (VM), such as VM1 3650, VM2 3651, and VM3 3652.

In accordance with an embodiment, the host channel adapter 3601 can additionally support, via the hypervisor, a virtual switch 3612. This is for situations where a vSwitch architecture is implemented. Although not shown, embodiments of the present disclosure can additionally support a virtual port (vPort) architecture, as described above.

In accordance with an embodiment, the network 3600, as shown, can comprise a number of switches, such as switches 3640, 3641, 3642, and 3643, which are interconnected and which can be connected, e.g., via leaf switches 3640 and 3641, to the host channel adapter 3601.

In accordance with an embodiment, the switches 3640-3643 can be interconnected, and can additionally be connected with other switches and other end nodes (e.g., other HCAs) that are not shown in the figure.

In accordance with an embodiment, the ingress packet 3690, while traversing the network, can experience congestion at any stage of its path, and the packet can be marked by the switches upon detecting such congestion at any of the stages. In addition to marking the packet as having experienced congestion, the switch doing the marking can additionally indicate the stage at which the packet experienced congestion. Upon arriving at the destination node, e.g., VM1 3650, VM1 can send (e.g., automatically) a response packet via an explicit feedback message 3691 that can indicate to the sending node that the packet experienced congestion, and at which stage(s) the packet experienced congestion.

In accordance with an embodiment, the ingress packet can comprise a bit field that is updated to indicate where the packet experienced congestion, and the explicit feedback message can mirror/represent this bit field in informing the sender node of such congestion.

In accordance with an embodiment, each switch port represents a stage in the total subnet. As such, each packet sent in the subnet can traverse a maximum number of stages. In order to identify where congestion was detected (could be at multiple places), the congestion marking (e.g., CE flag) is extended from a mere binary flag (congestion experienced) to a bit-field comprising multiple bits. Each bit of the bit-field can then be associated with a stage number, which can be assigned to each switch port. For example, in a three-stage fat-tree, the maximum number of stages would be three. When a system has a path from A to B, and routing is known, then each end node can determine through which switch port a packet traversed at any given stage of the path. By doing so, each end node can determine at which distinct switch ports a packet experienced congestion by correlating the routing with a received congestion message.

In accordance with an embodiment, the system can provide congestion feedback coming back indicating which stage at which congestion is detected, and then if end node have congestion which occurs due to a shared link segment, then congestion control applies to that segment, and not to the different end ports. This provides a finer grain of information regarding congestion.

In accordance with an embodiment, by providing such a finer grain, end nodes could then use alternative paths in routing future packets. Or, for example, if an end node has multiple flows that all go to different destinations, but congestion is detected at a common stage of a path, then rerouting can be triggered. The systems and methods provide an immediate reaction in terms of throttling associated with—rather than having 10 different congestion notification. This is more efficient handling of congestion notifications FIG. 37 shows a system for using multiple CE flags in both FECN and BECN in a high performance computing environment, in accordance with an embodiment.

Figure 37:
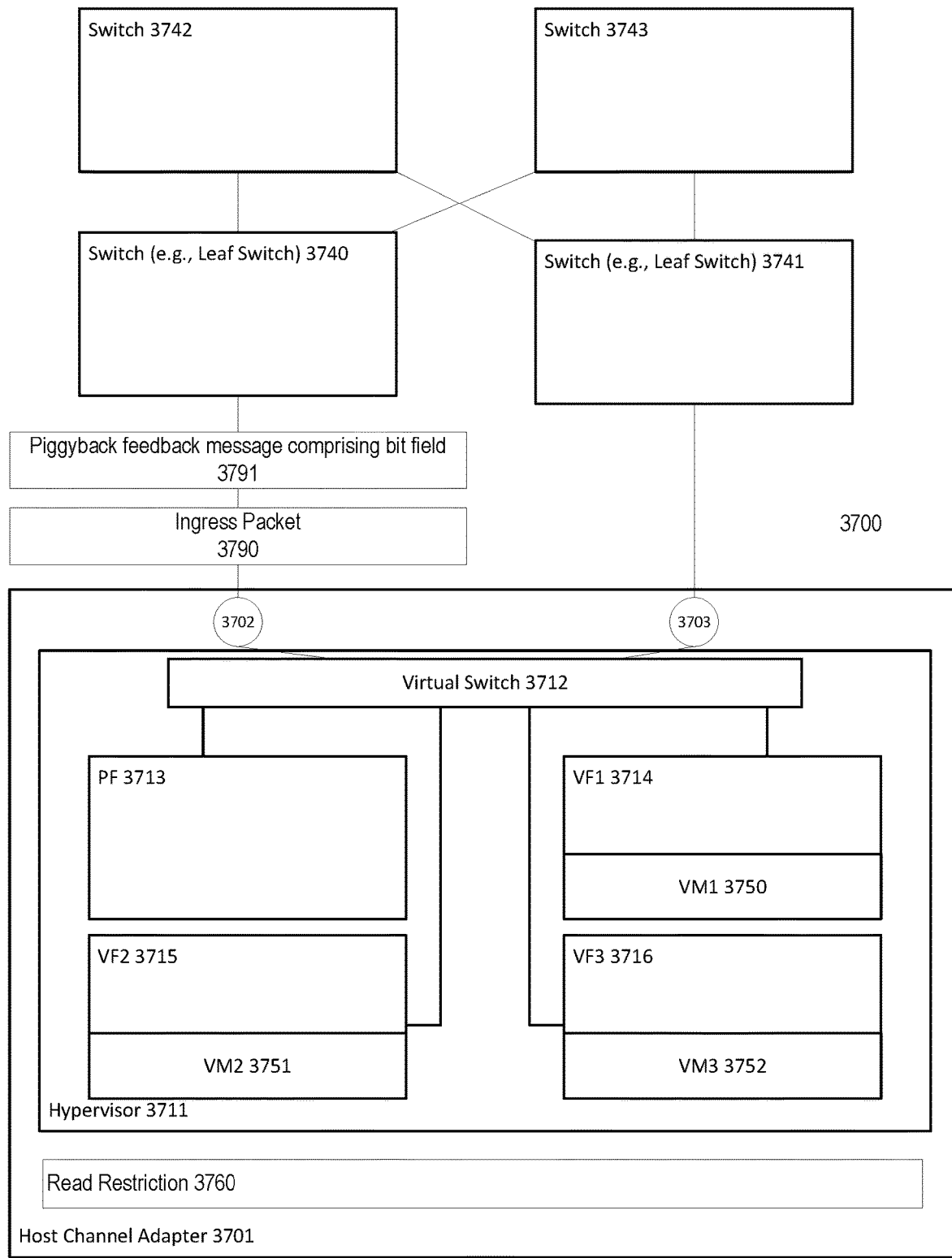
FIG. 37 shows a system for using multiple CE flags in both FECN and BECN in a high performance computing environment, in accordance with an embodiment.

More specifically, in accordance with an embodiment, FIG. 37 shows a host channel adapter 3701 that comprises a hypervisor 3711. The hypervisor can host/be associated with a number of virtual functions (VF), such as VF3714-3716, as well as a physical function (PF) 3713. The host channel adapter can additionally support/comprise a number of ports, such as port 3702 and 3703, which are used to connect the host channel adapter to a network, such as network 3700. The network can comprise, for example, a switched network, such as an InfiniBand network or a RoCE network that can connect the HCA 3701 to a number of other nodes, such as switches, additional and separate HCAs, and the like.

In accordance with an embodiment, as described above, each of the virtual functions can host a virtual machine (VM), such as VM1 3750, VM2 3751, and VM3 3752.

In accordance with an embodiment, the host channel adapter 3701 can additionally support, via the hypervisor, a virtual switch 3712. This is for situations where a vSwitch architecture is implemented. Although not shown, embodiments of the present disclosure can additionally support a virtual port (vPort) architecture, as described above.

In accordance with an embodiment, the network 3700, as shown, can comprise a number of switches, such as switches 3740, 3741, 3742, and 3743, which are interconnected and which can be connected, e.g., via leaf switches 3740 and 3741, to the host channel adapter 3701.

In accordance with an embodiment, the switches 3740-3743 can be interconnected, and can additionally be connected with other switches and other end nodes (e.g., other HCAs) that are not shown in the figure.

In accordance with an embodiment, the ingress packet 3790, while traversing the network, can experience congestion at any stage of its path, and the packet can be marked by the switches upon detecting such congestion at any of the stages. In addition to marking the packet as having experienced congestion, the switch doing the marking can additionally indicate the stage at which the packet experienced congestion. Upon arriving at the destination node, e.g., VM1 3750, VM1 can send (e.g., automatically) a response packet via a piggyback message (a message residing on top of another message/packet sent from the receiving node to the sender node) 3791 that can indicate to the sending node that the packet experienced congestion, and at which stage(s) the packet experienced congestion.

In accordance with an embodiment, the ingress packet can comprise a bit field that is updated to indicate where the packet experienced congestion, and the explicit feedback message can mirror/represent this bit field in informing the sender node of such congestion.

In accordance with an embodiment, each switch port represents a stage in the total subnet. As such, each packet sent in the subnet can traverse a maximum number of stages. In order to identify where congestion was detected (could be at multiple places), the congestion marking (e.g., CE flag) is extended from a mere binary flag (congestion experienced) to a bit-field comprising multiple bits. Each bit of the bit-field can then be associated with a stage number, which can be assigned to each switch port. For example, in a three-stage fat-tree, the maximum number of stages would be three. When a system has a path from A to B, and routing is known, then each end node can determine through which switch port a packet traversed at any given stage of the path. By doing so, each end node can determine at which distinct switch ports a packet experienced congestion by correlating the routing with a received congestion message.

In accordance with an embodiment, the system can provide congestion feedback coming back indicating which stage at which congestion is detected, and then if end node have congestion which occurs due to a shared link segment, then congestion control applies to that segment, and not to the different end ports. This provides a finer grain of information regarding congestion.

In accordance with an embodiment, by providing such a finer grain, end nodes could then use alternative paths in routing future packets. Or, for example, if an end node has multiple flows that all go to different destinations, but congestion is detected at a common stage of a path, then rerouting can be triggered. The systems and methods provide an immediate reaction in terms of throttling associated with—rather than having 10 different congestion notification. This is more efficient handling of congestion notifications.

Figure 38:
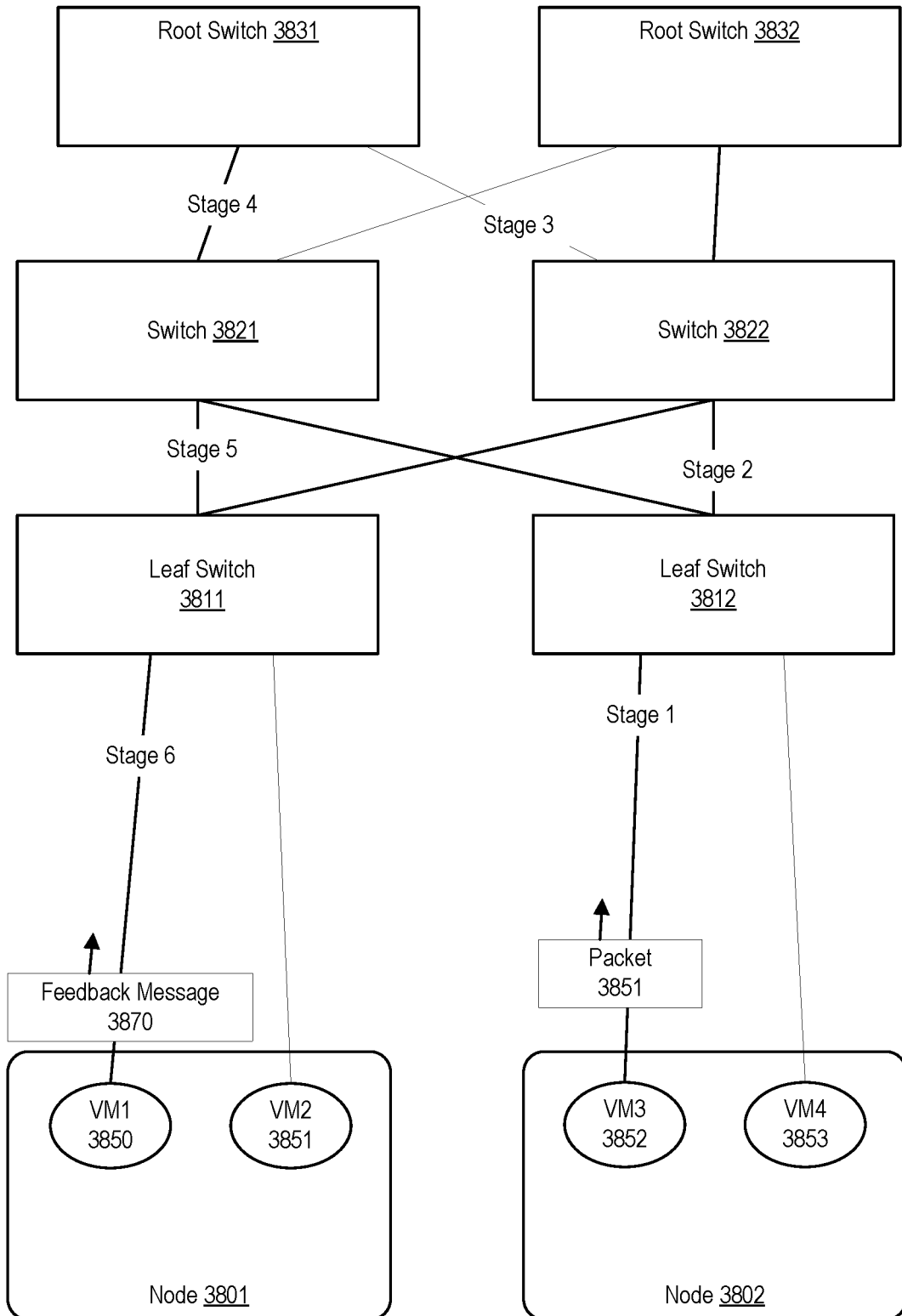
FIG. 38 shows a system for using multiple CE flags in both FECN and BECN in a high performance computing environment, in accordance with an embodiment.

FIG. 38 shows a system for using multiple CE flags in both FECN and BECN in a high performance computing environment, in accordance with an embodiment.

In accordance with an embodiment, within a high performance computing environment, such as a switched network or subnet 3800, a number of end nodes 3801 and 3802 can support a number of virtual machines, VM1-VM4 3850-3853, which are interconnected via a number of switches, such as leaf switches 3811 and 3812, switches 3821 and 3822, and root switches 3831 and 3832.

In accordance with an embodiment, not shown in the figure are the various host channel adapters that provided the functionality for connection of the nodes 3801 and 3802, as well as the virtual machines to be connected to the subnet. Discussion of such embodiments are above with regard to SR-IOV, wherein each virtual machine can be associated with a virtual function of a hypervisor on a host channel adapter.

In accordance with an embodiment, a node, a packet 3851 sent from VM3 3852 to VM1 3850 can traverse the subnet

3800 via a number of links, or stages, such as stage 1 through stage 6, as shown in the figure. The packet 3851, while traversing the subnet, can experience congestion at any of these stages, and can be marked by the switches upon detecting such congestion at any of the stages. In addition to marking the packet as having experienced congestion, the switch doing the marking can additionally indicate the stage at which the packet experienced congestion. Upon arriving at the destination node, VM1, VM1 can send (e.g., automatically) a response packet via a feedback message 3870 that can indicate to VM3 3852 that the packet experienced congestion, and at which stage(s) the packet experienced congestion.

In accordance with an embodiment, each switch port represents a stage in the total subnet. As such, each packet sent in the subnet can traverse a maximum number of stages. In order to identify where congestion was detected (could be at multiple places), the congestion marking (e.g., CE flag) is extended from a mere binary flag (congestion experienced) to a bit-field comprising multiple bits. Each bit of the bit-field can then be associated with a stage number, which can be assigned to each switch port. For example, in a three-stage fat-tree, the maximum number of stages would be three. When a system has a path from A to B, and routing is known, then each end node can determine through which switch port a packet traversed at any given stage of the path. By doing so, each end node can determine at which distinct switch ports a packet experienced congestion by correlating the routing with a received congestion message.

In accordance with an embodiment, the system can provide congestion feedback coming back indicating which stage at which congestion is detected, and then if end node have congestion which occurs due to a shared link segment, then congestion control applies to that segment, and not to the different end ports. This provides a finer grain of information regarding congestion.

In accordance with an embodiment, by providing such a finer grain, end nodes could then use alternative paths in routing future packets. Or, for example, if an end node has multiple flows that all go to different destinations, but congestion is detected at a common stage of a path, then rerouting can be triggered. The systems and methods provide an immediate reaction in terms of throttling associated with—rather than having 10 different congestion notification. This is more efficient handling of congestion notifications.

Figure 39:
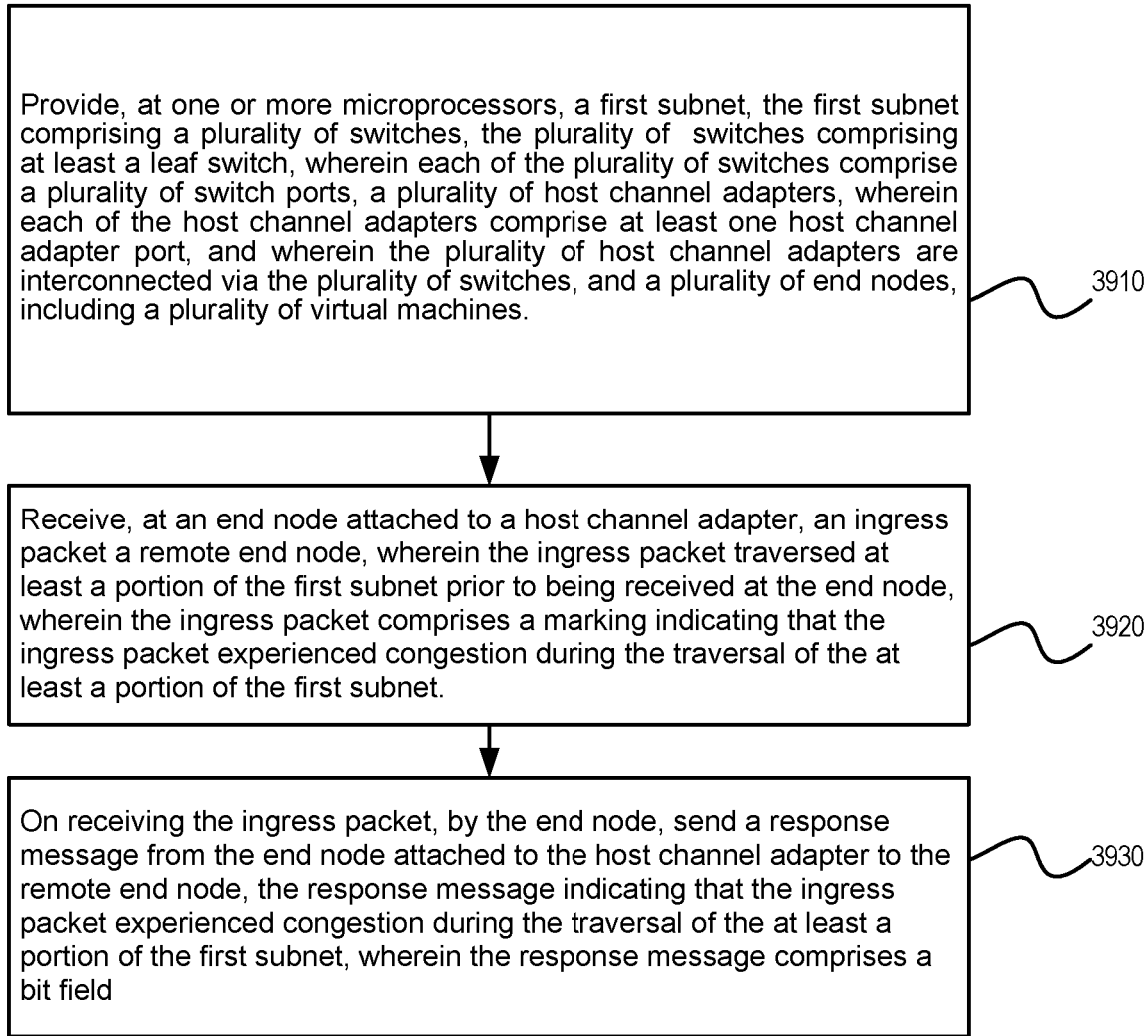
FIG. 39 is a flowchart of a method for using multiple CE flags in both FECN and BECN in a high performance computing environment, in accordance with an embodiment.

FIG. 39 is a flowchart of a method for using multiple CE flags in both FECN and BECN in a high performance computing environment, in accordance with an embodiment.

In accordance with an embodiment, at step 3910, the method can provide, at one or more microprocessors, a first subnet, the first subnet comprising a plurality of switches, the plurality of switches comprising at least a leaf switch, wherein each of the plurality of switches comprise a plurality of switch ports, a plurality of host channel adapters, wherein each of the host channel adapters comprise at least one host channel adapter port, and wherein the plurality of host channel adapters are interconnected via the plurality of switches, and a plurality of end nodes, including a plurality of virtual machines.

In accordance with an embodiment, at step 3920 the method can receive, at an end node attached to a host channel adapter, an ingress packet from a remote end node, wherein the ingress packet traversed at least a portion of the first subnet prior to being received at the end node, wherein the ingress packet comprises a marking indicating that the ingress packet experienced congestion during the traversal of the at least a portion of the first subnet.

In accordance with an embodiment, on receiving the ingress packet, at step 3930, the method can send, by the end node, a response message from the end node attached to the host channel adapter to the remote end node, the response message indicating that the ingress packet experienced congestion during the traversal of the at least a portion of the first subnet, wherein the response message comprises a bit field.

QOS and SLAs in Switched Fabrics, such as Private Fabrics

In accordance with an embodiment, private network fabrics (e.g., private fabrics, such as those used to construct a specialized distributed appliance or a generic high-performance computing resource) in the cloud as well as larger cloud at customer and on-premise installations desire the ability to deploy VM based workloads where an inherent requirement is that it is possible to define and control Quality of Service (QOS) for different types of communication flows. Additionally, workloads belonging to different tenants must be executed within the boundaries of relevant Service Level Agreements (SLAs) while minimizing interference between such workloads and maintaining the QOS assumptions for the different communication types.

In accordance with an embodiment, the below sections discuss relevant problem scenarios, goals and potential solutions.

In accordance with an embodiment, an initial scheme for provisioning fabric resources to cloud customers (aka "tenants") is that the tenant can be allocated a dedicated part of a rack (e.g. a quarter rack), or one or more full racks. This granularity implies that each tenant is guaranteed to have a communication SLA that is always fulfilled as long as the allocated resources are fully operational. This is the case also when a single rack is divided into multiple parts because the granularity is always a complete physical server with HCAs. The connectivity between different such servers in a single rack can in principle always be through a single full-crossbar switch. In this case there is no resource that is shared in a way that can lead to contention or congestion between flows belonging to different tenants as a result of communication traffic between sets of servers belonging to the same tenant.

In accordance with an embodiment, however, since the redundant switches are shared, it is critical that it is not possible for traffic generated by the workload on one server to target a server belonging to another tenant. Even though such traffic does not facilitate any communication or data leak/observation between tenants, the result can be severe interference or even DOS (denial of service) like effects for the communication flows belonging to the other tenant.

In accordance with an embodiment, despite the fact that full-crossbar leaf switches inherently implies that all communication between local servers can take place via the local switch only, there are several cases where this may not be possible or where it is not achieved due to other pragmatic issues:

In accordance with an embodiment, for example, if the host bus (PCIe) generation can only sustain the bandwidth of one fabric link at a time, then it is critical that only one HCA port is being used for data traffic at any point in time. Hence, if not all servers is in agreement about which local switch to use for data traffic, then some traffic will have to go through inter-switch links (ISLs) between the local leaf switches.

In accordance with an embodiment, if one or more servers have lost connectivity to one of the switches, then all communication will have to take place via the other switch. Hence, again if not all pairs of servers can agree about using the same single switch, then some data traffic will have to go through ISL(s).

In accordance with an embodiment, if the servers can use both HCA ports (and thereby both leaf switches) but it is not possible to enforce that connections are only established via HCA ports that connect to the same switch, then some data traffic may go through ISLs.

A reason for ending up with this scheme is that lack of sockets/port-numbers in the fabric host stack implies that a process can only establish one socket for accepting incoming connections. This socket can then only be associated with a single HCA port at a time. As long as the same single socket is used also when establishing outgoing connections, the system will end up with a number of connections that requires ISLs despite that the large number of processes have their single sockets evenly distributed between the local HCA ports.

In accordance with an embodiment, in addition to the special case single rack scenarios imposing ISL usage/sharing outlined above, once the granularity of provisioning is extended to multi-rack configurations where the leaf switches in each rack are interconnected by spine switches, then communication SLAs for different tenants becomes highly dependent on which servers are allocated to which tenants as well as how different communications flows are mapped onto different switch-switch links by the fabric level routing schemes. The key issue in this scenario is that two optimization aspects are somewhat contradictory:

In accordance with an embodiment, on one hand, all concurrent flows targeting different destination ports should as much as possible be using different paths (i.e. different switch-switch links—ISLs) through the fabric in order to provide the best possible performance.

In accordance with an embodiment, on the other hand, in order to provide predictable QOS and SLAs for different tenants, it is important that flows belonging to different tenants are not competing for bandwidth on the same ISLs at the same time. In the general case, this implies that there must be restrictions on which paths can be used by different tenants.

In accordance with an embodiment, however, in some situations depending on the size of the system, the number of tenants as well as how servers have been provisioned to different tenants, it may not be possible to avoid that flows belonging to different tenants will compete for bandwidth on the same ISLs. In this situation, there are primarily two approaches that can be used from a fabric perspective in order to address the problem and reduce the possible contention:

In accordance with an embodiment, restrict what switch buffer resources can be occupied by different tenants (or groups of tenants) in order to ensure that flows from the different tenants have forward progress independently of the other tenant(s) despite competing for the same ISL bandwidth.

In accordance with an embodiment, implement "admission control" mechanisms that will restrict the max bandwidth that can be consumed by one tenant at the expense of other tenants.

In accordance with an embodiment, for the physical fabric configuration, an issue is that the bisection bandwidth is as high as possible and ideally non-blocking or even overprovisioned. However, even with non-blocking bisection bandwidth, there can be scenarios where it is hard to achieve the desired SLA for one or more tenants given the current allocation of servers to the different tenants. In such situations, the best approach would be to perform a re-provisioning of at least some of the servers for different tenants in order to reduce the need for independent ISLs as well as bisection bandwidth in general.

In accordance with an embodiment, some multi-rack systems have a blocking fat-tree topology and the assumption behind this is that workloads will be provisioned so that relevant communicating servers to a large extent are located within the same racks implying that a significant portion of the bandwidth utilization is between ports on the local leaf switches only. Also, in traditional workloads, the bulk of the data traffic is from one fixed set of nodes to another fixed set of nodes. However, with next generation servers with non-volatile memory as well as with newer communication and storage middleware, in accordance with an embodiment, the communication workloads will be even more demanding and less predictable since different servers may provide multiple functions at the same time.

In accordance with an embodiment, a goal is to provide a provisioning granularity per tenant that is at the VM level as opposed to the physical server level. Also, the goal is to be able to deploy up to several tens of VMs on the same physical server where different sets of VMs on the same physical server may belong to different tenants and the various tenants may each be representing multiple workloads with different characteristics.

In accordance with an embodiment, additionally, whereas current fabric deployments have used different Type Of Service (TOS) associations in order to provide basic QOS (traffic separation) for different flow types (e.g. to prevent that lock messages gets "stalled" behind large bulk data transfers), it is desirable to also provide communication SLAs for different tenants. These SLAs are supposed to ensure that the tenant experiences workload throughputs and response times that are in accordance with expectations even if the workload has been provisioned on physical infrastructure that is shared by other tenants. The relevant SLA for a tenant is supposed to be fulfilled independently of concurrent activity by workloads belonging to other tenants.

In accordance with an embodiment, while a workload may be provisioned with a fixed (minimal) set of CPU cores/threads and physical memory on a fixed (minimal and/or maximal) set of physical servers, the provisioning of fixed/guaranteed networking resources is in general less straight forward as long as the deployment implies sharing of HCA/NIC at the servers. The sharing of HCAs also inherently implies that at least the ingress and egress links to/from the fabric is shared by different tenants. Hence, while different CPU cores/threads can operate in true parallel, there is no way to divide the capacity of a single fabric link except for some kind of bandwidth multiplexing or "timesharing". This basic bandwidth sharing may or may not be combined with the use of different "QOS IDs" (e.g. Service Level, Priority, DSCP, Traffic Class etc.) that will be considered when implementing buffer selection/allocation as well as bandwidth arbitration within the fabric.

In accordance with an embodiment, overall server memory bandwidth should be very high relative to the typical memory bandwidth needs of any individual CPU core in order to prevent that memory intensive workloads on some cores impose delays for other cores. Similarly, in the ideal case, the available fabric bandwidth for a physical server should be large enough to allow each tenant sharing the server to have a sufficient bandwidth relative to the communication activity the relevant workload(s) generates.

However, when several workloads all try to perform bulk data transfers, it is very possible that more than one tenant can exploit the full link bandwidth—even at 100 Gb/s and above. In order to address this scenario, it is required that the provisioning of multiple tenants onto the same physical server can be done in a way that ensures that each tenant is guaranteed to get at least a given minimal percentage of the available bandwidth. However, with RDMA based communication, the ability to enforce restrictions on how much bandwidth a tenant can generate in the egress direction does not imply that ingress bandwidth can be restricted in the same way.—I.e. multiple remote communication peers may all send data to the same destination in a way that totally overloads the receiver despite that each sender is restricted by a maximum send bandwidth. Also, RDMA read operations can be generated from a local tenant using only trivial egress bandwidth. This can potentially result in devastating ingress bandwidth if bulk RDMA read operations are generated for multiple remote peers. Hence, it is not sufficient to enforce a max limit on egress bandwidth in order to limit the total fabric bandwidth used by a single tenant on a single server.

In accordance with an embodiment, the systems and methods can configure average bandwidth limitations for a tenant that would ensure that the tenant would never exceed its relative portion of relevant link bandwidth in either ingress or egress direction independently of use of RDMA read operations as well as independently of the number of remote peers with active data traffic, and independently of bandwidth restrictions of the remote peers. (How to achieve this is discussed in the "Longer Term Goals" section below.)

In accordance with an embodiment, as long as the systems and methods are not able to enforce all aspects of communication bandwidth restrictions, the highest level communication SLAs for a tenant can only be achieved by restricting that it cannot share a physical server with other tenants, or potentially, that it will not be sharing a physical HCA with other tenants. (I.e. in the case of servers with multiple physical HCAs.) In cases where physical HCAs can operate in Active-Active mode with full link bandwidth utilizations for both HCA ports, it is also possible to use restrictions where a given tenant is given exclusive access to one of the HCA ports in the normal case. Still, due to HA constraints, the failure of a complete HCA (in the multi-HCA per server case) or a single HCA port may imply reconfiguration and sharing that no longer guarantees the expected communication SLA for a given tenant.

In accordance with an embodiment, in addition to restrictions on the overall bandwidth utilization for a single link, the ability for each tenant to implement QOS between different communication flows or flow types depends on that it is not experiencing severe congestion conflicts relative to fabric level buffer resources or arbitration due to communication activity by other tenants. In particular, this implies that if one tenant is using a specific "QOS ID" to implement low-latency messaging, then it should not find itself "competing" with bulk data traffic from another tenant due to how the other tenant is using "QOS IDs", and/or due to how the fabric implementation is enforcing use of "QOS IDs" and/or how this maps to packet buffer allocation and/or bandwidth arbitration within the fabric. Hence, if the tenant communication SLA implies that the tenant internal QOS assumptions cannot be fulfilled without dependency on other tenants sharing the same fabric link(s) being "well behaved", then this may impose that the tenant must be provisioned without HCA (or HCA port) sharing with other tenants.

In accordance with an embodiment, for both the basic bandwidth allocation as well as the QOS issues discussed above, the sharing constraints applies to fabric internal links as well as the server local HCA port links. Hence, depending on the nature and strictness of communication SLAs for a given tenant, the deployment of VMs for the tenant may have restrictions on sharing of physical servers and/or HCAs as well as on sharing of fabric internal ISLs. In order to avoid ISL sharing, both routing restrictions as well as restrictions on where VMs can be provisioned relative to each other within the private fabric topology can apply.

Considerations Regarding Topologies, Routing and Blocking Scenarios:

In accordance with an embodiment, as discussed above, in order to ensure that a tenant can achieve the expected communication performance among a set of communicating VMs without any dependency on the operation of VMs belonging to other tenants, there can be no HCAs/HCA ports or any fabric ISLs that is shared with other tenants. Hence, the highest SLA class offered would typically have this as the implied implementation. This is in principle the same scheme as the current provisioning model for many traditional systems in the cloud. However, with shared leaf switches, this SLA would require a guarantee about no ISL sharing with other tenants. Also, in order for the tenant to achieve the best possible balancing of flows and utilization of available fabric resources it would need to be able to "optimize non-blockingness" in an explicit manner (i.e. the communication SW infrastructure must give the tenant a method to ensure that communication takes place in a way where different flows are not competing for the same link bandwidth). This would include a way to ensure that communication that can take place via a single leaf switch is actually implemented in this way. Also, in cases where communication has to involve ISLs, then it should be possible to balance traffic across the available ISLs in order to maximize throughput.

In accordance with an embodiment, from a single HCA port, there is no point in trying to balance traffic across multiple ISLs as long as the available max bandwidth is the same for all links in the fabric. From this perspective, it would make sense to use dedicated "next hop" ISLs per sending HCA port as long as the available ISLs represent a non-blocking sub-topology relative to the senders. However, unless the relevant ISLs only represent connectivity between two leaf switches, a scheme with dedicated next hop ISLs per sender port is not really sustainable since at some point, more than one ISL has to be used if the communication is with multiple remote peer HCA ports connected to different leaf switches.

In accordance with an embodiment, in non-blocking Infiniband fat-tree topologies, the prevalent routing algorithm uses "dedicated down paths" which implies that in the non-blocking topology there is the same number of switch ports in each layer of the fat-tree. This implies that each end-port can have a dedicated chain of ports from one root switch, through each intermediate switch layer and until the egress leaf switch port connecting the relevant HCA port. Hence, all traffic targeting a single HCA port will use this dedicated down path and there will be no traffic to any other destination ports (in the downward direction) on these links. However, in the upward direction, there cannot be dedicated paths to each destination, and the consequence is that some links in the upward direction will have to be shared by traffic to different destinations. In the next round, this can lead to congestion when different flows to different destinations are all trying to utilize the full bandwidth on a shared intermediate link. Similarly, if multiple senders are sending to the same destination at the same time, then this may cause congestion in the dedicated down path that may then soon spread to other unrelated flows.

In accordance with an embodiment, as long as a single destination port belongs to a single tenant, then there is no risk of congestion between multiple tenants in the dedicated down path. However, it is still a problem that different tenants may need to use the same links in the upward direction in order to reach the root switch (or an intermediate switch) that represents the dedicated down path. By as much as possible dedicate different root switches to specific tenants, the systems and methods would reduce the need for different tenants sharing paths in the upward direction. However, from a single leaf switch, this scheme could reduce the number of available up links towards the relevant root switch(es). Hence, in order to maintain non-blocking bi-section bandwidth between servers (or rather HCA ports) belonging to the same tenant, the number of servers allocated for a single tenant on a specific leaf switch (i.e. in a single rack) would need to be less or equal to the number of up links towards the root switch(es) used by that tenant. On the other hand, in order to maximize the ability to communicate via a single cross bar, it makes sense to allocate as many servers as possible for the same tenant within the same rack.

In accordance with an embodiment, this inherently implies a conflict between being able to utilize guaranteed bandwidth within a single leaf switch versus guaranteed bandwidth towards communication peers in different racks. In order to address this dilemma, the best approach is probably to use a scheme where the tenant VMs are grouped based on which leaf switches (i.e. leaf switch pair) they are directly connected to, and then there needs to be an attribute that defines the available bandwidth between such groups. However, again, there is a tradeoff between being able to maximize the bandwidth between two such groups (e.g. between the same tenant in two racks), versus being able to guarantee bandwidth towards multiple remote groups. Still, in the special case of only two layers of switches (i.e. a leaf layer interconnected by a single spine layer), a non-blocking topology implies that it is always possible to have N dedicated uplinks between a leaf switch with N HCA ports belonging to the same tenant and N spine ports. Hence, as long as these N spine ports represents spines that "owns" all dedicated down paths for all relevant remote peer ports, the configuration is non-blocking for that tenant. However, if the relevant remote peers represent dedicated down paths from more than N spine switches, or if the N uplinks are not distributed among all relevant spine switches, then the systems and methods have a possible contention conflict relative to other tenants.

In accordance with an embodiment, among the VMs of a single tenant, independently of non-blocking or blocking connectivity, there is still a potential for contention between flows from different sources connected to the same leaf switch.—I.e. if the destinations have dedicated down paths from the same spine and the number of up links from the source leaf switch to that spine is less than the number of such concurrent flows, then there is no way to avoid some kind of blocking/congestion on the uplinks as long as all senders operate at full link speed. In this case, the only option in order to maintain bandwidth would be to use a secondary path to one of the destinations via a different spine. This would then represent a potential conflict with another dedicated down path since a standard non-blocking fat-tree can only have one dedicated down link per end port.

In accordance with an embodiment, in case of some traditional systems, there can exist a blocking factor of three (3) between leaf switches and spine switches. Hence, in a multi-rack scenario where the workload is distributed in a way that implies that more than a third of the communication traffic is between racks rather than rack-internal the resulting by-section bandwidth will be blocking. The most general scenario with even distribution of traffic between any pairs of nodes in an, e.g., 8-rack system implies that ⅞ of the communication is between racks, and the blocking effect will be substantial.

In accordance with an embodiment, if the cable cost of overprovisioning can be tolerated in the system (i.e. given a fixed switch unit cost), then the additional links can be used to both provide "backup" down links to each leaf switch, and also to provide spare up link capacity from each leaf to each spine.—i.e. in both cases providing at least some potential remedy for dynamic workload distributions that represent a non-uniform distribution of traffic and therefore is not able to utilize a topology that is inherently non-blocking in the first place.

In accordance with an embodiment, higher radix, full-crossbar switches also have potential to increase the size of each single "leaf domain", as well as to reduce the number of spine switches required for a given system size. E.g. in the case of 128 port switches, two full racks with 32 servers could be included in a single full crossbar leaf domain, and still provide non-blocking up-link connectivity. Similarly, only 8 spines would be required to provide non-blocking connectivity between 16 racks (512 servers, 1024 HCA ports). Hence, still only 8 up-links from each leaf to each spine (i.e. in the single, fully connected network case). In the extreme case of all HCA ports on one leaf sending to a single remote leaf via a single spine this is still implying a blocking factor of 8. On the other hand, given an even distribution of dedicated down paths for each leaf switch among all the spines, the likelihood of such extreme scenarios should be negligible.

In accordance with an embodiment, in the case of dual independent networks/rails where each leaf switch in the redundant leaf switch pairs belongs to a single rail with dedicated spines. The same 8 spines would be divided into two groups of four (one for each rail), and hence in this case, each leaf in a rail would need to connect to only 4 spines. Hence, in this case, the worst case blocking factor would be only 4. On the other hand, in this scenario, the selection of rail for each communication operation in order to provide load balancing across both rails becomes even more important.

Dynamic Versus Static Packet Route-Selection/Forwarding Plus Multi-Pathing:

In accordance with an embodiment, while standard InfiniBand uses static routes per destination address, there are several standard and proprietary schemes for dynamic route selection in Ethernet switches. For InfiniBand there are also various proprietary schemes for "adaptive routing" (of which some may become standardized).

In accordance with an embodiment, one advantage of dynamic route selection is that there is higher probability for optimal utilization of the relevant bi-section bandwidth within the fabric and thereby also higher overall throughput. However, the potential disadvantages are that ordering may be disturbed, and also that congestion in one area of the fabric may more easily spread to other areas (i.e. in ways that could have been avoided if static route selection had been used).

In accordance with an embodiment, while "dynamic routing" or "dynamic route selection" are typically used about forwarding decisions taking place within and between the switches, "multi-pathing" is the term used when traffic to a single destination can be spread out across multiple paths based on explicit addressing from the sender(s). Such multi-pathing may include "striping" the sending of a single message across multiple local HCA ports (i.e. the complete message is divided into multiple sub-messages each representing an individual transfer operation), and it can imply that different transfers to the same destinations are set up to use different paths through the fabric in a dynamic manner.

In accordance with an embodiment, in the general case, if all transfers from all sources that are targeting a destination outside the local leaf domain are split into small(er) chunks that are then distributed across all possible paths/routes towards the destination, then the system would achieve optimal utilization of the available bi-section bandwidth and would also maximize the "inter leaf throughput". Still, this only holds as long as the communication workload is also evenly distributed across all possible destinations. If not, then the impact is that any congestion towards a single destination will soon impact all concurrent flows.

In accordance with an embodiment, the implication of congestion on dynamic route selection and multi-pathing is that it makes sense to restrict traffic to a single destination to use only a single path/route as long as that route/path is not the victim of congestions at other targets or on any intermediate link. In a two tier fat-tree topology with dedicated down paths, this implies that the only possible congestion that is not related to an end-port will exist on up-links targeting the same spine switch. This implies that it would make sense to handle all uplinks to the same spine as a group of ports sharing the same static routes except that the individual port to be used for a specific target would be selected dynamically. Alternatively, the individual ports could be selected based on tenant associations.

In accordance with an embodiment, using tenant associations to select uplink port within such groups could be based on fixed associations or based on a scheme where different tenants have "first priority" to use some port(s), but ability to use other ports as well. The ability to use another port would then depend on that this is not in conflict with "first priority" traffic for the other port. In this way, it would be possible for a tenant to use all relevant bi-section bandwidth as long as there are no conflicts, but when conflicts exist, there would be a guaranteed minimum bandwidth. This minimum guaranteed bandwidth could then reflect all bandwidth for a single or several links, or a percentage of the bandwidth of one or more links.

In accordance with an embodiment, in principle, the same dynamic scheme could be used in the downward path from a spine to a specific leaf also. On one hand, this would increase the risk of congestion resulting from sharing downlinks between flows targeting different end-ports, but on the other hand, it could provide a way to make use of additional alternative paths between two sets of nodes connected to two different leaf switches but still provide a way to prevent congestion spreading between different tenants.

In accordance with an embodiment, in a scenario where different dedicated down paths from a spine to a leaf already represents a specific tenant, then it would be relatively straight forward to have a scheme that allows these links to be used as "spares" for traffic (belonging to the same tenant) to end-ports on the relevant leaf switch that have their (primary) dedicated down-paths from another spine.

In accordance with an embodiment, a possible model would then be to have the switches handle dynamic route selecting between parallel ISLs connecting a single spine or leaf switch, but have host level decisions about using explicit multi-pathing via spine(s) that do not represent the (primary) dedicated down path to the relevant target.

Per Tenant Bandwidth Admission Control:

In accordance with an embodiment, in the case where a single HCA is only used by a single tenant, the systems and methods can limit the bandwidth that can be generated from the HCA ports. In particular, this applies to the case where there is limited bi-section bandwidth for that tenant for traffic going to remote leaf switch(es).

In accordance with an embodiment, one aspect of such bandwidth limitations is to ensure that the restriction is applied only to the targets that are affected by the restricted bi-section bandwidth. In principle, this would involve a scheme where different groups of targets are associated with specific bandwidth quotas (i.e. either strict max rates and/or average bandwidth across some amount of transferred data).

In accordance with an embodiment, such restrictions would by definition have to be implemented at HCA level. Also, such restrictions would map more or less directly to the virtualized HCA scenario where VMs belonging to different tenants are sharing the HCA via different Virtual Functions. In this case, the various "shared bandwidth quota groups" introduced above would need an additional dimension in terms of being associated with a group of one or more VFs and not just the complete physical HCA port.

Per Tenant Bandwidth Reservation on ISLs:

In accordance with an embodiment, as indicated above, it can make sense to reserve some guaranteed bandwidth for a tenant (or group of tenants) across one or more ISLs. In one scenario, the complete link can be reserved for the tenant(s) by restricting which tenants are allowed to use the link at all. However, in order to have a more flexible and finer grained scheme, an alternative approach is to use the switch arbitration mechanisms to ensure that some ingress port(s) will be allowed to use up to X % of the bandwidth of one or more egress ports independently of what other ingress ports are competing for bandwidth on the same egress ports.

In accordance with an embodiment, in this way, it is possible for all ingress ports to use up to 100% of the bandwidth of the relevant egress port(s), but only as long as this is not in conflict with any traffic from the prioritized ingress ports.

In accordance with an embodiment, in a scenario where different tenants "owns" different ingress ports (e.g. leaf switch ports connecting HCA ports), then this scheme would facilitate a flexible and fine grained scheme for allocation of uplink bandwidth to one or more spine switches.

In accordance with an embodiment, in the downlink path from spines to leaf switches, the usefulness of such schemes would depend on to what extent a scheme with strict dedicated down paths is used or not. If strict dedicated down paths are used and the target end-ports represent a single tenant, then by default, there is no potential conflict between different tenants trying to use the down link. Hence, in this case, access to the relevant down links should normally be set up to use a round-robin arbitration scheme with equal access for all relevant ingress ports.

In accordance with an embodiment, since the ingress ports can represent traffic belonging to different tenants, it should never be an issue that packets belonging to one tenant can be sent to and consume bandwidth on an egress port that the relevant tenant is not allowed sending to. In this case, the assumption is that strict access control (e.g. VLAN based restrictions for the various ports) rather than arbitration policies are employed to prevent such packets from wasting any bandwidth.

In accordance with an embodiment, on leaf switches, the down ports from spines might be given more bandwidth towards the various end-ports relative to other local end-ports since the down-links in principle can represent multiple sender HCA ports whereas the local end-ports only represent a single HCA port. If this is not the case, then it is possible to have a scenario where several remote servers are sharing a single down path to the target leaf switch, but then in the next round will be sharing 1/N of the bandwidth towards a single destination on that leaf switch in the case where N−1 HCA ports connected directly to the leaf switch are also trying to send to the same local target port.

In accordance with an embodiment, in the case where virtualized HCAs represent different tenants, the issue of reserving bandwidth within the fabric (i.e. across the various) ISLs, may become significantly more complex. For the ingress/uplink path, a simplified approach is to say that it is up to the HCA to provide bandwidth arbitration between different tenants, and then whatever is sent out on the HCA port will be handled by the ingress leaf switch according to the port level arbitration policies. Hence, in this case there is no change from the perspective of the leaf switch.

In accordance with an embodiment, in the down link path (from spine to leaf and from leaf ingress to end-port) the situation is different since the arbitration decision may depend not only on the ports trying to forward a packet but also which tenant the various pending packets belong to. One possible solution is (again) to restrict some ISLs to only represent a specific tenant (or group of tenants) and then reflect this in the port level arbitration scheme. Alternatively (or additionally) different priorities or QOS IDs can be used to represent different tenants as outlined below. Finally, having a "tenant ID" or any relevant access control header field like VLAN ID or Partition ID used as part of the arbitration logic would facilitate the required level of granularity for the arbitration. However, this could significantly increase the complexity of the arbitration logic in the switches that already has significant "time and space" complexity. Also, since such schemes involves overloading of information that already may have a role in the end-to-end wire protocol, it is important that such extra complexity is not conflicting with any existing use or assumptions about such header fields values.

Different Priorities, Flow Types and QOS IDs/Classes Across ISLs and End-Port Links:

In accordance with an embodiment, in order for different flow types to make progress concurrently on the same links, it is critical that they are not competing for the same packet buffers in the switches and HCAs. Also in order to differentiate the relative priorities between different flow types, the arbitration logic that determines what packet to send next on the various switch egress ports must take into account what packet type queues have something to send out on which egress port. The result of the arbitration should be that all active flows are making forward progress according to their relative priorities as well as to what extent the flow-control condition (if any) for the relevant flow type for the relevant down-stream port currently allows sending any packet.

In accordance with an embodiment, in principle, different QOS IDs can be used to make traffic flows from different tenants independent of each other even if they are using the same links. However, since the number of packet queues and independent buffer pools that can be supported for each port is typically limited to less than 10, the scalability of this approach is quite limited. Also, when a single tenant would like to use different QOS IDs in order to make different flow types independent of each other, then scalability is further reduced.

In accordance with an embodiment, as discussed above, by logically combining multiple ISLs between a single pair of switches, the systems and methods can then restrict some links to some tenants and then ensure that the different tenants can use different QOS IDs independently of each other on the different ISLs. However, again, this imposes a restriction on the total bandwidth that is available to any single tenant if independence of other tenants is to be 100% guaranteed.

In accordance with an embodiment, in the ideal case, HCA ingress (receive) packet processing can always take place at a rate that is higher than the relevant link speed independently of what transport level operation the incoming packet represents. This implies that there is no need for flow controlling different flow types on that last link (i.e.) the egress port on a leaf switch connecting to a HCA port. However, the scheduling of different packets from different queues in the leaf switch must still reflect the relevant policies for priority, fairness and forward progress.—E.g. if one small high priority packet is targeting an end port at the same time as N ports are also trying to send a max MTU size "bulk transfer packet" to the same target port, then the high priority packet should be scheduled before any of the others.

In accordance with an embodiment, in the egress path, the sending HCA can schedule and label packets in many different ways. In particular, the use of overlay protocols as a "bump in the wire" between the VM+virtual HCA and the physical fabric would allow encoding of fabric specific information that the switch could relate to without messing up any aspect of the end-to-end protocol between the tenant virtual HCA instances.

In accordance with an embodiment, switches can provide more buffering and internal queuing beyond what the current wire protocols assumes. In this way, it would be possible to set up buffering, queuing and arbitration policies that take into account that links are shared by traffic representing multiple tenants with different SLAs and that are using different QOS classes for different flow types.

In accordance with an embodiment, in this way, different high priority tenants might also have more private packet buffer capacity within the switches.

Lossless Versus Lossy Packet Forwarding:

In accordance with an embodiment, high performance RDMA traffic depends heavily on that individual packets are not lost due to lack of buffer capacity in switches and also on that packets arrive in correct sequence for each individual RDMA connection. In principle, the higher the potential bandwidth, the more critical these aspects are for achieving optimal performance.

In accordance with an embodiment, lossless operation requires explicit flow-control, and very high bandwidth implies a tradeoff between buffer capacities, MTU size and flow-control update frequencies.

In accordance with an embodiment, a drawback with lossless operation is that it will lead to congestion when the total bandwidth being generated is higher than the down-stream/receive capacity. Congestion will then (most likely) spread and will end up slowing down all flows competing for same buffers somewhere within the fabric.

In accordance with an embodiment, as discussed above, the ability to provide flow separation based on independent buffer pools is a major scalability issue that for the switch implementation is dependent on both the number of ports, the number of different QOS classes, and (as introduced above) also potentially on the number of different tenants.

In accordance with an embodiment, an alternative approach could be to make truly lossless operation (i.e. lossless based on guaranteed buffer capacity) a "premium SLA" attribute and thereby restrict this feature to only tenants that have purchased such premium SLAs.

In accordance with an embodiment, a key issue here is to be able to "overbook" the available buffer capacity so that the same buffers could be used for both lossy and lossless flows, but buffers allocated to lossy flows could be preempted whenever a packet from a lossless flow arrives and needs to use a buffer from the same pool. A very minimal set of buffers could be provided in order to allow lossy flows to make forward progress, but at a (much) lower bandwidth than what could be achieved with optimal buffer allocation.

In accordance with an embodiment, it is also possible to introduce different classes of hybrid lossless/lossy flow classes in terms of differences in the maximum time a buffer can be occupied before it has to be preempted and given to a more premium SLA type flow class (when this is needed).—This would work best in the context of a fabric implementation with link level credits, but could potentially also be adapted to work with xon/xoff type flow control (i.e. the Ethernet pause based flow control schemes used for RoCE/RDMA).

Strict Versus (More) Relaxed Packet Ordering:

In accordance with an embodiment, with strict ordering and lossless packet forwarding within the fabric, the HCA implementation can implement Reliable Connections and RDMA with minimal state overhead at the transport level. However, in order to better tolerate some amount of out-of-order packet delivery due to occasional change of route (due to adaptive/dynamic forwarding decisions within the fabric), and also in order to minimize overhead and delay related to packet(s) lost due to lossy or "hybrid lossless/lossy" mode forwarding within the fabric, an efficient transport implementation would need to keep enough state in order to allow a large number of individual packets (sequence numbers) to be arriving out of order as well as be individually retried while other packets with later sequence numbers are being accepted and acknowledged.

In accordance with an embodiment, a key point here is to avoid the long delay and loss of average bandwidth when a lost or out of order packet causes retry with the current default transport implementation. Also, by avoiding that subsequent packets in a train of posted packets gets dropped, the systems and methods are also significantly reducing the waste of fabric bandwidth that could otherwise have consumed a lot of bandwidth that could have been consumed by other flows.

Shared Services and Shared HCAs:

In accordance with an embodiment, a shared service on the fabric (e.g. backup device) used by multiple tenants implies that some end port links will be shared by different tenants unless the service can provide end port(s) that can be dedicated to a specific tenant (or restricted group of tenants). A similar scenario exists when VMs belonging to multiple tenants are sharing the same server and same HCA port(s).

In accordance with an embodiment, it is possible to allocate fine-tuned server and HCA resources for different tenants and also ensure that the outgoing data traffic bandwidth from the HCA is divided fairly among the different tenants according to the relevant SLA levels.

In accordance with an embodiment, within the fabric, it may also be possible to set up packet buffer allocation and queuing priorities and arbitration policies that reflect the relative importance and thereby the fairness among data traffic belonging to the different tenants. However, even with very fine tuned buffer allocation and arbitration policies within the fabric, the granularity may not be fine enough to ensure that the relative priorities and bandwidth quotas for different tenants are accurately reflected in terms of ingress bandwidth to the shared HCA ports.

In accordance with an embodiment, in order to achieve such fined grained bandwidth allocation, there is a need for a dynamic end-to-end flow control scheme that can effectively divide and schedule the available ingress bandwidth among a number of remote communication peers belonging to one or multiple tenants.

In accordance with an embodiment, a goal for such schemes would be that at any point in time, the relevant set of active remote clients are able to utilize its fair (not necessarily equal) share of the ingress bandwidth that is available. Also, this bandwidth utilization should take place without creating congestion in the fabric due to attempts to use excessive bandwidth at the end-port. (Still, fabric level congestion might still happen due to overload on shared links within the rest of the fabric.)

In accordance with an embodiment, the high level model for achieving this goal would be that the receiver is able to dynamically allocate and update available bandwidth for the relevant set of remote clients. The current bandwidth value for each remote client would need to be computed based on what is currently provided to each client, as well as what is needed next.

In accordance with an embodiment, this implies that if a single client is currently allowed to use all available bandwidth and another client then also needs to use ingress bandwidth then an update instruction must be delivered to the currently active client that tell this client about a new reduced max bandwidth and the new client must be delivered an instruction that it can use a max bandwidth that corresponds to the reduction for the current client.

In accordance with an embodiment, the same scheme would then in principle apply to "any" number of concurrent clients. However, there is of course a huge tradeoff between being able to ensure that the available bandwidth is never "overbooked" at any point in time versus ensuring that the available bandwidth is always fully utilized when needed.

In accordance with an embodiment, the additional challenge with this kind of scheme is to ensure that it interoperates well with dynamic congestion control and also that congestion related to a shared path for multiple targets are handled in a coordinated way within each sender.

High Availability and Fail-Over:

In accordance with an embodiment, in addition to performance, the key attribute of the private fabric may be redundancy and ability to fail-over communication following any single point of failure without loss of service for any client application. Still, while "loss of service" represents a binary condition (i.e. the service is either present or lost), some equally important, but more scalar attributes are to what extent there is any brown-out time during fail-over and if so,—how long. Another key aspect is to what extent the expected performance is provided (or re-established) during and after a fail-over operation has been completed.

In accordance with an embodiment, while from the perspective of a single node (server), the goal is that no single point of failure in the fabric communication infrastructure outside the server itself (i.e. including a single local HCA) should imply that the node becomes unable to communicate. However, from a complete fabric perspective, there is also a question about what level of fabric wide throughput and performance impact the loss of one or more components implies. E.g. in the case of topology sizes that can operate with only two spine switches.—Is it then acceptable in terms bi-section bandwidth and increased risk of congestion that 50% of the leaf-leaf communication capacity is lost if one of the spines is out of service?

In accordance with an embodiment, another question relative to per tenant SLAs is to what extent the ability to reserve and/or prioritize fabric resources for tenants with premium SLAs should be reflected in that such tenants are getting a proportionally larger share of remaining available resources following a failure and subsequent fail-over operations?—I.e. in this way the impact of the failure will be less for the premium SLA tenants, but at the expense of more impact for other tenants.

In accordance with an embodiment, in terms of redundancy, it could also be a "super premium SLA attribute" that initial resource provisioning for such tenants would make sure that no single point of failure would imply that relevant performance/QOS SLAs could not be met neither during or after the failure. However, a fundamental problem with such overprovisioning is that there has to be extremely fast fail-over (and fail-back/-re-balancing) in order to ensure that the available resources are always exploited in the most optimal manner, and that no communication is ever stalled for more than a very insignificant time period as a result of any single point of failure.

In accordance with an embodiment, an example of such a "super premium" setup could be a system with dual HCA based servers where both HCAs are operating in an Active-Active manner, and where both HCA ports are also utilized in Active-Active manner using APM (Automatic Path Migration) schemes where the delay before an alternative path is tried is very short.

Path Selection:

In accordance with an embodiment, when multiple possible paths exists between two end-points, then the selection of the best or "correct" path for relevant RDMA connections should ideally be automatic so that the communication work-load experiences the best possible performance within the constraints of the associated SLA, and also that the system level fabric resources are exploited in the most optimal manner.

In accordance with an embodiment, in the ideal case, this would imply that application logic within a VM does not have to deal with what local HCAs and what local HCA ports can or should be used for what communication. This also implies a node level rather than a port level addressing scheme and that the underlying fabric infrastructure is used transparently to the application.

In accordance with an embodiment, in this way, relevant workloads could more easily be deployed on different infrastructure without any need for explicit handling of different system types or system configurations.

Features:

In accordance with an embodiment, features in this category are assumed to be supported by existing HCA and/or switch hardware using currently firmware and software.

In accordance with an embodiment, the main goals in this category are the following:

Ability to restrict the total egress bandwidth generated by VFs belonging to a single VM or tenant per local physical HCA instance.

Ability to ensure that the VFs belonging to a single VM or tenant of a local physical HCA will be able to utilize at least a minimal percentage of the available local link bandwidth.

Ability to restrict which network (Enet) priorities a VF can use.

This may imply that multiple VFs must be allocated in order for a single VM to use multiple priorities (i.e. as long as a single VF can only be allowed to use a single priority when priority restrictions are enabled).

Ability to restrict which ISLs can be used by groups of flows belonging to a single tenant or group of tenants.

In accordance with an embodiment, in order to control the HCA usage by a tenant that is sharing a physical HCA with other tenants, an "HCA Resource Limits Group" (referred to herein as "HRLG") will be established for the tenant. The HRLG can be set up with a maximum bandwidth which defines the actual data rate that can be produced by the HRLG and can also be set up with a minimum bandwidth share that will ensure that the HRLG will achieve at least the specified percentage of the HCA bandwidth when there is contention with other tenants/HRLGs. As long as there is no contention with other HRLGs, the VFs in a HRLG can use up to specified rate (or link capacity if not rate limitation is defined) permanently.

In accordance with an embodiment, a HRLG can contain up to the number of VFs that the HCA instance can support. Within the HRLG, the expectation is that each VF will get a fair share of the "quotas" that has been assigned to the HRLG. For each VF, the relevant QPs will also get a their fair share of access to the local link as a function of available HRLG quotas as well as any current flow control limitations for the QP. (I.e. if a QP has received congestion control feedback instructing it to throttle itself, or if there is currently no "credit" to send on the relevant priority, then the QP will not be considered for local link access.)

In accordance with an embodiment, within a HRLG, it is possible to enforce restrictions on which priorities a VF can use. As long as this restriction can only be defined in terms of a single priority that is allowed for a VF, the implication is that a VM that is supposed to use multiple priorities (while still being restricted to only some priorities) will have to use multiple VFs—one VF for each required priority. (NOTE: The use of multiple VFs implies that sharing of local memory resources between multiple QPs using different priorities is likely going to represent a problem since it implies that different VFs have to be allocated and used by the ULPs/applications in the VM depending on what priority restriction/enforcement policies are defined.)

In accordance with an embodiment, within a single HRLG, there is no differentiation on bandwidth allocation depending on what priority a VF/QP is currently using.— They all share the relevant quotas in a fair/equal manner. Hence, in order to associate different bandwidth quotas with different priorities, it is required to define one or more dedicated HRLGs that will only include VFs that are restricted to use a priority that is to be associated with the shared quotas that the relevant HRLG represents. In this way, a VM or a tenant with multiple VMs sharing the same physical HCA can be given different bandwidth quotas for different priorities.

In accordance with an embodiment, current hardware priority restrictions prevents data that are attempted sent with an illegal priority from being sent onto the external link, but does not prevent the fetching of the relevant data from local memory. Hence, in the case where the local memory bandwidth that the HCA can sustain in the egress direction is about the same as the available external link bandwidth, then there is still wasted overall HCA link bandwidth. However, if the relevant memory bandwidth is (significantly) larger than the external link bandwidth, then attempts to use illegal priorities will waste less of the external link bandwidth as long as the HCA pipeline operates with optimal efficiency. Still, as long as there is not much to save in terms of external link bandwidth, a possible alternative scheme for preventing use of illegal priorities could be to exploit ACL rules enforcement in the switch ingress port. If the relevant tenant can be effectively identified without any spoof potential, then this could be used to enforce tenant/priority associations without any need to allocate individual VFs per priority for the same VM. However, both ensuring that packet/tenant association is always well defined and not possible to spoof from the sending VM, as well as dynamically updating the relevant switch port to perform the relevant enforcement whenever a VF is being set up to be used by a VM/tenant represents non-trivial complexity. One possible scheme would be to use per VF port MACs to represent a non-spoofable ID that can be associated with VM/tenant. However, if VxLAN or other overlay protocols are being used then this is not straight forward—in particular as long as the external switch is not supposed to be participating in (or be aware of) the overlay scheme being used.

In accordance with an embodiment, in order to restrict what flows can use which ISLs, the switch forwarding logic needs to have policy to identify relevant flows and set up forwarding accordingly. One example is to use VLAN IDs to represent flow-groups. In the case where different tenants maps to different VLAN IDs on the fabric, then one possible scheme would be that the switches could implement LAG type balancing dynamically based on which VLAN IDs are allowed for the various ports in any LAG or other port grouping. Another, option would involve explicit forwarding of packets based on the combination of destination address and VLAN ID.

In accordance with an embodiment, in the case where VxLAN based overlay is used transparently to the physical switch fabric, then it would be possible to map different overlays to different VLAN IDs in order to allow the switches to map VLAN IDs to ISLs as outlined above.

In accordance with an embodiment, another possible scheme is that forwarding of individual end-point addresses is set up according to a routing scheme that takes into account VLAN membership or some other notion of "tenant" association. However, as long as the same end point address values are allowed in different VLANs, the VLAN ID needs to be part of the forwarding decision.

In accordance with an embodiment, distribution of per tenant flows to either shared or exclusive ISLs can require a holistic routing scheme in order to distribute traffic in a globally optimized way within the fabric (fat-tree) topology. The implementation of such schemes would typically depend on SDN type management interfaces for the switches, but the implementation of the holistic routing would not be trivial.

Short and Medium Term SLA Classes:

In accordance with an embodiment, the following assumes that non-blocking two-tier fat-tree topologies are being used for system sizes (physical node counts) that are beyond the radix of a single leaf switch. Also, it is assumed that a single VM on a physical server will be able to use all fabric bandwidth (via one or more vHCAs/VFs). Hence, the number of VMs per tenant per physical server is not a parameter that needs to be considered as a tenant level SLA factor from a HCA/fabric perspective.

In accordance with an embodiment, a top tier (e.g., Premium Plus)
  Can use dedicated servers.
  Can be allocated on same leaf domain as much as possible except for when number and size of VMs (or HA policies) imply additional distance.
  Can on average have non-blocking up-link bandwidth from local leaf if the tenant is using more than one leaf domain (i.e. relative to the number of servers allocated for this tenant within the same leaf domain), but will not have dedicated up-links or up-link bandwidth.
  Can be able to use all "flow groups" (i.e. priorities etc. representing different buffer-pools and arbitration groups within the fabric).

In accordance with an embodiment, a lower tier (e.g., Premium)
  Can use dedicated servers, but no guarantee about same leaf domain.
  Can on average have at least 50% of non-blocking up-link bandwidth (i.e. relative to the number of servers allocated for this tenant within the same leaf domain), but will not have dedicated up-links or up-link bandwidth.
  Can be able to use all "flow groups".

In accordance with an embodiment, a third tier (e.g., Economy Plus)
  May be using shared servers, but will have dedicated "flow groups".
    These resources will be dedicated for the local HCA and switch ports, but will be shared within the fabric.
  Can have the ability to use all available egress bandwidth from the local server, but is guaranteed to have at least 50% of the total egress bandwidth.
  Only one Economy Plus tenant per physical server.
  Can on average have at least 25% of non-blocking leaf up-link bandwidth relative to the number of servers being used by this Economy Plus tenant.

In accordance with an embodiment, a fourth tier (e.g., Economy)
  Can use shared servers
  No dedicated priorities
  Can be allowed to use up to 50% of the server egress bandwidth but may be sharing this with up to 3 other Economy tenants
  Can on average be sharing up to 25% of available leaf up-link bandwidth with other
  Economy tenants within the same leaf domain.

In accordance with an embodiment, a lowest tier (e.g., Standby)
  Can be using spare capacity with no guaranteed bandwidth Longer Term Features:

In accordance with an embodiment, the main features discussed in this section are the following:
  Ability to enforce priority restrictions per VF in a way that allows a single VF to be restricted to use any subset of the total set of supported priorities.
  Zero wasted memory bandwidth or link bandwidth whenever a data transfer is attempted using a priority that is not allowed for the initiating VF.
  Ability to restrict egress rates for different individual priorities across multiple HRLGs so that each VF in the various HRLGs will get their fair share of the relevant HRLG total minimal bandwidth and/or maximum rate, but under the constraints defined by the various associated per priority quotas.

- Ability to perform sender bandwidth control and congestion adjustments based on both per target and per shared path/route basis and have this aggregated at both VM/VF (i.e. vHCA port) level as well as HCA port level.
- Ability to restrict the total average Send and RDMA Write ingress bandwidth to a VF based on receiver throttling of cooperating remote senders.
- Ability to limit the average RDMA Read ingress bandwidth to a VF without dependency on cooperating remote RDMA read responders.
- Ability to include RDMA Read in addition to Send and RDMA Write when restricting the total average ingress bandwidth to a VF based on receiver throttling of cooperating remote senders.
- Ability for a tenant VM to observe available by-section bandwidth relative to different groups of peer VMs.
- SDN features for routing control and arbitration policies within the fabric.

In accordance with an embodiment, HCA VF contexts can be extended to include a list of legal priorities (similar to the set of legal SLs for IBTA IB vPorts). Whenever a work request is trying to use a priority that is not legal for the VF, the work request should fail before any local or remote data transfer is initiated. In addition, priority mappings may also be used in order to give the application the illusion that any priority can be used. However, this kind of mapping where multiple priorities may be mapped to the same value before a packet is sent has the disadvantage that the application may no longer be able to control its own QOS policies in terms of associating different flow types with different "QOS classes. Such restricted mapping represents an SLA attribute (i.e. more privileged SLA implies more actual priorities after mapping). However, it is always important that the application can decide what flow types to associate with what QOS classes (priorities) in a way that will also represent independent flows in the fabric.

Implementing Ingress RDMA Read BW Quotas via Target Groups and Dynamic BW Quota Updates:

In accordance with an embodiment, as long as the target group associations for flows from "producer/sender" nodes implies bandwidth regulation of all outgoing data packets—including UD sends, RDMA write, RDMA send as well as RDMA read (i.e. the RDMA read responses with data), there is complete control of all ingress bandwidth for a vHCA port. This is independent of whether the VM owning the target vHCA port is generating "excessive" amounts of RDMA read requests to multiple peer nodes.

In accordance with an embodiment, as discussed above, the coupling of target groups to both flow specific and "unsolicited" BECN signaling implies the per vHCA port ingress bandwidth can be throttled dynamically for any number of remote peers.

In accordance with an embodiment, the "unsolicited BECN" messages outlined above can also be used to communicate specific rate values in addition to pure CE flagging/un-flagging for different stage numbers. In this way, it is possible to have schemes where an initial incoming packet from a new peer (e.g. a CM packet) can trigger the generation of one or more "unsolicited BECN" messages to both the HCA (i.e. the relevant firmware/hyper-privileged software) that the incoming packet came from, as well as to current communication peers.

In accordance with an embodiment, in cases where both ports on an HCA are used concurrently (i.e. active-active scheme), then it may make sense to share target groups between the local HCA ports if it is possible that concurrent flows are sharing some ISLs or even can be targeting the same destination port.

In accordance with an embodiment, another reason for sharing target groups between HCA ports is if the HCA local memory bandwidth is not able to sustain full link speed for both (all) HCA ports. In this case, the target groups can be set up so that the total aggregated link bandwidth is never exceeding the local memory bandwidth independently of which port is involved on either source or destination HCA.

In accordance with an embodiment, in cases with fixed routes towards a specific destination, any intermediate target group(s) will typically represent only a single ISL at a specific stage in the path. However, when dynamic forwarding is active, then both target groups as well as ECN handling must take this into account. In the case where dynamic forwarding decisions will only take place in order to balance traffic between parallel ISLs between a pair of switches (e.g. uplinks from a single leaf switch to a single spine switch), then all handling is in principle very similar to when only a single ISL is being used. FECN notification would take place based on the state of all ports in the relevant group and the signaling could be "aggressive" in the sense that it is signaled based on congestion indication from any of the ports, or it could be more conservative and be based on the size of a shared output queue for all ports in the group. Target group configuration would normally represent the aggregated bandwidth for all links in the group as long as the forwarding allows any packet to select the best output port at that point in time. However, if there is a notion of strict packet order preservation for each flow, then the evaluation of bandwidth quotas is more complex since some flows may "have to" use the same ISL at some point in time. If such flow-order schemes are based on well-defined header fields, then it may be best to represent each port in the group as an independent target group. In this case, the selection of target group at the sender side HCA must be able to make the same evaluation of header fields that will be associated with an RC QP connection or address handle as what the switch will perform at run time for every packet.

In accordance with an embodiment, by default, an initial target group rate for a new remote target can be set conservatively low. In this way, there is an inherent throttling until the target has had a chance to update the relevant rate. Hence, all such rate control is independent of the involved VMs themselves, but the VM would be able to request the hypervisor to update the quotas for different remote peers for both ingress and egress traffic, but this would only be granted within the total constraints defined for both the local and remote vHCA ports.

Correlating Peer Nodes, Paths and Target Groups:

In accordance with an embodiment, in order for a VM to be able to identify the bandwidth limitations associated with different peer nodes and different groups of peer nodes, there would have to be a way to query what target groups are associated with the various communication peers (and associated address/path information). Based on correlating the set of communication peers with the various target groups as well as the rate limits the various target groups represent, the VM would be able to keep track of what bandwidth can be achieved relative to the various communication peers. This would then in principle allow the VM to schedule communication operations in a way where the best possible bandwidth utilization is achieved over time by as much as possible have concurrent transfers that does not involve conflicting target groups.

Relationship between HCA Resource Limit Groups and Target Groups:

In accordance with an embodiment, the HRLG concept and the target group concept are overlapping in several ways in that they both represent bandwidth limitations that can be defined and shared among VMs and tenants in flexible ways. However, while the main focus for HRLGs is to define how different VFs (and thereby VMs and tenants) can be assigned different portions of the local HCA/HCA-port capacity, the target group concept is focused on bandwidth limitations and flow control constraints that exists outside the local HCA in terms of both final destinations as well as the intermediate fabric topology.

In accordance with an embodiment, in this way, it makes sense to use HRLGs as the way to control what shares the various VFs can use of the local HCA capacity, but ensure that the granted capacity can only be used in a way that is not in conflict with any fabric or remote target limitations or congestion conditions.—These external constraints are then dynamically controlled and reflected via the relevant target groups.

In accordance with an embodiment, in terms of implementation, the state of all relevant target groups will define which pending work requests for which local QPs will be in a flow-control state where they are allowed to generate more egress data traffic at any point in time. This state along with state about what QPs do in fact have anything to send may then be aggregated at the VF/vHCA-port level in terms of which VFs are candidates for sending next. The decision about what VF to schedule for sending next on the HCA port will be based on the state and policies of the various HRLGs in the HRLG hierarchy, the set of "ready to send" VFs and the recent history in terms of which VFs have generated what egress traffic. For the selected VF, the VF specific arbitration policies will define which QP will be selected for data transfer.

In accordance with an embodiment, since the set of QPs with pending data transfers includes both QPs with local work requests as well as QPs with pending RDMA read requests from the relevant remote peer, the above scheduling and arbitration will take care of all pending egress data traffic.

In accordance with an embodiment, ingress traffic (including incoming RDMA read responses) will be controlled by the current state of all relevant target groups in remote peer nodes.—This (remote) state will include both dynamic flow control state based on congestion situations as well as explicit updates from this HCA reflecting changes in ingress bandwidth quotas for local VFs on this HCA. Such ingress bandwidth quotas will be based on the policies that are reflected by the HRLG hierarchy. In this way, the various VMs may have "fine-tuned" independent bandwidth quotas for both ingress and egress, and also on a per priority basis for both ingress and egress.

SLA Classes:

In accordance with an embodiment, the following proposal assumes that non-blocking two-tier fat-tree topologies are being used for system sizes (physical node counts) that are beyond the radix of a single leaf switch. Also, it is assumed that a single VM on a physical server will be able to use all fabric bandwidth (via one or more HCA VFs). Hence, the number of VMs per tenant per physical server is not a parameter that needs to be considered as an SLA factor.

In accordance with an embodiment, a top level tier (e.g., Premium Plus)
  Can only use dedicated servers.
  Can be allocated on same leaf domain as much as possible except for when number and size of VMs (or HA policies) imply additional distance.
  Can always have non-blocking up-link bandwidth from local leaf if the tenant is using more than one leaf domain.
  Can be able to use all "flow groups".

In accordance with an embodiment, a lower level tier can be provided (e.g., Premium)
  Can only use dedicated servers, but no guarantee about same leaf domain.
  Can be guaranteed at least 50% of non-blocking up-link bandwidth (i.e. relative to the number of servers allocated for this tenant within the same leaf domain).
  Can be able to use all "flow groups".

In accordance with an embodiment, a third level tier can be provided (e.g., Economy Plus)
  May be using shared servers, but will have 4 dedicated "flow groups" (i.e. priorities etc. representing different buffer-pools and arbitration groups within the fabric). These resources will be dedicated for the local HCA and switch ports, but will be shared within the fabric).
  Can have the ability to use all available bandwidth (egress and ingress) from the local server, but is guaranteed to have at least 50% of the total bandwidth.
  Be limited to one Economy Plus tenant per physical server.
  Can be guaranteed at least 25% of non-blocking leaf up-link bandwidth relative to the number of servers being used by this Economy Plus tenant.

In accordance with an embodiment, a fourth tier can be provided (e.g., Economy)
  Can only be using shared servers
  Has no dedicated priorities
  Can be allowed to use up to 50% of the server bandwidth (egress and ingress) but may be sharing this with up to 3 other Economy tenants
  Can be sharing up to 25% of available leaf up-link bandwidth with other Economy tenants within the same leaf domain.

In accordance with an embodiment, a bottom tier can be provided (e.g., Standby) which can use spare capacity with no guaranteed bandwidth While various embodiments of the present invention have been described above, it should be understood that they have been presented by way of example, and not limitation. The embodiments were chosen and described in order to explain the principles of the invention and its practical application. The embodiments illustrate systems and methods in which the present invention is utilized to improve the performance of the systems and methods by providing new and/or improved features and/or providing benefits such as reduced resource utilization, increased capacity, improved efficiency, and reduced latency.

In some embodiments, features of the present invention are implemented, in whole or in part, in a computer including a processor, a storage medium such as a memory and a network card for communicating with other computers. In some embodiments, features of the invention are implemented in a distributed computing environment in which one or more clusters of computers is connected by a network such as a Local Area Network (LAN), switch fabric network (e.g. InfiniBand), or Wide Area Network (WAN). The distributed computing environment can have all computers at a single location or have clusters of computers at different remote geographic locations connected by a WAN.

In some embodiments, features of the present invention are implemented, in whole or in part, in the cloud as part of, or as a service of, a cloud computing system based on shared, elastic resources delivered to users in a self-service, metered manner using Web technologies. There are five characteristics of the cloud (as defined by the National Institute of Standards and Technology: on-demand self-service; broad network access; resource pooling; rapid elasticity; and measured service. See, e.g. "The NIST Definition of Cloud Computing", Special Publication 800-145 (2011) which is incorporated herein by reference. Cloud deployment models include: Public, Private, and Hybrid. Cloud service models include Software as a Service (SaaS), Platform as a Service (PaaS), Database as a Service (DBaaS), and Infrastructure as a Service (IaaS). As used herein, the cloud is the combination of hardware, software, network, and web technologies which delivers shared elastic resources to users in a self-service, metered manner. Unless otherwise specified the cloud, as used herein, encompasses public cloud, private cloud, and hybrid cloud embodiments, and all cloud deployment models including, but not limited to, cloud SaaS, cloud DBaaS, cloud PaaS, and cloud IaaS.

In some embodiments, features of the present invention are implemented using, or with the assistance of hardware, software, firmware, or combinations thereof. In some embodiments, features of the present invention are implemented using a processor configured or programmed to execute one or more functions of the present invention. The processor is in some embodiments a single or multi-chip processor, a digital signal processor (DSP), a system on a chip (SOC), an application specific integrated circuit (ASIC), a field programmable gate array (FPGA) or other programmable logic device, state machine, discrete gate or transistor logic, discrete hardware components, or any combination thereof designed to perform the functions described herein. In some implementations, features of the present invention may be implemented by circuitry that is specific to a given function. In other implementations, the features may implemented in a processor configured to perform particular functions using instructions stored e.g. on a computer readable storage media.

In some embodiments, features of the present invention are incorporated in software and/or firmware for controlling the hardware of a processing and/or networking system, and for enabling a processor and/or network to interact with other systems utilizing the features of the present invention. Such software or firmware may include, but is not limited to, application code, device drivers, operating systems, virtual machines, hypervisors, application programming interfaces, programming languages, and execution environments/containers. Appropriate software coding can readily be prepared by skilled programmers based on the teachings of the present disclosure, as will be apparent to those skilled in the software art.

In some embodiments, the present invention includes a computer program product which is a storage medium or computer-readable medium (media) having instructions stored thereon/in, which instructions can be used to program or otherwise configure a system such as a computer to perform any of the processes or functions of the present invention. The storage medium or computer readable medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data. In particular embodiments, the storage medium or computer readable medium is a non-transitory storage medium or non-transitory computer readable medium.

The foregoing description is not intended to be exhaustive or to limit the invention to the precise forms disclosed. Additionally, where embodiments of the present invention have been described using a particular series of transactions and steps, it should be apparent to those skilled in the art that the scope of the present invention is not limited to the described series of transactions and steps. Further, where embodiments of the present invention have been described using a particular combination of hardware and software, it should be recognized that other combinations of hardware and software are also within the scope of the present invention. Further, while the various embodiments describe particular combinations of features of the invention it should be understood that different combinations of the features will be apparent to persons skilled in the relevant art as within the scope of the invention such that features of one embodiment may incorporated into another embodiment. Moreover, it will be apparent to persons skilled in the relevant art that various additions, subtractions, deletions, variations, and other modifications and changes in form, detail, implementation and application can be made therein without departing from the spirit and scope of the invention. It is intended that the broader spirit and scope of the invention be defined by the following claims and their equivalents.

What is claimed is:

1. A system for supporting target groups for congestion control in a private fabric in a high performance computing environment, comprising:
   one or more microprocessors;
   a first subnet, the first subnet comprising
      a plurality of switches, the plurality of switches comprising at least a leaf switch, wherein each of the plurality of switches comprise a plurality of switch ports,
      a plurality of host channel adapters, wherein each of the host channel adapters comprise at least one host channel adapter port, and wherein the plurality of host channel adapters are interconnected via the plurality of switches, and
      a plurality of end nodes, including a plurality of virtual machines;
   wherein a target group is defined on at least one of an inter-switch link between two switches of the plurality of switches or at a port of a switch of the plurality of switches, wherein the target group defines a bandwidth limit on the at least one of an inter-switch link between two switches of the plurality of switches or at a port of a switch of the plurality of switches;
   wherein a host channel adapter comprises a target group repository stored in a memory of the host channel adapter; and
   wherein the defined target group is recorded in the target group repository.

2. The system of claim 1,
   wherein the target group is defined at the inter-switch link between two switches of the plurality of switches;
   wherein a first end node of the plurality of end nodes is provided at the host channel adapter that comprises the target group repository; and wherein the first end node is associated with a first egress bandwidth limit defined at the host channel adapter that comprises the target group repository, the first egress bandwidth limit being associated with a first QoS (quality of service) agreement of the first end node.

3. The system of claim 2,
wherein a packet egressing from the first end node is routed via the inter-switch link between two switches of the plurality of switches where the target group is defined.

4. The system of claim 3,
wherein the bandwidth limit defined by the target group is less than the first egress bandwidth limit.

5. The system of claim 4,
wherein the first egress bandwidth limit associated with the first end node is updated to be less than or equal to the bandwidth limit defined by the target group.

6. The system of claim 1,
wherein the bandwidth limit defined by the target group comprises a plurality of bandwidth limits, each of the plurality of bandwidth limits being associated with a different QoS agreement.

7. The system of claim 1,
wherein the target group is decoupled from any specific destination address.

8. A method for supporting target groups for congestion control in a private fabric in a high performance computing environment, comprising:
providing, at one or more microprocessors, a first subnet, the first subnet comprising
a plurality of switches, the plurality of switches comprising at least a leaf switch, wherein each of the plurality of switches comprise a plurality of switch ports,
a plurality of host channel adapters, wherein each of the host channel adapters comprise at least one host channel adapter port, and wherein the plurality of host channel adapters are interconnected via the plurality of switches, and
a plurality of end nodes, including a plurality of virtual machines;
defining a target group on at least one of an inter-switch link between two switches of the plurality of switches or at a port of a switch of the plurality of switches, wherein the target group defines a bandwidth limit on the at least one of an inter-switch link between two switches of the plurality of switches or at a port of a switch of the plurality of switches;
providing, at a host channel adapter, a target group repository stored in a memory of the host channel adapter; and
recording the defined target group in the target group repository.

9. The method of claim 8,
wherein the target group is defined at the inter-switch link between two switches of the plurality of switches;
wherein a first end node of the plurality of end nodes is provided at the host channel adapter that comprises the target group repository; and
wherein the first end node is associated with a first egress bandwidth limit defined at the host channel adapter that comprises the target group repository, the first egress bandwidth limit being associated with a first QoS (quality of service) agreement of the first end node.

10. The method of claim 9,
wherein a packet egressing from the first end node is routed via the inter-switch link between two switches of the plurality of switches where the target group is defined.

11. The method of claim 10,
wherein the bandwidth limit defined by the target group is less than the first egress bandwidth limit.

12. The method of claim 11,
wherein the first egress bandwidth limit associated with the first end node is updated to be less than or equal to the bandwidth limit defined by the target group.

13. The method of claim 8,
wherein the bandwidth limit defined by the target group comprises a plurality of bandwidth limits, each of the plurality of bandwidth limits being associated with a different QoS agreement.

14. The method of claim 8,
wherein the target group is decoupled from any specific destination address.

15. A non-transitory computer readable storage medium having instructions thereon for supporting target groups for congestion control in a private fabric in a high performance computing environment, which when read and executed cause a computer to perform steps comprising:
providing, at one or more microprocessors, a first subnet, the first subnet comprising
a plurality of switches, the plurality of switches comprising at least a leaf switch, wherein each of the plurality of switches comprise a plurality of switch ports,
a plurality of host channel adapters, wherein each of the host channel adapters comprise at least one host channel adapter port, and wherein the plurality of host channel adapters are interconnected via the plurality of switches, and
a plurality of end nodes, including a plurality of virtual machines;
defining a target group on at least one of an inter-switch link between two switches of the plurality of switches or at a port of a switch of the plurality of switches, wherein the target group defines a bandwidth limit on the at least one of an inter-switch link between two switches of the plurality of switches or at a port of a switch of the plurality of switches;
providing, at a host channel adapter, a target group repository stored in a memory of the host channel adapter; and
recording the defined target group in the target group repository.

16. The non-transitory computer readable storage medium of claim 15,
wherein the target group is defined at the inter-switch link between two switches of the plurality of switches;
wherein a first end node of the plurality of end nodes is provided at the host channel adapter that comprises the target group repository; and
wherein the first end node is associated with a first egress bandwidth limit defined at the host channel adapter that comprises the target group repository, the first egress bandwidth limit being associated with a first QoS (quality of service) agreement of the first end node.

17. The non-transitory computer readable storage medium of claim 16, wherein a packet egressing from the first end node is routed via the inter-switch link between two switches of the plurality of switches where the target group is defined.

18. The non-transitory computer readable storage medium of claim 17,
wherein the bandwidth limit defined by the target group is less than the first egress bandwidth limit.

19. The non-transitory computer readable storage medium of claim 18,
wherein the first egress bandwidth limit associated with the first end node is updated to be less than or equal to the bandwidth limit defined by the target group.

20. The non-transitory computer readable storage medium of claim 15,
wherein the bandwidth limit defined by the target group comprises a plurality of bandwidth limits, each of the plurality of bandwidth limits being associated with a different QoS agreement.

* * * * *

UNITED STATES PATENT AND TRADEMARK OFFICE
CERTIFICATE OF CORRECTION

PATENT NO. : 11,341,082 B2
APPLICATION NO. : 16/872039
DATED : May 24, 2022
INVENTOR(S) : Johnsen et al.

Page 1 of 1

It is certified that error appears in the above-identified patent and that said Letters Patent is hereby corrected as shown below:

In the Drawings

On sheet 39 of 39, in FIGURE 39, under Reference Numeral 3920, Line 2, after "packet" insert -- from --.

In the Specification

In Column 2, Line 21, delete "embodiment" and insert -- embodiment. --, therefor.

In Column 6, Line 48, delete "Partitionind" and insert -- Partitioning --, therefor.

In Column 8, Line 23, delete "Topolodies" and insert -- Topologies --, therefor.

In Column 8, Line 23, delete "Routind" and insert -- Routing --, therefor.

In Column 13, Line 36, delete "PF" and insert -- PF. --, therefor.

In Column 43, Line 9, delete "the of" and insert -- the --, therefor.

In Column 51, Lines 27-28, delete "notifications" and insert -- notifications. --, therefor.

In Column 60, Line 18, delete "spine." and insert -- spine, --, therefor.

In Column 70, Line 48, delete "Economy tenants within the same leaf domain." and insert the same on Column 70, Line 7, as a continuation of the same line, therefor.

In Column 75, Line 17, delete "(laaS)." and insert -- (IaaS). --, therefor.

In Column 75, Line 24, delete "laaS." and insert -- IaaS. --, therefor.

Signed and Sealed this
Twenty-fourth Day of January, 2023

Katherine Kelly Vidal
*Director of the United States Patent and Trademark Office*